(12) United States Patent
Yoshida et al.

(10) Patent No.: US 11,590,736 B2
(45) Date of Patent: Feb. 28, 2023

(54) INTERLAYER FOR LAMINATED GLASS, AND LAMINATED GLASS

(71) Applicant: SEKISUI CHEMICAL CO., LTD., Osaka (JP)

(72) Inventors: Shougo Yoshida, Kouka (JP); Moyuru Okano, Kouka (JP); Manabu Matsumoto, Kouka (JP); Kazuhiko Nakayama, Kouka (JP)

(73) Assignee: SEKISUI CHEMICAL CO., LTD., Osaka (JP)

( * ) Notice: Subject to any disclaimer, the term of this patent is extended or adjusted under 35 U.S.C. 154(b) by 0 days.

(21) Appl. No.: 17/810,580

(22) Filed: Jul. 1, 2022

(65) Prior Publication Data

US 2022/0332094 A1    Oct. 20, 2022

Related U.S. Application Data

(62) Division of application No. 16/616,410, filed as application No. PCT/JP2018/021756 on Jun. 6, 2018, now Pat. No. 11,376,819.

(30) Foreign Application Priority Data

Jun. 7, 2017  (JP) .................................. 2017-112865
Jun. 7, 2017  (JP) .................................. 2017-112866
(Continued)

(51) Int. Cl.
   *B32B 17/10*   (2006.01)
   *B32B 3/10*    (2006.01)
(Continued)

(52) U.S. Cl.
   CPC .......... *B32B 17/10036* (2013.01); *B32B 3/10* (2013.01); *B32B 17/1066* (2013.01);
(Continued)

(58) Field of Classification Search
   None
   See application file for complete search history.

(56) References Cited

U.S. PATENT DOCUMENTS

| 5,154,870 A | 10/1992 | Urui et al. |
| 2007/0148472 A1 | 6/2007 | Masaki et al. |

(Continued)

FOREIGN PATENT DOCUMENTS

| CN | 103080037 A | 5/2013 |
| CN | 104944806 A | 9/2015 |

(Continued)

OTHER PUBLICATIONS

International Search Report for the Application No. PCT/JP2018/021756 dated Jul. 31, 2018.

(Continued)

*Primary Examiner* — Ramsey Zacharia
(74) *Attorney, Agent, or Firm* — Cheng Law Group, PLLC

(57) ABSTRACT

Provided is an interlayer film for laminated glass capable of preventing generation of a void in the interlayer film in an end part of laminated glass. The interlayer film for laminated glass according to the present invention has a lengthwise direction and a widthwise direction, and includes the following configuration A, the configuration B or the configuration C.
Configuration A: containing a light stabilizer, and having such a distribution in content of the light stabilizer in the widthwise direction that the content of the light stabilizer is larger in one end side of the widthwise direction.
Configuration B: containing an ultraviolet ray screening agent, and having such a distribution in content of the ultraviolet ray screening agent in the widthwise direction that the content of the ultraviolet ray screening agent is larger in one end side of the widthwise direction.

(Continued)

Configuration C: containing an oxidation inhibitor, and having such a distribution in content of the oxidation inhibitor in the widthwise direction that the content of the oxidation inhibitor is larger in one end side of the widthwise direction.

23 Claims, 3 Drawing Sheets

(30) Foreign Application Priority Data

Jun. 7, 2017 (JP) .................................. 2017-112867
Jun. 7, 2017 (JP) .................................. 2017-112868

(51) Int. Cl.
  *B32B 27/22* (2006.01)
  *B32B 27/30* (2006.01)

(52) U.S. Cl.
  CPC .. *B32B 17/10678* (2013.01); *B32B 17/10761* (2013.01); *B32B 27/22* (2013.01); *B32B 27/306* (2013.01); *B32B 2307/402* (2013.01); *B32B 2307/71* (2013.01); *B32B 2605/006* (2013.01)

(56) References Cited

U.S. PATENT DOCUMENTS

| | | | |
|---|---|---|---|
| 2008/0102280 A1 | 5/2008 | Lu et al. | |
| 2012/0052310 A1 | 3/2012 | Keller et al. | |
| 2013/0123399 A1 | 5/2013 | Keller | |
| 2013/0149503 A1 | 6/2013 | Yamamoto et al. | |
| 2013/0183507 A1 | 7/2013 | Matsuda et al. | |
| 2013/0194659 A1 | 8/2013 | Hatta et al. | |
| 2016/0214352 A1 | 7/2016 | Yoshida et al. | |
| 2016/0214354 A1 | 7/2016 | Yoshida et al. | |
| 2016/0332424 A1 | 11/2016 | Yamaguchi et al. | |
| 2016/0332425 A1 | 11/2016 | Yamaguchi et al. | |
| 2016/0355648 A1 | 12/2016 | Sugiyama | |
| 2017/0072665 A1 | 3/2017 | Iwamoto et al. | |
| 2017/0136742 A1 | 5/2017 | Oota et al. | |
| 2017/0205917 A1 | 7/2017 | Yamaoka et al. | |
| 2017/0217132 A1 | 8/2017 | Iwamoto et al. | |
| 2017/0253704 A1 | 9/2017 | Yoshida | |
| 2017/0274630 A1 | 9/2017 | Oota et al. | |
| 2017/0274631 A1 | 9/2017 | Oota et al. | |
| 2018/0022066 A1 | 1/2018 | Iwamoto et al. | |
| 2018/0022068 A1 | 1/2018 | Iwamoto et al. | |
| 2018/0022071 A1 | 1/2018 | Iwamoto et al. | |
| 2018/0029336 A1 | 2/2018 | Minakuchi et al. | |
| 2018/0104934 A1 | 4/2018 | Mori et al. | |
| 2019/0061322 A1 | 2/2019 | Oota et al. | |
| 2020/0061977 A1 | 2/2020 | Minakuchi et al. | |
| 2020/0079058 A1 | 3/2020 | Iwamoto et al. | |
| 2021/0197531 A1 | 7/2021 | Yamaguchi et al. | |

FOREIGN PATENT DOCUMENTS

| | | |
|---|---|---|
| CN | 105189400 A | 12/2015 |
| CN | 105873876 A | 8/2016 |
| CN | 106132891 A | 11/2016 |
| CN | 106604904 A | 4/2017 |
| DE | 10 2008 000 685 A1 | 9/2009 |
| EP | 1 800 855 A1 | 6/2007 |
| EP | 3 053 891 A1 | 8/2016 |
| EP | 2 921 464 A1 | 9/2016 |
| EP | 3 100 988 A1 | 12/2016 |
| EP | 3 281 924 A1 | 2/2018 |
| JP | 2007-55822 A | 3/2007 |
| JP | 2013-6725 A | 1/2013 |
| JP | 2013-526628 A | 6/2013 |
| JP | 2015-151540 A | 8/2015 |
| JP | 5838011 B1 | 12/2015 |
| JP | 2016-84278 A | 5/2016 |
| JP | 2016-94340 A | 5/2016 |
| TW | 201702070 A | 1/2017 |
| WO | WO-2012/043816 A1 | 4/2012 |
| WO | WO-2015/046587 A1 | 4/2015 |
| WO | WO-2016/039470 A1 | 3/2016 |
| WO | WO-2016/052422 A1 | 4/2016 |
| WO | WO-2016/125895 A1 | 8/2016 |
| WO | WO-2016/163486 A1 | 10/2016 |

OTHER PUBLICATIONS

Written Opinion of the International Searching Authority (PCT/ISA/237) for Application No. PCT/JP2018/021756 dated Jul. 31, 2018 (English Translation mailed Dec. 19, 2019).
International Search Report for the Application No. PCT/JP2018/021760 dated Aug. 21, 2018.
Written Opinion of the International Searching Authority (PCT/ISA/237) for Application No. PCT/JP2018/021760 dated Aug. 21, 2018 (English Translation mailed Dec. 19, 2019).
Schaller, Christian et al., "Hindered amine light stabilizers in pigmented coatings", Journal of Coatings Technology and Research, 2009, vol. 6, No. 1, pp. 81-88.
Non-Final Office Action for the U.S. Appl. No. 16/616,432 from United States Patent and Trademark Office dated Dec. 18, 2020.
Supplementary European Search Report for the Application No. EP 18 813 445.6 dated Feb. 19, 2021.
Supplementary European Search Report for the Application No. EP 18 813 559.4 dated Feb. 22, 2021.

[FIG. 1]
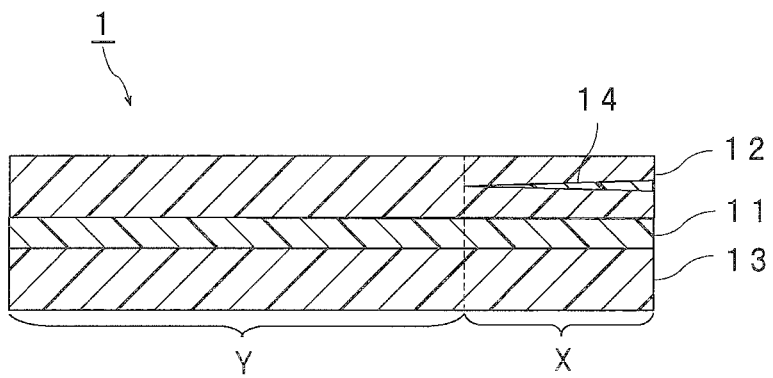
[FIG. 2]
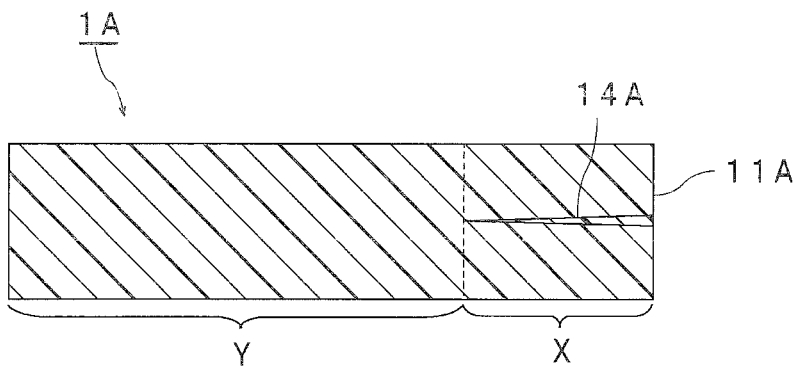
[FIG. 3]
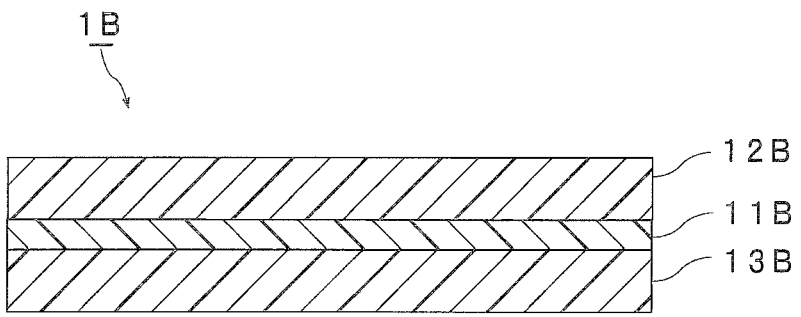
[FIG. 4]
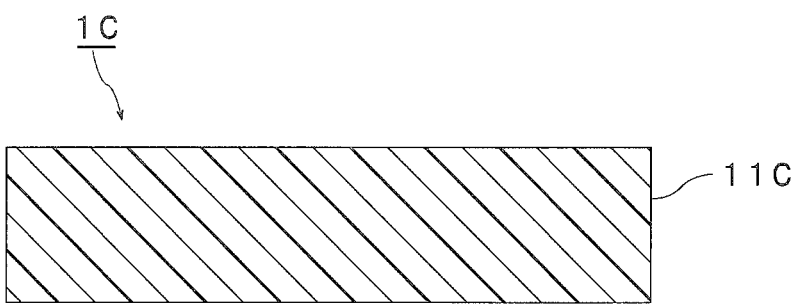

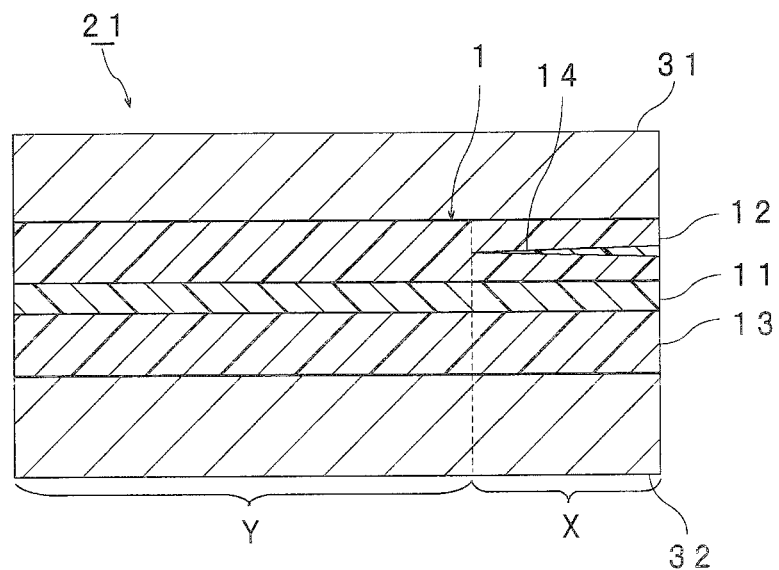
[FIG. 5]
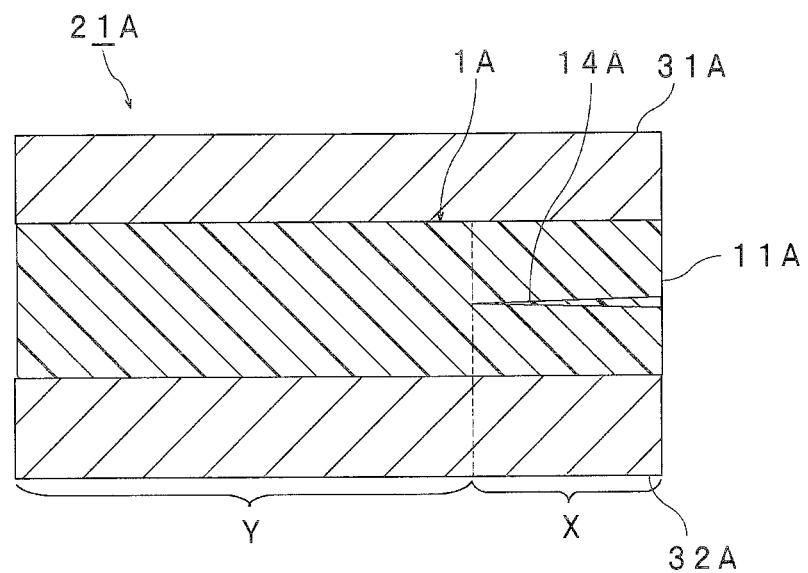
[FIG. 6]

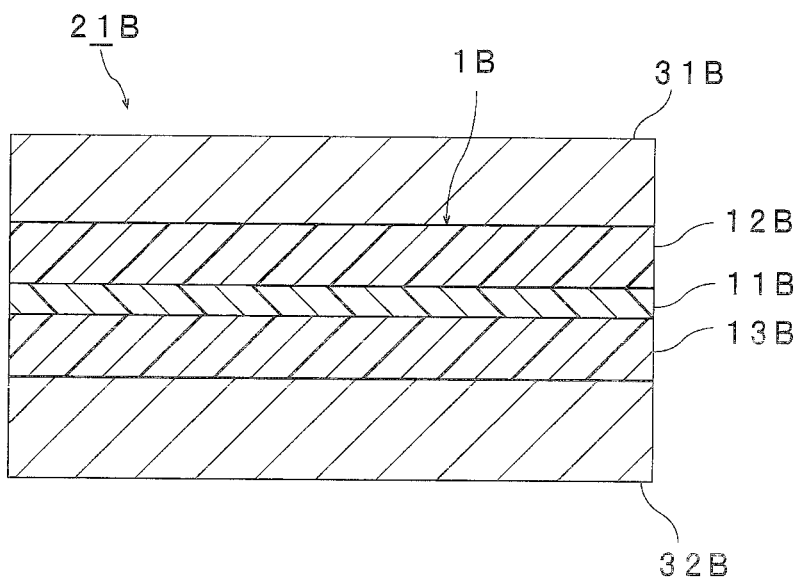
[FIG. 7]
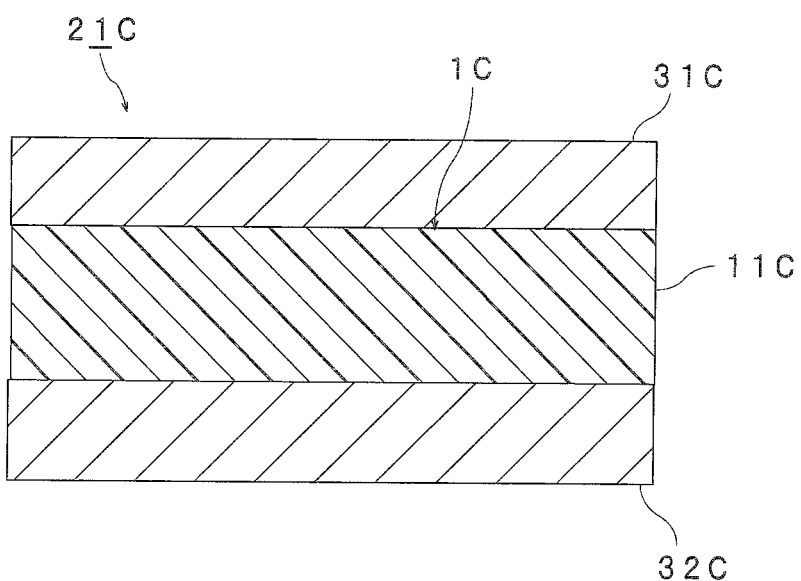
[FIG. 8]

INTERLAYER FOR LAMINATED GLASS, AND LAMINATED GLASS

CROSS-REFERENCE TO RELATED APPLICATIONS

This application is a Divisional Application of patent application Ser. No. 16/616,410, filed on Nov. 22, 2019, which is a 371 application of Application Serial No. PCT/JP2018/021756, filed on Jun. 6, 2018, which is based on Japanese Patent Application Nos. 2017-112865, 2017-112866, 2017-112867, and 2017-112868 filed Jun. 7, 2017, the entire contents of which are hereby incorporated by reference.

TECHNICAL FIELD

The present invention relates to an interlayer film for laminated glass, containing a light stabilizer, an ultraviolet ray screening agent, or an oxidation inhibitor. Moreover, the present invention relates to a laminated glass prepared with the interlayer film for laminated glass.

BACKGROUND ART

Since laminated glass generates only a small amount of scattering glass fragments even when subjected to external impact and broken, the laminated glass is excellent in safety. As such, the laminated glass is widely used for automobiles, railway vehicles, aircraft, ships, buildings and the like. The laminated glass is produced by sandwiching an interlayer film between a pair of glass plates.

As one example of the laminated glass, the following Patent Document 1 discloses an interlayer film having low yellowing tendency, high transmittance to UV-A rays and visible light, and low transmittance to UV-B rays. The interlayer film contains a polyvinyl acetal, a plasticizer, and an oxanilide type compound which is an UV absorber. Patent Document 1 indicates that the interlayer film may contain a phenolic oxidation inhibitor, and may contain a nonaromatic light stabilizer of HAS/HALS/NOR-HALS type, and may contain a dye.

The following Patent Document 2 indicates that laminated glass capable of suppressing occurrence of foaming and growth of foaming can be obtained.

RELATED ART DOCUMENTS

Patent Documents

Patent Document 1: US2012/0052310A1
Patent Document 2: WO2012/043816A1

SUMMARY OF THE INVENTION

Problems to be Solved by the Invention

In conventional laminated glass, a void can be generated in an interlayer film in an end part of the laminated glass. This void is likely to be generated particularly when light, heat and the like is applied to the laminated glass. The void is a recess part in which the interlayer film is lost in the end part of the laminated glass. The void is different from a foaming product generated by foaming as described in Patent Document 2.

In recent years, a covering material is sometimes not arranged on the upper end of laminated glass for use in an automobile for reducing the weight of the automobile. As a result, the interlayer film can be in an exposed condition, and rainwater can collect in the vicinity of the interlayer film, resulting that a void is easily formed on the upper end side.

When a void is generated in an interlayer film in an end part of laminated glass, the appearance of the laminated glass can be impaired, and the adhesive force between the interlayer film and the glass plate or the like can deteriorate.

In an interlayer film, a colored part called a shade region can be formed. In a conventional interlayer film, discoloration can occur in the colored part.

Further, in a conventional interlayer film, it is difficult to achieve both prevention of generation of a void in the interlayer film in an end part of laminated glass, and prevention of discoloration in the colored part.

An object of the present invention is to provide an interlayer film for laminated glass capable of preventing generation of a void in the interlayer film in an end part of laminated glass. It is also an object of the present invention to provide a laminated glass prepared with the interlayer film for laminated glass.

Means for Solving the Problems

According to a broad aspect of the present invention, there is provided an interlayer film for laminated glass (hereinafter, sometimes described as interlayer film) that has a lengthwise direction and a widthwise direction, and includes configuration A, configuration B or configuration C below.

Configuration A: containing a light stabilizer, and having such a distribution in content of the light stabilizer in the widthwise direction that the content of the light stabilizer is larger in one end side of the widthwise direction.

Configuration B: containing an ultraviolet ray screening agent, and having such a distribution in content of the ultraviolet ray screening agent in the widthwise direction that the content of the ultraviolet ray screening agent is larger in one end side of the widthwise direction.

Configuration C: containing an oxidation inhibitor, and having such a distribution in content of the oxidation inhibitor in the widthwise direction that the content of the oxidation inhibitor is larger in one end side of the widthwise direction.

In a specific aspect of the interlayer film according to the present invention, the interlayer film includes the configuration A, and contains the light stabilizer in a first region extending for 5% inwardly from one end of the widthwise direction; does not contain or contains the light stabilizer in a second region extending for 5% inwardly from the other end opposite to the one end of the widthwise direction; and a content of the light stabilizer in the entire first region is larger than a content of the light stabilizer in the entire second region.

In a specific aspect of the interlayer film according to the present invention, the interlayer film includes the configuration B, and contains the ultraviolet ray screening agent in a first region extending for 5% inwardly from one end of the widthwise direction; does not contain or contains the ultraviolet ray screening agent in a second region extending for 5% inwardly from the other end opposite to the one end of the widthwise direction; and a content of the ultraviolet ray screening agent in the entire first region is larger than a content of the ultraviolet ray screening agent in the entire second region.

In a specific aspect of the interlayer film according to the present invention, the interlayer film includes the configuration C, and contains the oxidation inhibitor in a first region extending for 5% inwardly from one end of the widthwise direction; does not contain or contains the oxidation inhibitor in a second region extending for 5% inwardly from the other end opposite to the one end of the widthwise direction; and a content of the oxidation inhibitor in the entire first region is larger than a content of the oxidation inhibitor in the entire second region.

In a specific aspect of the interlayer film according to the present invention, the interlayer film has a colored part that is colored in plan view in one end side of the widthwise direction, and has a non-colored part that is not colored in plan view in the other end side opposite to the one end of the widthwise direction.

In a specific aspect of the interlayer film according to the present invention, the interlayer film includes the configuration A, and contains the light stabilizer in the colored part; does not contain or contains the light stabilizer in the non-colored part; and a content of the light stabilizer in the entire colored part is larger than a content of the light stabilizer in the entire non-colored part.

In a specific aspect of the interlayer film according to the present invention, the interlayer film includes the configuration B, and contains the ultraviolet ray screening agent in the colored part; does not contain or contains the ultraviolet ray screening agent in the non-colored part; and a content of the ultraviolet ray screening agent in the entire colored part is larger than a content of the ultraviolet ray screening agent in the entire non-colored part.

In a specific aspect of the interlayer film according to the present invention, the interlayer film includes the configuration C, and contains the oxidation inhibitor in the colored part; does not contain or contains the oxidation inhibitor in the non-colored part; and a content of the oxidation inhibitor in the entire colored part is larger than a content of the oxidation inhibitor in the entire non-colored part.

In a specific aspect of the interlayer film according to the present invention, a visible light transmittance of the colored part is lower than a visible light transmittance of the non-colored part.

In a specific aspect of the interlayer film according to the present invention, the interlayer film includes a plurality of layers in one end side of the widthwise direction.

In a specific aspect of the interlayer film according to the present invention, a number of layers in one end side of the widthwise direction is different from a number of layers in the other end side of the widthwise direction.

In a specific aspect of the interlayer film according to the present invention, the interlayer film includes a layer having a glass transition temperature of 10° C. or less. In a specific aspect of the interlayer film according to the present invention, the interlayer film includes a first layer, and a second layer arranged on a first surface side of the first layer.

In a specific aspect of the interlayer film according to the present invention, the first layer has a glass transition temperature of 10° C. or less.

In a specific aspect of the interlayer film according to the present invention, the interlayer film includes the configuration A, and a content of the light stabilizer in the first layer is larger than a content of the light stabilizer in the second layer.

In a specific aspect of the interlayer film according to the present invention, the interlayer film includes the configuration B, and a content of the ultraviolet ray screening agent in the first layer is larger than a content of the ultraviolet ray screening agent in the second layer.

In a specific aspect of the interlayer film according to the present invention, the interlayer film includes the configuration C, and a content of the oxidation inhibitor in the first layer is larger than a content of the oxidation inhibitor in the second layer.

In a specific aspect of the interlayer film according to the present invention, the interlayer film includes a colored layer containing a coloring agent in the colored part, and the colored layer is embedded in the first layer, or embedded in the second layer, or arranged between the first layer and the second layer, or arranged on a side opposite to the first layer side of the second layer.

In a specific aspect of the interlayer film according to the present invention, the interlayer film includes the configuration A, and when the colored layer is embedded in the first layer, a content of the light stabilizer in the colored layer is smaller than a content of the light stabilizer in the first layer; when the colored layer is embedded in the second layer, a content of the light stabilizer in the colored layer is smaller than a content of the light stabilizer in the second layer; when the colored layer is arranged between the first layer and the second layer, a content of the light stabilizer in the colored layer is smaller than a content of the light stabilizer in the first layer, and a content of the light stabilizer in the colored layer is smaller than a content of the light stabilizer in the second layer; and when the colored layer is arranged on a side opposite to the first layer side of the second layer, a content of the light stabilizer in the colored layer is smaller than a content of the light stabilizer in the second layer.

In a specific aspect of the interlayer film according to the present invention, the interlayer film includes the configuration B, and when the ultraviolet ray screening agent is embedded in the first layer, a content of the ultraviolet ray screening agent in the colored layer is smaller than a content of the ultraviolet ray screening agent in the first layer; when the colored layer is embedded in the second layer, a content of the ultraviolet ray screening agent in the colored layer is smaller than a content of the ultraviolet ray screening agent in the second layer; when the colored layer is arranged between the first layer and the second layer, a content of the ultraviolet ray screening agent in the colored layer is smaller than a content of the ultraviolet ray screening agent in the first layer, and a content of the ultraviolet ray screening agent in the colored layer is smaller than a content of the ultraviolet ray screening agent in the second layer; and when the colored layer is arranged on a side opposite to the first layer side of the second layer, a content of the ultraviolet ray screening agent in the colored layer is smaller than a content of the ultraviolet ray screening agent in the second layer.

In a specific aspect of the interlayer film according to the present invention, the interlayer film includes the configuration C, and when the colored layer is embedded in the first layer, a content of the oxidation inhibitor in the colored layer is smaller than a content of the oxidation inhibitor in the first layer; when the colored layer is embedded in the second layer, a content of the oxidation inhibitor in the colored layer is smaller than a content of the oxidation inhibitor in the second layer; when the colored layer is arranged between the first layer and the second layer, a content of the oxidation inhibitor in the colored layer is smaller than a content of the oxidation inhibitor in the first layer, and a content of the oxidation inhibitor in the colored layer is smaller than a content of the oxidation inhibitor in the second layer; and when the colored layer is arranged on a side opposite to the first layer side of the second layer, a content of the oxidation inhibitor in the colored layer is smaller than a content of the oxidation inhibitor in the second layer.

In a specific aspect of the interlayer film according to the present invention, the colored layer is embedded in the second layer.

In a specific aspect of the interlayer film according to the present invention, the interlayer film includes a third layer arranged on a second surface side opposite to the first surface of the first layer.

In a specific aspect of the interlayer film according to the present invention, the interlayer film includes the configuration A, and a content of the light stabilizer in the first layer is larger than a content of the light stabilizer in the third layer.

In a specific aspect of the interlayer film according to the present invention, the interlayer film includes the configuration B, and a content of the ultraviolet ray screening agent in the first layer is larger than a content of the ultraviolet ray screening agent in the third layer.

In a specific aspect of the interlayer film according to the present invention, the interlayer film includes the configuration C, and a content of the oxidation inhibitor in the first layer is larger than a content of the oxidation inhibitor in the third layer.

In a specific aspect of the interlayer film according to the present invention, the interlayer film is an interlayer film to be arranged between a first lamination glass member and a second lamination glass member for use.

In a specific aspect of the interlayer film according to the present invention, the interlayer film is an interlayer film to be attached in an opening part between the external space and the internal space in a vehicle, and is an interlayer film to be attached to the opening part in such a manner that the second layer side of the second layer and the third layer is located on the external space side.

In a specific aspect of the interlayer film according to the present invention, the interlayer film is an interlayer film to be attached in an opening part between the external space and the internal space in a vehicle, and is an interlayer film to be attached to the opening part in such a manner that one end side of the widthwise direction is located on the upper side of the opening part.

In a specific aspect of the interlayer film according to the present invention, the interlayer film contains a thermoplastic resin.

In a specific aspect of the interlayer film according to the present invention, the thermoplastic resin is a polyvinyl acetal resin.

In a specific aspect of the interlayer film according to the present invention, the interlayer film contains a plasticizer.

According to a broad aspect of the present invention, there is provided a laminated glass including a first lamination glass member, a second lamination glass member and the interlayer film for laminated glass described above, the interlayer film for laminated glass being arranged between the first lamination glass member and the second lamination glass member.

In a specific aspect of the laminated glass according to the present invention, the laminated glass is used as side glass, roof glass or glass for backlight in automobiles.

In a specific aspect of the laminated glass according to the present invention, the laminated glass is laminated glass that is to be used as glass for windshield, and black coating is not applied on the making surface between interlayer film and a lamination glass member on the body side.

Effect of the Invention

The interlayer film for laminated glass according to the present invention has a lengthwise direction and a widthwise direction, and includes the configuration A, the configuration B or the configuration C. Since the interlayer film for laminated glass according to the present invention has the above configuration, it is possible to prevent generation of a void in the interlayer film in an end part of laminated glass.

BRIEF DESCRIPTION OF DRAWINGS

FIG. 1 is a sectional view schematically showing an interlayer film for laminated glass in accordance with a first embodiment of the present invention.

FIG. 2 is a sectional view schematically showing an interlayer film for laminated glass in accordance with a second embodiment of the present invention.

FIG. 3 is a sectional view schematically showing an interlayer film for laminated glass in accordance with a third embodiment of the present invention.

FIG. 4 is a sectional view schematically showing an interlayer film for laminated glass in accordance with a fourth embodiment of the present invention.

FIG. 5 is a sectional view schematically showing an example of laminated glass prepared with the interlayer film for laminated glass shown in FIG. 1.

FIG. 6 is a sectional view schematically showing an example of laminated glass prepared with the interlayer film for laminated glass shown in FIG. 2.

FIG. 7 is a sectional view schematically showing an example of laminated glass prepared with the interlayer film for laminated glass shown in FIG. 3.

FIG. 8 is a sectional view schematically showing an example of laminated glass prepared with the interlayer film for laminated glass shown in FIG. 4.

MODE(S) FOR CARRYING OUT THE INVENTION

Hereinafter, the present invention will be described in detail.

The interlayer film for laminated glass according to the present invention (hereinafter, sometimes described as interlayer film) has a lengthwise direction and a widthwise direction.

The interlayer film according to the present invention includes the following configuration A, configuration B or configuration C. That is, the interlayer film according to the present invention includes at least one configuration among the following configuration A, configuration B and configuration C. The interlayer film according to the present invention contains a light stabilizer, an ultraviolet ray screening agent, or an oxidation inhibitor. That is, the interlayer film according to the present invention contains at least one of a light stabilizer, an ultraviolet ray screening agent, and an oxidation inhibitor.

Configuration A: "containing a light stabilizer, and having such a distribution in content of the light stabilizer in the widthwise direction that the content of the light stabilizer is larger in one end side of the widthwise direction"

Configuration B: "containing an ultraviolet ray screening agent, and having such a distribution in content of the ultraviolet ray screening agent in the widthwise direction that the content of the ultraviolet ray screening agent is larger in one end side of the widthwise direction"

Configuration C: "containing an oxidation inhibitor, and having such a distribution in content of the oxidation inhibitor in the widthwise direction that the content of the oxidation inhibitor is larger in one end side of the widthwise direction"

The interlayer film according to the present invention may include the configuration A, may include the configuration B, may include the configuration C, may include the configuration A and the configuration B, may include the configuration B and the configuration C, may include the configuration A and the configuration C, and may include the configuration A, the configuration B and the configuration C. In the present specification, the interlayer film including the configuration A is sometimes described as interlayer film A, the interlayer film including the configuration B is sometimes described as interlayer film B, and the interlayer film including the configuration C is sometimes described as interlayer film C.

It is preferred that the interlayer film A have such a distribution in content of the light stabilizer in the widthwise direction that the content of the light stabilizer is larger in a first region extending for 5% inwardly from one end of the widthwise direction, for example. The interlayer film A has a region where the content of the light stabilizer is smaller than the content of the light stabilizer in one end side of the widthwise direction.

It is preferred that the interlayer film B have such a distribution in content of the ultraviolet ray screening agent in the widthwise direction that the content of the ultraviolet ray screening agent is larger in a first region extending for 5% inwardly from one end of the widthwise direction, for example. The interlayer film B has a region where the content of the ultraviolet ray screening agent is smaller than the content of the ultraviolet ray screening agent in one end side of the widthwise direction.

It is preferred that the interlayer film C have such a distribution in content of the oxidation inhibitor in the widthwise direction that the content of the oxidation inhibitor is larger in a first region extending for 5% inwardly from one end of the widthwise direction, for example. The interlayer film C has a region where the content of the oxidation inhibitor is smaller than the content of the oxidation inhibitor in one end side of the widthwise direction.

Since the interlayer film according to the present invention has the above configuration, it is possible to prevent generation of a void in the interlayer film in an end part of laminated glass, and it is possible to keep the appearance of laminated glass excellent.

For example, even when laminated glass prepared with the interlayer film according to the present invention is arranged so that the colored part is located upside, it is possible to prevent generation of a void in the interlayer film in an end part of laminated glass. Further, it is possible to prevent generation of a void in the interlayer film in an end part of laminated glass even when a covering material is not arranged on the upper end of laminated glass.

When the interlayer film according to the present invention includes the configuration A, it is preferred that the interlayer film A have the following configuration. It is preferred that the interlayer film A contain the light stabilizer in a first region extending for 5% inwardly from one end of the widthwise direction; do not contain or contain the light stabilizer in a second region extending for 5% inwardly from the other end opposite to the one end of the widthwise direction; and a content of the light stabilizer in the entire first region be larger than a content of the light stabilizer in the entire second region. In this case, it is possible to further prevent generation of a void in the interlayer film in an end part of laminated glass. A content of the light stabilizer in the first region is an average content of the light stabilizer in the first region. A content of the light stabilizer in the second region is an average content of the light stabilizer in the second region. In this case, the interlayer film A includes the following configuration A1 or the following configuration A2, preferably the configuration A2.

Configuration A1: the interlayer film contains the light stabilizer in the first region, and does not contain the light stabilizer in the second region.

Configuration A2: the interlayer film contains the light stabilizer both in the first region and in the second region, and a content of the light stabilizer in the entire first region is larger than a content of the light stabilizer in the entire second region.

From the viewpoint of further preventing generation of a void in the interlayer film in an end part of laminated glass, a content of the light stabilizer in the entire first region is preferably 0.00001% by weight or more, more preferably 0.0001% by weight or more, further preferably 0.001% by weight or more, especially preferably 0.01% by weight or more, most preferably 0.03% by weight or more. A content of the light stabilizer in the entire first region is preferably 0.2% by weight or less, more preferably 0.1% by weight or less, further preferably 0.08% by weight or less. A content of the light stabilizer is quantified by analyzing the composition of the interlayer film by using gas chromatography or liquid chromatography.

From the viewpoint of further preventing generation of a void in the interlayer film in an end part of laminated glass, a ratio of a content of the light stabilizer in the entire first region to a content of the light stabilizer in the entire second region on a weight basis is preferably 0.001 or more, more preferably 0.005 or more, further preferably 0.01 or more. A ratio of a content of the light stabilizer in the entire first region to a content of the light stabilizer in the entire second region on a weight basis is preferably 100 or less, more preferably 50 or less, further preferably 10 or less, especially preferably 5 or less.

When the interlayer film according to the present invention includes the configuration B, it is preferred that the interlayer film B have the following configuration. It is preferred that the interlayer film B contain the ultraviolet ray screening agent in a first region extending for 5% inwardly from one end of the widthwise direction; do not contain or contain the ultraviolet ray screening agent in a second region extending for 5% inwardly from the other end opposite to the one end of the widthwise direction; and a content of the ultraviolet ray screening agent in the entire first region be larger than a content of the ultraviolet ray screening agent in the entire second region. In this case, it is possible to further prevent generation of a void in the interlayer film in an end part of laminated glass. A content of the ultraviolet ray screening agent in the first region is an average content of the ultraviolet ray screening agent in the first region. A content of the ultraviolet ray screening agent in the second region is an average content of the ultraviolet ray screening agent in the second region. In this case, the interlayer film B includes the following configuration B1 or the following configuration B2, preferably the configuration B2.

Configuration B1: the interlayer film contains the ultraviolet ray screening agent in the first region, and does not contain the ultraviolet ray screening agent in the second region.

Configuration B2: the interlayer film contains the ultraviolet ray screening agent both in the first region and in the second region, and a content of the ultraviolet ray screening agent in the entire first region is larger than a content of the ultraviolet ray screening agent in the entire second region.

From the viewpoint of further preventing generation of a void in the interlayer film in an end part of laminated glass, a content of the ultraviolet ray screening agent in the entire first region is preferably 0.01% by weight or more, more preferably 0.1% by weight or more, further preferably 0.2% by weight or more, especially preferably 0.3% by weight or more, most preferably 0.5% by weight or more. A content of the ultraviolet ray screening agent in the entire first region is preferably 2.5% by weight or less, more preferably 2% by weight or less, further preferably 1% by weight or less, especially preferably 0.8% by weight or less. A content of the ultraviolet ray screening agent is quantified by analyzing the composition of the interlayer film by using gas chromatography or liquid chromatography.

From the viewpoint of further preventing generation of a void in the interlayer film in an end part of laminated glass, a ratio of a content of the ultraviolet ray screening agent in the entire first region to a content of the ultraviolet ray screening agent in the entire second region on a weight basis is preferably 0.001 or more, more preferably 0.005 or more, further preferably 0.01 or more. A ratio of a content of the ultraviolet ray screening agent in the entire first region to a content of the ultraviolet ray screening agent in the entire second region on a weight basis is preferably 100 or less, more preferably 50 or less, further preferably 10 or less, especially preferably 5 or less.

When the interlayer film according to the present invention includes the configuration C, it is preferred that the interlayer film C have the following configuration. It is preferred that the interlayer film C contain the oxidation inhibitor in a first region extending for 5% inwardly from one end of the widthwise direction; do not contain or contain the oxidation inhibitor in a second region extending for 5% inwardly from the other end opposite to the one end of the widthwise direction; and a content of the oxidation inhibitor in the entire first region be larger than a content of the oxidation inhibitor in the entire second region. In this case, it is possible to further prevent generation of a void in the interlayer film in an end part of laminated glass. A content of the oxidation inhibitor in the first region is an average content of the oxidation inhibitor in the first region. A content of the oxidation inhibitor in the second region is an average content of the oxidation inhibitor in the second region. In this case, the interlayer film C includes the following configuration C1 or the following configuration C2, preferably the configuration C2.

Configuration C1: the interlayer film contains the oxidation inhibitor in the first region, and does not contain the oxidation inhibitor in the second region.

Configuration C2: the interlayer film contains the oxidation inhibitor both in the first region and in the second region, and a content of the oxidation inhibitor in the entire first region is larger than a content of the oxidation inhibitor in the entire second region.

From the viewpoint of further preventing generation of a void in the interlayer film in an end part of laminated glass, a content of the oxidation inhibitor in the entire first region is preferably 0.001% by weight or more, more preferably 0.01% by weight or more, further preferably 0.03% by weight or more, especially preferably 0.04% by weight or more, most preferably 0.1% by weight or more. A content of the oxidation inhibitor in the entire first region is preferably 5% by weight or less, more preferably 2% by weight or less, further preferably 1.5% by weight or less. A content of the oxidation inhibitor is quantified by analyzing the composition of the interlayer film by using gas chromatography or liquid chromatography.

From the viewpoint of further preventing generation of a void in the interlayer film in an end part of laminated glass, a ratio of a content of the oxidation inhibitor in the entire first region to a content of the oxidation inhibitor in the entire second region on a weight basis is preferably 0.001 or more, more preferably 0.005 or more, further preferably 0.01 or more. A ratio of a content of the oxidation inhibitor in the entire first region to a content of the oxidation inhibitor in the entire second region on a weight basis is preferably 100 or less, more preferably 50 or less, further preferably 10 or less, especially preferably 5 or less.

The interlayer film may have a colored part that is colored in plan view, and a non-colored part that is not colored in plan view. The interlayer film may have a colored part that is colored in plan view in one end side of the widthwise direction, and may have a non-colored part that is not colored in plan view in the other end side opposite to the one end of the widthwise direction. In the colored part, there may be a colored portion and a non-colored portion in the thickness direction of the interlayer film. In this case, the part that is colored in plan view is a colored part including the colored portion and the uncolored portion (for example, the right side part of the broken line in FIGS. 1, 2).

When the interlayer film according to the present invention includes the configuration A, it is preferred that the interlayer film A have the following configuration. From the viewpoint of further preventing generation of a void in the interlayer film in an end part of laminated glass, it is preferred that the interlayer film A contain the light stabilizer in the colored part, do not contain or contain the light stabilizer in the non-colored part, and a content of the light stabilizer in the entire colored part be larger than a content of the light stabilizer in the entire non-colored part. A content of the light stabilizer in the entire non-colored part is an average content of the light stabilizer in the non-colored part. A content of the light stabilizer in the entire colored part is an average content of the light stabilizer in the colored part. In this case, the interlayer film A includes the following configuration A3 or the following configuration A4, preferably the configuration A4.

Configuration A3: the interlayer film contains the light stabilizer in the colored part, and does not contain the light stabilizer in the non-colored part.

Configuration A4: the interlayer film contains the light stabilizer both in the colored part and in the non-colored part, and a content of the light stabilizer in the entire colored part is larger than a content of the light stabilizer in the entire non-colored part.

From the viewpoint of further preventing generation of a void in the interlayer film in an end part of laminated glass, a content of the light stabilizer in the entire colored part is preferably 0.00001% by weight or more, more preferably 0.0001% by weight or more, further preferably 0.001% by weight or more, especially preferably 0.01% by weight or more, most preferably 0.03% by weight or more. From the viewpoint of further suppressing the discoloration in the colored part, a content of the light stabilizer in the entire colored part is preferably 0.2% by weight or less, more preferably 0.1% by weight or less, further preferably 0.08% by weight or less.

From the viewpoint of further preventing generation of a void in the interlayer film in an end part of laminated glass, a ratio of a content of the light stabilizer in the entire colored part to a content of the light stabilizer in the entire non-colored part on a weight basis is preferably 0.001 or more, more preferably 0.005 or more, further preferably 0.01 or more. From the viewpoint of further suppressing the discoloration in the colored part, a ratio of a content of the light stabilizer in the entire colored part to a content of the light stabilizer in the entire non-colored part on a weight basis is preferably 100 or less, more preferably 50 or less, further preferably 10 or less, especially preferably 5 or less.

When the interlayer film according to the present invention includes the configuration B, it is preferred that the interlayer film B have the following configuration. From the viewpoint of further preventing generation of a void in the interlayer film in an end part of laminated glass, it is preferred that the interlayer film B contain the ultraviolet ray screening agent in the colored part, do not contain or contain the ultraviolet ray screening agent in the non-colored part, and a content of the ultraviolet ray screening agent in the entire colored part be larger than a content of the ultraviolet ray screening agent in the entire non-colored part. A content of the ultraviolet ray screening agent in the entire non-colored part is an average content of the ultraviolet ray screening agent in the non-colored part. A content of the ultraviolet ray screening agent in the entire colored part is an average content of the ultraviolet ray screening agent in the colored part. In this case, the interlayer film B includes the following configuration B3 or the following configuration B4, preferably the configuration B4.

Configuration B3: the interlayer film contains the ultraviolet ray screening agent in the colored part, and does not contain the ultraviolet ray screening agent in the non-colored part.

Configuration B4: the interlayer film contains the ultraviolet ray screening agent both in the colored part and in the non-colored part, and a content of the ultraviolet ray screening agent in the entire colored part is larger than a content of the ultraviolet ray screening agent in the entire non-colored part.

From the viewpoint of further preventing generation of a void in the interlayer film in an end part of laminated glass, a content of the ultraviolet ray screening agent in the entire colored part is preferably 0.01% by weight or more, more preferably 0.1% by weight or more, further preferably 0.2% by weight or more, especially preferably 0.3% by weight or more, most preferably 0.5% by weight or more. From the viewpoint of further suppressing the discoloration in the colored part, a content of the ultraviolet ray screening agent in the entire colored part is preferably 2.5% by weight or less, more preferably 2% by weight or less, further preferably 1% by weight or less, especially preferably 0.8% by weight or less.

From the viewpoint of further preventing generation of a void in the interlayer film in an end part of laminated glass, a ratio of a content of the ultraviolet ray screening agent in the entire colored part to a content of the ultraviolet ray screening agent in the entire non-colored part on a weight basis is preferably 0.001 or more, more preferably 0.005 or more, further preferably 0.01 or more. From the viewpoint of further suppressing the discoloration in the colored part, a ratio of a content of the ultraviolet ray screening agent in the entire colored part to a content of the ultraviolet ray screening agent in the entire non-colored part on a weight basis is preferably 100 or less, more preferably 50 or less, further preferably 10 or less, especially preferably 5 or less.

When the interlayer film according to the present invention includes the configuration C, it is preferred that the interlayer film C have the following configuration. From the viewpoint of further preventing generation of a void in the interlayer film in an end part of laminated glass, it is preferred that the interlayer film C contain the oxidation inhibitor in the colored part, do not contain or contain the oxidation inhibitor in the non-colored part, and a content of the oxidation inhibitor in the entire colored part be larger than a content of the oxidation inhibitor in the entire non-colored part. A content of the oxidation inhibitor in the entire non-colored part is an average content of the oxidation inhibitor in the non-colored part. A content of the oxidation inhibitor in the entire colored part is an average content of the oxidation inhibitor in the colored part. In this case, the interlayer film C includes the following configuration C3 or the following configuration C4, preferably the configuration C4.

Configuration C3: the interlayer film contains the oxidation inhibitor in the colored part, and does not contain the oxidation inhibitor in the non-colored part.

Configuration C4: the interlayer film contains the oxidation inhibitor both in the colored part and in the non-colored part, and a content of the oxidation inhibitor in the entire colored part is larger than a content of the oxidation inhibitor in the entire non-colored part.

From the viewpoint of further preventing generation of a void in the interlayer film in an end part of laminated glass, a content of the oxidation inhibitor in the entire colored part is preferably 0.001% by weight or more, more preferably 0.01% by weight or more, further preferably 0.03% by weight or more, especially preferably 0.04% by weight or more, most preferably 0.1% by weight or more. From the viewpoint of further suppressing the discoloration in the colored part, a content of the oxidation inhibitor in the entire colored part is preferably 5% by weight or less, more preferably 2% by weight or less, further preferably 1.5% by weight or less.

From the viewpoint of further preventing generation of a void in the interlayer film in an end part of laminated glass, a ratio of a content of the oxidation inhibitor in the entire colored part to a content of the oxidation inhibitor in the entire non-colored part on a weight basis is preferably 0.001 or more, more preferably 0.005 or more, further preferably 0.01 or more. From the viewpoint of further suppressing the discoloration in the colored part, a ratio of a content of the oxidation inhibitor in the entire colored part to a content of the oxidation inhibitor in the entire non-colored part on a weight basis is preferably 100 or less, more preferably 50 or less, further preferably 10 or less, especially preferably 5 or less.

It is preferred that the interlayer film be arranged between a first lamination glass member and a second lamination glass member for use. By arranging the interlayer film between a first lamination glass member and a second lamination glass member, laminated glass can be obtained.

In an end part of the laminated glass, there may be a part where the lateral surface of the interlayer film is exposed. Even when the lateral surface of the interlayer film is exposed, it is possible to suppress the discoloration in the colored part, it is possible to prevent generation of a void in an end part of laminated glass, and it is possible to keep the appearance of laminated glass excellent in the present invention. In an end part of the laminated glass, there may be a part where the lateral surface of the interlayer film is not exposed.

It is preferred that the interlayer film be an interlayer film to be attached in an opening part between the external space and the internal space in a vehicle. It is more preferred that the interlayer film be an interlayer film to be attached in an opening part between the external space and the internal space in an automobile.

Since the colored part is colored, it is general that a visible light transmittance of the colored part be lower than a visible light transmittance of the non-colored part. The visible light transmittance of the colored part may be, for example, less than 70%. The visible light transmittance of the non-colored part may be, for example, 70% or more. The visible light transmittance of the non-colored part is preferably 70% or more, more preferably 80% or more, further preferably 85% or more.

The visible light transmittance is measured at a wavelength ranging from 380 to 780 nm by using a spectrophotometer ("U-4100" available from Hitachi High-Tech Science Corporation) in conformity with JIS R3211:1998. The visible light transmittance of the interlayer film may be measured while the interlayer film is arranged between two sheets of clear glass.

It is preferred that the interlayer film include a plurality of layers in one end side of the widthwise direction. It is preferred that the interlayer film include a plurality of layers in the colored part. In this case, the interlayer film may include a colored layer containing a coloring agent, and a layer other than the colored layer in the colored part.

From the viewpoint of further suppressing the discoloration in the colored part, it is preferred that a content of the light stabilizer in the colored layer be smaller than a content of the light stabilizer in the layer other than the colored layer in the interlayer film A. When the colored layer is embedded in other layer, and when the colored layer is in contact with other layer, from the viewpoint of further suppressing the discoloration in the colored part, it is preferred that a content of the light stabilizer in the colored layer be smaller than a content of the light stabilizer in the layer with which the colored layer is in contact.

From the viewpoint of further suppressing the discoloration in the colored part, it is preferred that a content of the ultraviolet ray screening agent in the colored layer be smaller than a content of the ultraviolet ray screening agent in the layer other than the colored layer in the interlayer film B. When the colored layer is embedded in other layer, and when the colored layer is in contact with other layer, from the viewpoint of further suppressing the discoloration in the colored part, it is preferred that a content of the ultraviolet ray screening agent in the colored layer be smaller than a content of the ultraviolet ray screening agent in the layer with which the colored layer is in contact.

From the viewpoint of further suppressing the discoloration in the colored part, it is preferred that a content of the oxidation inhibitor in the colored layer be smaller than a content of the oxidation inhibitor in the layer other than the colored layer in the interlayer film C. When the colored layer is embedded in other layer, and when the colored layer is in contact with other layer, from the viewpoint of further suppressing the discoloration in the colored part, it is preferred that a content of the oxidation inhibitor in the colored layer be smaller than a content of the oxidation inhibitor in the layer with which the colored layer is in contact.

In the interlayer film, it is preferred that a number of layers in one end side of the widthwise direction be different from a number of layers in the other end side of the widthwise direction. In the interlayer film, it is preferred that a number of layers in the colored part be different from a number of layers in the non-colored part.

From the viewpoint of further enhancing the sound shielding property, it is preferred that the interlayer film include a layer having a glass transition temperature of 10° C. or less.

The glass transition temperature is measured in the following manner.

After storing an interlayer film at a temperature of 23° C. and a humidity of 30% for 1 month or more, a plurality of layers are isolated by peeling off and press-molded with a press molding machine to obtain an object to be measured in the case of a multi-layered interlayer film. With regard to the object to be measured, the measurement is performed using the "ARES-G2" available from TA Instruments. In this connection, when the interlayer film is a single-layered interlayer film, the interlayer film is cut so as to have a diameter of 8 mm to be measured. A parallel plate with a diameter of 8 mm is used as a jig, and the measurement is performed under the condition in which the temperature is decreased from 100° C. to −10° C. at a temperature decreasing rate of 3° C./minute and under the condition of a frequency of 1 Hz and a strain of 1%. In the measurement results obtained, the peak temperature of the loss tangent is defined as the glass transition temperature Tg (° C.).

Since the characteristics of the interlayer film can be controlled by the plurality of layers, it is preferred that the interlayer film include a first layer, and a second layer arranged on a first surface side of the first layer.

From the viewpoint of effectively enhancing the sound shielding property, it is preferred that the first layer have a glass transition temperature of 10° C. or less.

From the viewpoint of further preventing generation of a void in the interlayer film in an end part of laminated glass, it is preferred that a content of the light stabilizer in the first layer be larger than a content of the light stabilizer in the second layer in the interlayer film A.

From the viewpoint of further preventing generation of a void in the interlayer film in an end part of laminated glass, it is preferred that a content of the ultraviolet ray screening agent in the first layer be larger than a content of the ultraviolet ray screening agent in the second layer in the interlayer film B.

From the viewpoint of further preventing generation of a void in the interlayer film in an end part of laminated glass, it is preferred that a content of the oxidation inhibitor in the first layer be larger than a content of the oxidation inhibitor in the second layer in the interlayer film C.

Since the color tone of the interlayer film is easily controlled, it is preferred that the interlayer film include a colored layer containing a coloring agent (first colored layer) in the colored part. It is preferred that the colored layer be embedded in the first layer, or be embedded in the second layer, or the colored layer be arranged between the first layer and the second layer, or the colored layer be arranged on a side opposite to the first layer side of the second layer.

From the viewpoint of further preventing generation of a void in the interlayer film in an end part of laminated glass, the following configurations 1) to 12) are preferred. 1) When the colored layer is embedded in the first layer, it is preferred that a content of the light stabilizer in the colored layer be smaller than a content of the light stabilizer in the first layer. 2) When the colored layer is embedded in the first layer, it is preferred that a content of the ultraviolet ray screening agent in the colored layer be smaller than a content of the ultraviolet ray screening agent in the first layer. 3) When the colored layer is embedded in the first layer, it is preferred that a content of the oxidation inhibitor in the colored layer be smaller than a content of the oxidation inhibitor in the first layer. 4) When the colored layer is embedded in the second layer, it is preferred that a content of the light stabilizer in the colored layer be smaller than a content of the light stabilizer in the second layer. 5) When the colored layer is embedded in the second layer, it is preferred that a content of the ultraviolet ray screening agent in the colored layer be smaller than a content of the ultraviolet ray screening agent in the second layer. 6) When the colored layer is embedded in the second layer, it is preferred that a content of the oxidation inhibitor in the colored layer be smaller than a content of the oxidation inhibitor in the second layer. 7) When the colored layer is arranged between the first layer and the second layer, it is preferred that a content of the light stabilizer in the colored layer be smaller than a content of the light stabilizer in the first layer, and a content of the light stabilizer in the colored layer be smaller than a content of the light stabilizer in the second layer. 8) When the colored layer is arranged between the first layer and the second layer, it is preferred that a content of the ultraviolet ray screening agent in the colored layer be smaller than a content of the ultraviolet ray screening agent in the first layer, and a content of the ultraviolet ray screening agent in the colored layer be smaller than a content of the ultraviolet ray screening agent in the second layer. 9) When the colored layer is arranged between the first layer and the second layer, it is preferred that a content of the oxidation inhibitor in the colored layer be smaller than a content of the oxidation inhibitor in the first layer, and a content of the oxidation inhibitor in the colored layer be smaller than a content of the oxidation inhibitor in the second layer. 10) When the colored layer is arranged on a side opposite to the first layer side of the second layer, it is preferred that a content of the light stabilizer in the colored layer be smaller than a content of the light stabilizer in the second layer. 11) When the colored layer is arranged on a side opposite to the first layer side of the second layer, it is preferred that a content of the ultraviolet ray screening agent in the colored layer be smaller than a content of the ultraviolet ray screening agent in the second Layer. 12) When the colored layer is arranged on a side opposite to the first layer side of the second layer, it is preferred that a content of the oxidation inhibitor in the colored layer be smaller than a content of the oxidation inhibitor in the second layer.

The colored layer may be embedded in the first layer, may be embedded in the second layer, may be arranged between the first layer and the second layer, and may be arranged on a side opposite to the first layer side of the second layer. From the viewpoint of further preventing generation of a void in the interlayer film in an end part of laminated glass, it is preferred that the colored layer be embedded in the second layer.

Since the characteristics of the interlayer film can be controlled by the plurality of layers, it is preferred that the interlayer film include a third layer arranged on a second surface side opposite to the first surface of the first layer.

The colored layer (second colored layer) may be embedded in the third layer, and may be arranged on an opposite side of the first layer side of the third layer. From the viewpoint of further preventing generation of a void in the interlayer film in an end part of laminated glass, it is preferred that the colored layer be embedded in the third layer.

From the viewpoint of further preventing generation of a void in the interlayer film in an end part of laminated glass, it is preferred that a content of the light stabilizer in the first layer be larger than a content of the light stabilizer in the third layer in the interlayer film A.

From the viewpoint of further preventing generation of a void in the interlayer film in an end part of laminated glass, it is preferred that a content of the ultraviolet ray screening agent in the first layer be larger than a content of the ultraviolet ray screening agent in the third layer in the interlayer film B.

From the viewpoint of further preventing generation of a void in the interlayer film in an end part of laminated glass, it is preferred that a content of the oxidation inhibitor in the first layer be larger than a content of the oxidation inhibitor in the third layer in the interlayer film C.

When the colored layer is embedded in the third layer, it is preferred that a content of the light stabilizer in the colored layer be smaller than a content of the light stabilizer in the third layer in the interlayer film A. When the coloring agent is arranged on a side opposite to the first layer side of the third layer, it is preferred that a content of the light stabilizer in the colored layer be smaller than a content of the light stabilizer in the third layer.

When the colored layer is embedded in the third layer, it is preferred that a content of the ultraviolet ray screening agent in the colored layer be smaller than a content of the ultraviolet ray screening agent in the third layer in the interlayer film B. When the coloring agent is arranged on a side opposite to the first layer side of the third layer, it is preferred that a content of the ultraviolet ray screening agent in the colored layer be smaller than a content of the ultraviolet ray screening agent in the third layer.

When the colored layer is embedded in the third layer, it is preferred that a content of the oxidation inhibitor in the colored layer be smaller than a content of the oxidation inhibitor in the third layer in the interlayer film C. When the coloring agent is arranged on a side opposite to the first layer side of the third layer, it is preferred that a content of the oxidation inhibitor in the colored layer be smaller than a content of the oxidation inhibitor in the third layer.

From the viewpoint of further preventing generation of a void in the interlayer film in an end part of laminated glass, it is preferred that the interlayer film be an interlayer film to be attached to the opening part in such a manner that the second layer side of the first layer and the second layer is located on the external space side. From the viewpoint of further preventing generation of a void in the interlayer film in an end part of laminated glass, it is preferred that the interlayer film be an interlayer film to be attached to the opening part in such a manner that the second layer side of the second layer and the third layer is located on the external space side.

From the viewpoint of effectively suppressing light transmission in the colored part, it is preferred that the interlayer film have the aforementioned colored part in an end part, and it is preferred that the interlayer film be an interlayer film to be attached to the opening part in such a manner that colored part is located on the upper side of the opening part.

Hereinafter, specific embodiments of the present invention will be described.

FIG. 1 is a sectional view schematically showing an interlayer film for laminated glass in accordance with a first embodiment of the present invention.

An interlayer film 1 shown in FIG. 1 is used for obtaining laminated glass. The interlayer film 1 is an interlayer film for laminated glass.

The interlayer film 1 includes a first layer 11, a second layer 12 and a third layer 13. The second layer 12 is arranged on a first surface side (one surface) of the first layer 11. The second layer 12 is layered on the first surface of the first layer 11. The first layer 11 and the second layer 12 are in contact with each other. The third layer 13 is arranged on a second surface side opposite to the first surface of the first layer 11. The third layer 13 is layered on the second surface of the first layer 11. The first layer 11 and the third layer 13 are in contact with each other. The first layer 11 is arranged between the second layer 12 and the third layer 13 to be sandwiched therebetween.

In this connection, other layers may be arranged between the first layer 11 and the second layer 12 and between the first layer 11 and the third layer 13, respectively. It is preferred that the first layer 11 and the second layer 12, and the first layer 11 and the third layer 13 be directly layered, respectively.

The interlayer film 1 has a lengthwise direction and a widthwise direction. The right and left direction of FIG. 1 is the widthwise direction. When the interlayer film 1 includes the configuration A, the interlayer film 1 contains a light stabilizer. In this case, the interlayer film 1 has such a distribution in content of the light stabilizer in the widthwise direction that the content of the light stabilizer is larger in one end side of the widthwise direction (right side in FIG. 1). When the interlayer film 1 includes the configuration B, the interlayer film 1 contains an ultraviolet ray screening agent. In this case, the interlayer film 1 has such a distribution in content of the ultraviolet ray screening agent in the widthwise direction that the content of the ultraviolet ray screening agent is larger in one end side of the widthwise direction (right side in FIG. 1). When the interlayer film 1 includes the configuration C, the interlayer film 1 contains an oxidation inhibitor. The interlayer film 1 has such a distribution in content of the oxidation inhibitor in the widthwise direction that the content of the oxidation inhibitor is larger in one end side of the widthwise direction (right side in FIG. 1).

The interlayer film 1 includes a colored layer 14 containing a coloring agent. The colored layer 14 is embedded in the second layer 12. In one end side of the interlayer film 1, the colored layer 14 is embedded in the second layer 12. The interlayer film 1 has a lengthwise direction and a widthwise direction. In one end side of the widthwise direction of the interlayer film 1, the colored layer 14 is embedded in the second layer 12.

The interlayer film may include only one colored layer, or may include a plurality of colored layers. The colored layer may be embedded in the first layer, may be arranged between the first layer and the second layer, may be arranged on a side opposite to the first layer side of the second layer, may be embedded in the third layer, may be arranged between the first layer and the third layer, and may be arranged on a side opposite to the first layer side of the third layer.

The interlayer film 1 has a colored part X that is colored in plan view, in the part including the colored layer 14. The interlayer film 1 has a non-colored part Y that is not colored in plan view, in the part not including the colored layer 14. The entire part on the right side of the broken line in FIG. 1 is called colored part X. The entire part on the left side of the broken line in FIG. 1 is called non-colored part Y.

The interlayer film 1 has a multilayer structure in which the second layer 12, the colored layer 14, the second layer 12, the first layer 11, and the third layer 13 are arranged in this order in the colored part X. The interlayer film 1 has a five-layer structure in the colored part X.

The interlayer film 1 has a multilayer structure in which the second layer 12, the first layer 11, and the third layer 13 are arranged in this order in the non-colored part Y. The interlayer film 1 has a three-layer structure in the non-colored part Y.

It is preferred that an outer surface on the opposite side of the first layer 11 side of the second layer 12 be a surface on which a lamination glass member is laminated. It is preferred that an outer surface on the opposite side of the first layer 11 side of the third layer 13 be a surface on which a lamination glass member is laminated.

FIG. 2 is a sectional view schematically showing an interlayer film for laminated glass in accordance with a second embodiment of the present invention.

An interlayer film 1A shown in FIG. 2 includes a first layer 11A.

The interlayer film 1A has a lengthwise direction and a widthwise direction. The right and left direction of FIG. 2 is the widthwise direction. When the interlayer film 1A includes the configuration A, the interlayer film 1A contains a light stabilizer. In this case, the interlayer film 1A has such a distribution in content of the light stabilizer in the widthwise direction that the content of the light stabilizer is larger in one end side of the widthwise direction (right side in FIG. 2). When the interlayer film 1A includes the configuration B, the interlayer film 1A contains an ultraviolet ray screening agent. In this case, the interlayer film 1A has such a distribution in content of the ultraviolet ray screening agent in the widthwise direction that the content of the ultraviolet ray screening agent is larger in one end side of the widthwise direction (right side in FIG. 2). When the interlayer film 1A includes the configuration C, the interlayer film 1A contains an oxidation inhibitor. In this case, the interlayer film 1A has such a distribution in content of the oxidation inhibitor in the widthwise direction that the content of the oxidation inhibitor is larger in one end side of the widthwise direction (right side in FIG. 2).

The interlayer film 1A includes a colored layer 14A containing a coloring agent. The colored layer 14A is embedded in the first layer 11A.

The interlayer film 1A has a colored part X that is colored in plan view, in the part including the colored layer 14A. The interlayer film 1A has a non-colored part Y that is not colored in plan view, in the part not including the colored layer 14A.

The interlayer film 1A has a multilayer structure including the first layer 11, the colored layer 14 and the first layer 11 in the colored part X. The interlayer film 1A has a three-layer structure in the colored part X.

The interlayer film 1A has a monolayer structure of only the first layer 11 in the non-colored part Y. The interlayer film 1A has a one-layer structure in the non-colored part Y.

FIG. 3 is a sectional view schematically showing an interlayer film for laminated glass in accordance with a third embodiment of the present invention.

An interlayer film 1B shown in FIG. 3 includes a first layer 11B, a second layer 12B and a third layer 13B. The second layer 12B is arranged on a first surface side (one surface) of the first layer 11B. The second layer 12B is layered on the first surface of the first layer 11B. The first layer 11B and the second layer 12B are in contact with each other. The third layer 13B is arranged on a second surface side opposite to the first surface of the first layer 11B. The third layer 13B is layered on the second surface of the first layer 11B. The first layer 11B and the third layer 13B are in contact with each other. The first layer 11B is arranged between the second layer 12B and the third layer 13B to be sandwiched therebetween.

In this connection, other layers may be arranged between the first layer 11B and the second layer 12B and between the first layer 11B and the third layer 13B, respectively.

The interlayer film 1B has a lengthwise direction and a widthwise direction. The right and left direction of FIG. 3 is the widthwise direction. When the interlayer film 1B includes the configuration A, the interlayer film 1B contains a light stabilizer. In this case, the interlayer film 1B has such a distribution in content of the light stabilizer in the widthwise direction that the content of the light stabilizer is larger in one end side of the widthwise direction (right side in FIG. 3). When the interlayer film 1B includes the configuration B, the interlayer film 1B contains an ultraviolet ray screening agent. In this case, the interlayer film 1B has such a distribution in content of the ultraviolet ray screening agent in the widthwise direction that the content of the ultraviolet ray screening agent is larger in one end side of the widthwise direction (right side in FIG. 3). When the interlayer film 1B includes the configuration C, the interlayer film 1B contains an oxidation inhibitor. In this case, the interlayer film 1B has such a distribution in content of the oxidation inhibitor in the widthwise direction that the content of the oxidation inhibitor is larger in one end side of the widthwise direction (right side in FIG. 3).

The interlayer film 1B does not include a colored layer. The interlayer film 1B has a multilayer structure in which the second layer 12B, the first layer 11B, and the third layer 13B are arranged in this order. The interlayer film 1B has a three-layer structure.

FIG. 4 is a sectional view schematically showing an interlayer film for laminated glass in accordance with a fourth embodiment of the present invention.

An interlayer film 1C shown in FIG. 4 includes a first layer 11C.

The interlayer film 1C has a lengthwise direction and a widthwise direction. The right and left direction of FIG. 4 is the widthwise direction. When the interlayer film 1C includes the configuration A, the interlayer film 1C contains a light stabilizer. In this case, the interlayer film 1C has such a distribution in content of the light stabilizer in the widthwise direction that the content of the light stabilizer is larger in one end side of the widthwise direction (right side in FIG. 4). When the interlayer film 1C includes the configuration p interlayer film 1C contains an ultraviolet ray screening agent. In this case, the interlayer film 1C has such a distribution in content of the ultraviolet ray screening agent in the widthwise direction that the content of the ultraviolet ray screening agent is larger in one end side of the widthwise direction (right side in FIG. 4). When the interlayer film 1C includes the configuration C, the interlayer film 1C contains an oxidation inhibitor. In this case, the interlayer film 1C has such a distribution in content of the oxidation inhibitor in the widthwise direction that the content of the oxidation inhibitor is larger in one end side of the widthwise direction (right side in FIG. 4).

The interlayer film 1C does not include a colored layer. The interlayer film 1C has a monolayer structure of only the first layer 11C. The interlayer film 1C has a one-layer structure.

The interlayer film has a one-layer structure or a two or more-layer structure. The interlayer film may have a one-layer structure and may have a two or more-layer structure. The interlayer film may have a two-layer structure, may have a three or more-layer structure, may have a four or more-layer structure, may have a five or more-layer structure, and may have a six or more-layer structure. The interlayer may be an interlayer film having a one-layer structure including only a first layer (single-layered interlayer film) and may be an interlayer film having two or more-layer structure including a first layer and other layer (multi-layered interlayer film). The interlayer film may have these structures in part of the interlayer film or in the entire interlayer film. The structure of the interlayer film may partially vary.

Hereinafter, the details of the first layer (including a single-layered interlayer film), the second layer, the third layer, and the colored layer constituting the interlayer film, and the details of each ingredient contained in the first layer, the second layer, the third layer, and the colored layer will be described.

(Thermoplastic Resin)

It is preferred that the interlayer film contain a thermoplastic resin (hereinafter, sometimes described as a thermoplastic resin (0)). It is preferred that the interlayer film contain a polyvinyl acetal resin (hereinafter, sometimes described as a polyvinyl acetal resin (0)) as the thermoplastic resin (0). It is preferred that the first layer contain a thermoplastic resin (hereinafter, sometimes described as a thermoplastic resin (1)). It is preferred that the first layer contain a polyvinyl acetal resin (hereinafter, sometimes described as a polyvinyl acetal resin (1)) as the thermoplastic resin (1). It is preferred that the second layer contain a thermoplastic resin (hereinafter, sometimes described as a thermoplastic resin (2)). It is preferred that the second layer contain a polyvinyl acetal resin (hereinafter, sometimes described as a polyvinyl acetal resin (2)) as the thermoplastic resin (2). It is preferred that the third layer contain a thermoplastic resin (hereinafter, sometimes described as a thermoplastic resin (3)). It is preferred that the third layer contain a polyvinyl acetal resin (hereinafter, sometimes described as a polyvinyl acetal resin (3)) as the thermoplastic resin (3). It is preferred that the colored layer contain a thermoplastic resin (hereinafter, sometimes described as a thermoplastic resin (4)). It is preferred that the colored layer contain a polyvinyl acetal resin (hereinafter, sometimes described as a polyvinyl acetal resin (4)) as the thermoplastic resin (4). The thermoplastic resin (1), the thermoplastic resin (2), the thermoplastic resin (3), and the thermoplastic resin (4) may be the same or different from one another. For still higher sound insulating properties, it is preferred that the thermoplastic resin (1) be different from the thermoplastic resin (2) and the thermoplastic resin (3). Each of the polyvinyl acetal resin (1), the polyvinyl acetal resin (2), the polyvinyl acetal resin (3), and the thermoplastic resin (4) may be the same or different from one another. For still higher sound insulating properties, it is preferred that the polyvinyl acetal resin (1) be different from the polyvinyl acetal resin (2) and the polyvinyl acetal resin (3). One kind of each of the thermoplastic resin (0), the thermoplastic resin (1), the thermoplastic resin (2), the thermoplastic resin (3), and the thermoplastic resin (4) may be used alone and two or more kinds thereof may be used in combination. One kind of each of the polyvinyl acetal resin (0), the polyvinyl acetal resin (1), the polyvinyl acetal resin (2), the polyvinyl acetal resin (3), and the polyvinyl acetal resin (4) may be used alone and two or more kinds thereof may be used in combination.

Examples of the thermoplastic resin include a polyvinyl acetal resin, an ethylene-vinyl acetate copolymer resin, an ethylene-acrylic acid copolymer resin, a polyurethane resin, an ionomer resin, a polyvinyl alcohol resin, and the like. Thermoplastic resins other than these may be used.

For example, the polyvinyl acetal resin can be produced by acetalizing polyvinyl alcohol (PVA) with an aldehyde. It is preferred that the polyvinyl acetal resin be an acetalized product of polyvinyl alcohol. For example, the polyvinyl alcohol can be obtained by saponifying polyvinyl acetate. The saponification degree of the polyvinyl alcohol generally lies within the range of 70 to 99.9% by mole.

From the viewpoint of effectively preventing generation of a void in an end part of laminated glass, and keeping the appearance of laminated glass excellent, it is preferred that the interlayer film contain a polyvinyl butyral resin or an ionomer resin. From the viewpoint of effectively preventing generation of a void in an end part of laminated glass, and keeping the appearance of laminated glass excellent, it is preferred that the polyvinyl acetal resin be a polyvinyl butyral resin. From the viewpoint of effectively preventing generation of a void in an end part of laminated glass, and keeping the appearance of laminated glass excellent, it is preferred that the ionomer resin be a polyvinyl acetal ionomer resin.

The polyvinyl acetal ionomer resin is an ionomerized polyvinyl acetal resin. It is preferred that the polyvinyl acetal ionomer resin contain polyvinyl acetal into which an acid group is introduced.

The polyvinyl acetal ionomer resin has, for example, a —$CH_2$—CH— group in a main chain. The polyvinyl acetal ionomer resin has a polyvinyl acetal skeleton. The polyvinyl acetal skeleton has a —$CH_2$—CH— group in a main chain. To the carbon atom in the "—CH—" moiety in a —$CH_2$—CH— group, another group is bound. In the polyvinyl acetal ionomer resin, it is preferred that —$CH_2$—CH— groups be consecutive in the main chain.

For neutralization in obtaining the polyvinyl acetal ionomer resin, metal is used. From the viewpoint of effectively enhancing the shock resistance at low temperature and the self-repairability, the metal is preferably Na, Li, K, Mg, Zn, Cu, Co, Al, Fe, Ni, Cr or Mn. It is preferred that the metal contain, in particular, Na.

Examples of the method for producing the polyvinyl acetal ionomer resin include the following methods (1) to (3). (1) Method of copolymerizing polyvinyl acetate and a monomer having a group capable of becoming an ionic functional group, saponifying, and acetalizing with aldehyde, followed by ionomerization. (2) Method of acetalizing polyvinyl alcohol (PVA) with an aldehyde having a group capable of becoming an ionic functional group, followed by ionomerization. (3) Method of acetalizing polyvinyl acetal with an aldehyde having a group capable of becoming an ionic functional group, followed by ionomerization.

Examples of the method for ionomerization include a method of adding a metal-containing compound into a solution, and a method of adding a metal-containing compound during kneading. The metal-containing compound may be added in a state of a solution.

It is preferred that the ionic functional group be a carboxyl group, a base of carboxyl group, a sulfonic acid group, a base of sulfonic acid group, a sulfinic acid group, a base of sulfinic acid group, a sulfenic acid group, a base of sulfenic acid group, a phosphoric acid group, a base of phosphoric acid group, a phosphonic acid group, a base of phosphonic acid group, an amino group, or a base of amino group. In this case, the effect of ionomerization effectively appears, and the effect of the present invention effectively appears.

From the viewpoint of effectively enhancing the shock resistance at low temperature and the self-repairability, the polyvinyl acetal ionomer resin has a content of the ionic functional group of preferably 20% by mole or less, more preferably 10% by mole or less, further preferably 5% by mole or less.

The content of the ionic functional group means a sum of a percentage of the group that can become an ionic functional group in the resin, and a percentage of the ionic functional group constituting the metal salt of the ionic functional group. The content of the ionic functional group can be determined by using NMR or the like. For example, the content of the ionic functional group can be calculated from an integrated value of the peak originated from the ionic functional group (appearing around 45 ppm in the carboxyl group) and the peak originated from the main chain appearing around 30 ppm in carbon NMR.

The average polymerization degree of the polyvinyl alcohol (PVA) is preferably 200 or more, more preferably 500 or more, even more preferably 1500 or more, further preferably 1600 or more, especially preferably 2600 or more, most preferably 2700 or more, preferably 5000 or less, more preferably 4000 or less and further preferably 3500 or less. When the average polymerization degree is the above-described lower limit or more, the penetration resistance of laminated glass is further enhanced. When the average polymerization degree is the above upper limit or less, formation of an interlayer film is facilitated.

The average polymerization degree of the polyvinyl alcohol is determined by a method in accordance with JIS K6726 "Testing methods for polyvinyl alcohol".

The number of carbon atoms of the acetal group contained in the polyvinyl acetal resin is not particularly limited. The aldehyde used at the time of producing the polyvinyl acetal resin is not particularly limited. It is preferred that the number of carbon atoms of the acetal group in the polyvinyl acetal resin fall within the range of 3 to 5 and it is more preferred that the number of carbon atoms of the acetal group be 3 or 4. When the number of carbon atoms of the acetal group in the polyvinyl acetal resin is 3 or more, the glass transition temperature of the interlayer film is sufficiently lowered.

The aldehyde is not particularly limited. In general, an aldehyde with 1 to 10 carbon atoms is suitably used. Examples of the aldehyde with 1 to 10 carbon atoms include formaldehyde, acetaldehyde, propionaldehyde, n-butyraldehyde, isobutyraldehyde, n-valeraldehyde, 2-ethylbutyraldehyde, n-hexylaldehyde, n-octylaldehyde, n-nonylaldehyde, n-decylaldehyde, formaldehyde, acetaldehyde, benzaldehyde, and the like. The aldehyde is preferably propionaldehyde, n-butyraldehyde, isobutyraldehyde, n-hexylaldehyde, or n-valeraldehyde, more preferably propionaldehyde, n-butyraldehyde, or isobutyraldehyde, and further preferably n-butyraldehyde. One kind of the aldehyde may be used alone, and two or more kinds thereof may be used in combination.

The content of the hydroxyl group (the amount of hydroxyl groups) of the polyvinyl acetal resin (0) is preferably 15% by mole or more and more preferably 18% by mole or more and is preferably 40% by mole or less and more preferably 35% by mole or less. When the content of the hydroxyl group is the above lower limit or more, the adhesive force of the interlayer film is further enhanced. Moreover, when the content of the hydroxyl group is the above upper limit or less, the flexibility of the interlayer film is enhanced and the handling of the interlayer film is facilitated.

The content of the hydroxyl group (the amount of hydroxyl groups) of the polyvinyl acetal resin (1) is preferably 17% by mole or more, more preferably 20% by mole or more, and further preferably 22% by mole or more and is preferably 28% by mole or less, more preferably 27% by mole or less, further preferably 25% by mole or less, and especially preferably 24% by mole or less. When the content of the hydroxyl group is the above lower limit or more, the mechanical strength of the interlayer film is further enhanced. In particular, when the content of the hydroxyl group of the polyvinyl acetal resin (1) is 20% by mole or more, the resin is high in reaction efficiency and is excellent in productivity, and moreover, when being 28% by mole or less, the sound insulating properties of laminated glass are further enhanced. Moreover, when the content of the hydroxyl group is the above upper limit or less, the flexibility of the interlayer film is enhanced and the handling of the interlayer film is facilitated.

A preferred range of the content of the hydroxyl group of the polyvinyl acetal resin (4) when the colored layer is embedded in the first layer, is the same with a preferred range of the content of the hydroxyl group of the polyvinyl acetal resin (1). A preferred range of the content of the hydroxyl group of the polyvinyl acetal resin (4) when the colored layer is not embedded in the second layer and the third layer and the colored layer is not a surface layer, is the same with a preferred range of the content of the hydroxyl group of the polyvinyl acetal resin (1).

The contents of the hydroxyl group (hydroxyl group amount) of the polyvinyl acetal resin (2) and the polyvinyl acetal resin (3) is preferably 25% by mole or more, more preferably 28% by mole or more, more preferably 30% by mole or more, still more preferably 31.5% by mole or more, further preferably 32% by mole or more, especially preferably 33% by mole or more. The contents of the hydroxyl group (hydroxyl group amount) of the polyvinyl acetal resin (2) and the polyvinyl acetal resin (3) is preferably 38% by mole or less, more preferably 37% by mole or less, further preferably 36.5% by mole or less, especially preferably 36% by mole or less. When the content of the hydroxyl group is the above lower limit or more, the adhesive force of the interlayer film is further enhanced. Moreover, when the content of the hydroxyl group is the above upper limit or less, the flexibility of the interlayer film is enhanced and the handling of the interlayer film is facilitated.

A preferred range of the content of the hydroxyl group of the polyvinyl acetal resin (4) when the colored layer is embedded in the second layer or the third layer, is the same with a preferred range of the content of the hydroxyl group of the polyvinyl acetal resin (2) and the polyvinyl acetal resin (3). A preferred range of the content of the hydroxyl group of the polyvinyl acetal resin (4) when the colored layer is a surface layer, is the same with a preferred range of the content of the hydroxyl group of the polyvinyl acetal resin (2) and the polyvinyl acetal resin (3).

From the viewpoint of further enhancing the sound insulating properties, it is preferred that the content of the hydroxyl group of the polyvinyl acetal resin (1) be lower than the content of the hydroxyl group of the polyvinyl acetal resin (2). From the viewpoint of further enhancing the sound insulating properties, it is preferred that the content of the hydroxyl group of the polyvinyl acetal resin (1) be lower than the content of the hydroxyl group of the polyvinyl acetal resin (3). An absolute value of a difference between the content of the hydroxyl group of the polyvinyl acetal resin (1) and the content of the hydroxyl group of the polyvinyl acetal resin (2) is referred to as absolute value A, and an absolute value of a difference between the content of the hydroxyl group of the polyvinyl acetal resin (1) and the content of the hydroxyl group of the polyvinyl acetal resin (3) is referred to as absolute value B. From the viewpoint of further enhancing the sound insulating properties, each of the absolute value A and the absolute value B is preferably 1% by mole or more, more preferably 5% by mole or more, further preferably 9% by mole or more, especially preferably 10% by mole or more, most preferably 12% by mole or more. Each of the absolute value A and the absolute value B is preferably 20% by mole or less.

When the colored layer is embedded in the first layer, and when the colored layer is not embedded in the second layer and the third layer, and the colored layer is not a surface layer, it is preferred that the content of the hydroxyl group of the polyvinyl acetal resin (4) be lower than the content of the hydroxyl group of the polyvinyl acetal resin (2) from the viewpoint of further enhancing the sound insulating properties. From the viewpoint of further enhancing the sound insulating properties, it is preferred that the content of the hydroxyl group of the polyvinyl acetal resin (4) be lower than the content of the hydroxyl group of the polyvinyl acetal resin (3). An absolute value of a difference between the content of the hydroxyl group of the polyvinyl acetal resin (4) and the content of the hydroxyl group of the polyvinyl acetal resin (2) is referred to as absolute value C, and an absolute value of a difference between the content of the hydroxyl group of the polyvinyl acetal resin (4) and the content of the hydroxyl group of the polyvinyl acetal resin (3) is referred to as absolute value D. From the viewpoint of further enhancing the sound insulating properties, each of the absolute value C and the absolute value D is preferably 1% by mole or more, more preferably 5% by mole or more, further preferably 9% by mole or more, especially preferably 10% by mole or more, most preferably 12% by mole or more. Each of the absolute value C and the absolute value D is preferably 20% by mole or less.

When the colored layer is embedded in the second layer or the third layer, and when the colored layer is a surface layer, it is preferred that the content of the hydroxyl group of the polyvinyl acetal resin (1) be lower than the content of the hydroxyl group of the polyvinyl acetal resin (4) from the viewpoint of further enhancing the sound insulating properties. From the viewpoint of still further enhancing the sound insulating properties, the absolute value of a difference between the content of the hydroxyl group of the polyvinyl acetal resin (1) and the content of the hydroxyl group of the polyvinyl acetal resin (4) is preferably 1% by mole or more, more preferably 5% by mole or more, further preferably 9% by mole or more, especially preferably 10% by mole or more, most preferably 12% by mole or more. An absolute value of difference between the content of the hydroxyl group of the polyvinyl acetal resin (1) and the content of the hydroxyl group of the polyvinyl acetal resin (4) is preferably 20% by mole or less.

The content of the hydroxyl group of the polyvinyl acetal resin is a mole fraction, represented in percentage, obtained by dividing the amount of ethylene groups to which the hydroxyl group is bonded by the total amount of ethylene groups in the main chain. For example, the amount of ethylene groups to which the hydroxyl group is bonded can be measured in accordance with JIS K6728 "Testing methods for polyvinyl butyral".

The acetylation degree (the amount of acetyl groups) of the polyvinyl acetal resin (0) is preferably 0.1% by mole or more, more preferably 0.3% by mole or more, further preferably 0.5% by mole or more and is preferably 30% by mole or less, more preferably 25% by mole or less, and further preferably 20% by mole or less. When the acetylation degree is the above lower limit or more, the compatibility between the polyvinyl acetal resin and a plasticizer is enhanced. When the acetylation degree is the above upper limit or less, with regard to the interlayer film and laminated glass, the moisture resistance thereof is enhanced.

The acetylation degree (the amount of acetyl groups) of the polyvinyl acetal resin (1) is preferably 0.01% by mole or more, more preferably 0.1% by mole or more, even more preferably 7% by mole or more, and further preferably 9% by mole or more and is preferably 30% by mole or less, more preferably 25% by mole or less, further preferably 24% by mole or less, and especially preferably 20% by mole or less. When the acetylation degree is the above lower limit or more, the compatibility between the polyvinyl acetal resin and a plasticizer is enhanced. When the acetylation degree is the above upper limit or less, with regard to the interlayer film and laminated glass, the moisture resistance thereof is enhanced. In particular, when the acetylation degree of the polyvinyl acetal resin (1) is 0.1% by mole or more and is 25% by mole or less, the resulting laminated glass is excellent in penetration resistance.

A preferred range of the acetylation degree of the polyvinyl acetal resin (4) when the colored layer is embedded in the first layer, is the same with a preferred range of the acetylation degree of the polyvinyl acetal resin (1). A preferred range of the acetylation degree of the polyvinyl acetal resin (4) when the colored layer is not embedded in the second layer and the third layer and the colored layer is not a surface layer, is the same with a preferred range of the acetylation degree of the polyvinyl acetal resin (1).

The acetylation degree (acetyl group amount) of each of the polyvinyl acetal resin (2) and the polyvinyl acetal resin (3) is preferably 0.01% by mole or more, more preferably 0.5% by mole or more, preferably 10% by mole or less and more preferably 2% by mole or less. When the acetylation degree is the above lower limit or more, the compatibility between the polyvinyl acetal resin and a plasticizer is enhanced. When the acetylation degree is the above upper limit or less, with regard to the interlayer film and laminated glass, the moisture resistance thereof is enhanced.

A preferred range of the acetylation degree of the polyvinyl acetal resin (4) when the colored layer is embedded in the second layer or the third layer, is the same with a preferred range of the acetylation degree of the polyvinyl acetal resin (2) and the polyvinyl acetal resin (3). A preferred range of the acetylation degree of the polyvinyl acetal resin (4) when the colored layer is a surface layer, is the same with a preferred range of the acetylation degree of the polyvinyl acetal resin (2) and the polyvinyl acetal resin (3).

The acetylation degree is a mole fraction, represented in percentage, obtained by dividing the amount of ethylene groups to which the acetyl group is bonded by the total amount of ethylene groups in the main chain. For example, the amount of ethylene groups to which the acetyl group is bonded can be measured in accordance with JIS K6728 "Testing methods for polyvinyl butyral".

The acetalization degree of the polyvinyl acetal resin (0) (the butyralization degree in the case of a polyvinyl butyral resin) is preferably 60% by mole or more, more preferably 63% by mole or more and is preferably 85% by mole or less, more preferably 75% by mole or less, and further preferably 70% by mole or less. When the acetalization degree is the above lower limit or more, the compatibility between the polyvinyl acetal resin and a plasticizer is enhanced. When the acetalization degree is the above upper limit or less, the reaction time required for producing the polyvinyl acetal resin is shortened.

The acetalization degree of the polyvinyl acetal resin (1) (the butyralization degree in the case of a polyvinyl butyral resin) is preferably 47% by mole or more and more preferably 60% by mole or more and is preferably 85% by mole or less, more preferably 80% by mole or less, and further preferably 75% by mole or less. When the acetalization degree is the above lower limit or more, the compatibility between the polyvinyl acetal resin and a plasticizer is enhanced. When the acetalization degree is the above upper limit or less, the reaction time required for producing the polyvinyl acetal resin is shortened.

A preferred range of the acetalization degree of the polyvinyl acetal resin (4) when the colored layer is embedded in the first layer, is the same with a preferred range of the acetalization degree of the polyvinyl acetal resin (1). A preferred range of the acetalization degree of the polyvinyl acetal resin (4) when the colored layer is not embedded in the second layer and the third layer and the colored layer is not a surface layer, is the same with a preferred range of the acetalization degree of the polyvinyl acetal resin (1).

The acetalization degree of the polyvinyl acetal resin (2) and the polyvinyl acetal resin (3) (the butyralization degree in the case of a polyvinyl butyral resin) is preferably 55% by mole or more, more preferably 60% by mole or more, preferably 75% by mole or less and more preferably 71% by mole or less. When the acetalization degree is the above lower limit or more, the compatibility between the polyvinyl acetal resin and a plasticizer is enhanced. When the acetalization degree is the above upper limit or less, the reaction time required for producing the polyvinyl acetal resin is shortened.

A preferred range of the acetalization degree of the polyvinyl acetal resin (4) when the colored layer is embedded in the second layer or the third layer, is the same with a preferred range of the acetalization degree of the polyvinyl acetal resin (2) and the polyvinyl acetal resin (3). A preferred range of the acetalization degree of the polyvinyl acetal resin (4) when the colored layer is a surface layer, is the same with a preferred range of the acetalization degree of the polyvinyl acetal resin (2) and the polyvinyl acetal resin (3).

The acetalization degree is determined in the following manner. First, from the total amount of ethylene groups in the main chain, the amount of ethylene groups to which the hydroxyl group is bonded, and the amount of ethylene groups to which the acetyl group is bonded are subtracted. The obtained value is divided by the total amount of ethylene groups in the main chain to determine a mole fraction. The mole fraction represented in percentage is the acetalization degree.

In this connection, it is preferred that the content of the hydroxyl group (the amount of hydroxyl groups), the acetalization degree (the butyralization degree) and the acetylation degree be calculated from the results measured by a method in accordance with JIS K6728 "Testing methods for polyvinyl butyral". In this context, a method in accordance with ASTM D1396-92 may be used. When the polyvinyl acetal resin is a polyvinyl butyral resin, the content of the hydroxyl group (the amount of hydroxyl groups), the acetalization degree (the butyralization degree) and the acetylation degree can be calculated from the results measured by a method in accordance with JIS K6728 "Testing methods for polyvinyl butyral".

(Plasticizer)

From the viewpoint of further enhancing the adhesive force of an interlayer film, it is preferred that the interlayer film according to the present invention contain a plasticizer (hereinafter, sometimes described as a plasticizer (0)). It is preferred that the first layer contain a plasticizer (hereinafter, sometimes described as a plasticizer (1)). It is preferred that the second layer contain a plasticizer (hereinafter, sometimes described as a plasticizer (2)). It is preferred that the third layer contain a plasticizer (hereinafter, sometimes described as a plasticizer (3)). It is preferred that the colored layer contain a plasticizer (hereinafter, sometimes described as a plasticizer (4)). When the thermoplastic resin contained in an interlayer film is a polyvinyl acetal resin, it is especially preferred that the interlayer film (the respective layers) contain a plasticizer. It is preferred that a layer containing a polyvinyl acetal resin contain a plasticizer.

The plasticizer is not particularly limited. As the plasticizer, a conventionally known plasticizer can be used. One kind of the plasticizer may be used alone and two or more kinds thereof may be used in combination.

Examples of the plasticizer include organic ester plasticizers such as a monobasic organic acid ester and a polybasic organic acid ester, organic phosphate plasticizers such as an organic phosphate plasticizer and an organic phosphite plasticizer, and the like. Organic ester plasticizers are preferred. It is preferred that the plasticizer be a liquid plasticizer.

Examples of the monobasic organic acid ester include a glycol ester obtained by the reaction of a glycol with a monobasic organic acid, and the like. Examples of the glycol include triethylene glycol, tetraethylene glycol, tripropylene glycol, and the like. Examples of the monobasic organic acid include butyric acid, isobutyric acid, caproic acid, 2-ethylbutyric acid, heptanoic acid, n-octylic acid, 2-ethylhexanoic acid, n-nonylic acid, decanoic acid, and the like.

Examples of the polybasic organic acid ester include an ester compound of a polybasic organic acid and an alcohol having a linear or branched structure of 4 to 8 carbon atoms. Examples of the polybasic organic acid include adipic acid, sebacic acid, azelaic acid, and the like.

Examples of the organic ester plasticizer include triethylene glycol di-2-ethylpropanoate, triethylene glycol di-2-ethylbutyrate, triethylene glycol di-2-ethylhexanoate, triethylene glycol dicaprylate, triethylene glycol di-n-octanoate, triethylene glycol di-n-heptanoate, tetraethylene glycol di-n-heptanoate, dibutyl sebacate, dioctyl azelate, dibutyl carbitol adipate, ethylene glycol di-2-ethylbutyrate, 1,3-propylene glycol di-2-ethylbutyrate, 1,4-butylene glycol di-2-ethylbutyrate, diethylene glycol di-2-ethylbutyrate, diethylene glycol di-2-ethylhexanoate, dipropylene glycol di-2-ethylbutyrate, triethylene glycol di-2-ethylpentanoate, tetraethylene glycol di-2-ethylbutyrate, diethylene glycol dicaprylate, dihexyl adipate, dioctyl adipate, hexyl cyclohexyl adipate, a mixture of heptyl adipate and nonyl adipate, diisononyl adipate, diisodecyl adipate, heptyl nonyl adipate, dibutyl sebacate, oil-modified sebacic alkyds, a mixture of a phosphoric acid ester and an adipic acid ester, and the like. Organic ester plasticizers other than these may be used. Other adipic acid esters other than the above-described adipic acid esters may be used.

Examples of the organic phosphate plasticizer include tributoxyethyl phosphate, isodecyl phenyl phosphate, triisopropyl phosphate, and the like.

It is preferred that the plasticizer be a diester plasticizer represented by the following formula (1).

[Chemical 1]

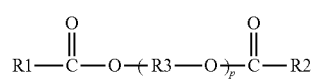

(1)

In the foregoing formula (1), R1 and R2 each represent an organic group with 5 to 10 carbon atoms, R3 represents an ethylene group, an isopropylene group, or a n-propylene group, and p represents an integer of 3 to 10. It is preferred that R1 and R2 in the foregoing formula (1) each be an organic group with 6 to 10 carbon atoms.

It is preferred that the plasticizer include triethylene glycol di-2-ethylhexanoate (3GO) or triethylene glycol di-2-ethylbutyrate (3GH) and it is more preferred that the plasticizer include triethylene glycol di-2-ethylhexanoate.

In the interlayer film, the content of the plasticizer (0) relative to 100 parts by weight of the thermoplastic resin (0) is referred to as content (0). The content (0) is preferably 5 parts by weight or more, more preferably 25 parts by weight or more, further preferably 30 parts by weight or more, and is preferably 100 parts by weight or less, more preferably 60 parts by weight or less, further preferably 50 parts by weight or less. When the content (0) is the above lower limit or more, the penetration resistance of laminated glass is further enhanced. When the content (0) is the above upper limit or less, the transparency of the interlayer film is further enhanced.

In the first layer, the content of the plasticizer (1) relative to 100 parts by weight of the thermoplastic resin (1) is referred to as content (1). The content (1) is preferably 50 parts by weight or more, more preferably 55 parts by weight or more, further preferably 60 parts by weight or more. The content (1) is preferably 100 parts by weight or less, more preferably 90 parts by weight or less, further preferably 85 parts by weight or less, especially preferably 80 parts by weight or less. When the content (1) is the above lower limit or more, the flexibility of the interlayer film is enhanced and the handling of the interlayer film is facilitated. When the content (1) is the above upper limit or less, the penetration resistance of laminated glass is further enhanced.

When the colored layer is embedded in the first layer, a preferred range of the content of the plasticizer (4) relative to 100 parts by weight of the thermoplastic resin (4) (hereinafter, sometimes described as content (4)) is the same with a preferred range of the content (1) in the colored layer. When the colored layer is not embedded in the second layer and the third layer, and the colored layer is not a surface layer, a preferred range of the content of the plasticizer (4) relative to 100 parts by weight of the thermoplastic resin (4) (hereinafter, sometimes described as content (4)) is the same with a preferred range of the content (1) in the colored layer.

In the second layer, the content of the plasticizer (2) relative to 100 parts by weight of the thermoplastic resin (2) is referred to as content (2). In the third layer, the content of the plasticizer (3) relative to 100 parts by weight of the thermoplastic resin (3) is referred to as content (3). Each of the content (2) and the content (3) is preferably 5 parts by weight or more, more preferably 10 parts by weight or more, still more preferably 15 parts by weight or more, further preferably 20 parts by weight or more, especially preferably 24 parts by weight or more, and most preferably 25 parts by weight or more. Each of the content (2) and the content (3) is preferably 45 parts by weight or less, more preferably 40 parts by weight or less, further preferably 35 parts by weight or less, especially preferably 32 parts by weight or less, and most preferably 30 parts by weight or less. When the content (2) and the content (3) are the above lower limit or more, the flexibility of the interlayer film is enhanced and the handling of the interlayer film is facilitated. When the content (2) and the content (3) are the above upper limit or less, the penetration resistance of laminated glass is further enhanced.

A preferred range of the content of the plasticizer (4) relative to 100 parts by weight of the thermoplastic resin (4) (hereinafter, sometimes described as content (4)) when the colored layer is embedded in the second layer or the third layer, is the same with a preferred range of the content (2) and the content (3). A preferred range of the content of the plasticizer (4) relative to 100 parts by weight of the thermoplastic resin (4) (hereinafter, sometimes described as content (4)) when the colored layer is a surface layer, is the same with a preferred range of the content (2) and the content (3).

For the purpose of enhancing the sound insulating properties of laminated glass, it is preferred that the content (1) be larger than the content (2) and it is preferred that the content (1) be larger than the content (3).

For the purpose of enhancing the sound insulating properties of laminated glass, it is preferred that the content (4) be larger than the content (2) and it is preferred that the content (4) be larger than the content (3), when the colored layer is embedded in the first layer and when the colored layer is not a surface layer.

For the purpose of enhancing the sound insulating properties of laminated glass, it is preferred that the content (1) be larger than the content (4) when the colored layer is embedded in the second layer or the third layer, and when the colored layer is a surface layer.

From the viewpoint of further enhancing the sound insulating property of laminated glass, each of the absolute value of difference between the content (2) and the content (1) and the absolute value of difference between the content (3) and the content (1) is preferably 10 parts by weight or more, more preferably 15 parts by weight or more, and further preferably 20 parts by weight or more. Each of the absolute value of difference between the content (2) and the content (1) and the absolute value of difference between the content (3) and the content (1) is preferably 80 parts by weight or less, more preferably 75 parts by weight or less, further preferably 70 parts by weight or less.

When the colored layer is embedded in the first layer, there may be a case that the colored layer is not embedded in the second layer and the third layer, and the colored layer is not a surface layer. In this case, from the viewpoint of further enhancing the sound insulating property of laminated glass, each of the absolute value of difference between the content (2) and the content (4) and the absolute value of difference between the content (3) and the content (4) is preferably 10 parts by weight or more, more preferably 15 parts by weight or more, and further preferably 20 parts by weight or more. Each of the absolute value of difference between the content (2) and the content (4) and the absolute value of difference between the content (3) and the content (4) is preferably 80 parts by weight or less, more preferably 75 parts by weight or less, further preferably 70 parts by weight or less.

When the colored layer is embedded in the second layer or the third layer, and when the colored layer is a surface layer, the absolute value of difference between the content (4) and the content (1) is preferably 10 parts by weight or more, more preferably 15 parts by weight or more, and further preferably 20 parts by weight or more from the viewpoint of further enhancing the sound insulating property of laminated glass. The absolute value of difference between the content (4) and the content (1) is preferably 80 parts by weight or less, more preferably 75 parts by weight or less, further preferably 70 parts by weight or less.

(Heat Shielding Substance)

It is preferred that the interlayer film contain a heat shielding substance (heat shielding compound). It is preferred that the first layer contain a heat shielding substance. It is preferred that the second layer contain a heat shielding substance. It is preferred that the third layer contain a heat shielding substance. It is preferred that the colored layer contain a heat shielding substance. One kind of the heat shielding substance may be used alone, and two or more kinds thereof may be used in combination.

It is preferred that the heat shielding substance contain at least one kind of Ingredient X among a phthalocyanine compound, a naphthalocyanine compound, and an anthracyanine compound or contain heat shielding particles. In this case, the heat shielding compound may be constituted of both of the Ingredient X and the heat shielding particles.

Ingredient X:

It is preferred that the interlayer film include at least one kind of Ingredient X among a phthalocyanine compound, a naphthalocyanine compound, and an anthracyanine compound. It is preferred that the first layer contain the Ingredient X. It is preferred that the second layer contain the Ingredient X. It is preferred that the third layer contain the Ingredient X. It is preferred that the colored layer contain the Ingredient X. The Ingredient X is a heat shielding substance. One kind of the Ingredient X may be used alone, and two or more kinds thereof may be used in combination.

The Ingredient X is not particularly limited. As the Ingredient X, conventionally known phthalocyanine compound, naphthalocyanine compound and anthracyanine compound can be used.

Examples of the Ingredient X include phthalocyanine, a derivative of phthalocyanine, naphthalocyanine, a derivative of naphthalocyanine, anthracyanine, and a derivative of anthracyanine, and the like. It is preferred that each of the phthalocyanine compound and the derivative of phthalocyanine have a phthalocyanine skeleton. It is preferred that each of the naphthalocyanine compound and the derivative of naphthalocyanine have a naphthalocyanine skeleton. It is preferred that each of the anthracyanine compound and the derivative of anthracyanine have an anthracyanine skeleton.

With regard to the interlayer film and laminated glass, from the viewpoint of further enhancing the heat shielding properties thereof, it is preferred that the Ingredient X be at least one kind selected from the group consisting of phthalocyanine, a derivative of phthalocyanine, naphthalocyanine and a derivative of naphthalocyanine, and it is more preferred that the Ingredient X be at least one kind among phthalocyanine and a derivative of phthalocyanine.

From the viewpoints of effectively enhancing the heat shielding properties and maintaining the visible light transmittance at a higher level over a long period of time, it is preferred that the Ingredient X contain vanadium atoms or copper atoms. It is preferred that the Ingredient X contain vanadium atoms and it is also preferred that the Ingredient X contain copper atoms. It is more preferred that the Ingredient X be at least one kind among phthalocyanine containing vanadium atoms or copper atoms and a derivative of phthalocyanine containing vanadium atoms or copper atoms. With regard to the interlayer film and laminated glass, from the viewpoint of still further enhancing the heat shielding properties thereof, it is preferred that the Ingredient X have a structural unit in which an oxygen atom is bonded to a vanadium atom.

In 100% by weight of the interlayer film or in 100% by weight of a layer containing the Ingredient X (a first layer, a second layer, a third layer, or a colored layer), the content of the Ingredient X is preferably 0.001% by weight or more, more preferably 0.005% by weight or more, further preferably 0.01% by weight or more, especially preferably 0.02% by weight or more. In 100% by weight of the interlayer film or in 100% by weight of a layer containing the Ingredient X (a first layer, a second layer, a third layer, or a colored layer), the content of the Ingredient X is preferably 0.2% by weight or less, more preferably 0.1% by weight or less, further preferably 0.05% by weight or less, especially preferably 0.04% by weight or less. When the content of the Ingredient X is the above lower limit or more and the above upper limit or less, the heat shielding properties are sufficiently enhanced and the visible light transmittance is sufficiently enhanced. For example, it is possible to make the visible light transmittance 70% or more.

Heat Shielding Particles:

It is preferred that the interlayer film contain heat shielding particles. It is preferred that the first layer contain the heat shielding particles. It is preferred that the second layer contain the heat shielding particles. It is preferred that the third layer contain the heat shielding particles. It is preferred that the colored layer contain the heat shielding particles. The heat shielding particle is of a heat shielding substance. By the use of heat shielding particles, infrared rays (heat rays) can be effectively cut off. One kind of the heat shielding particles may be used alone, and two or more kinds thereof may be used in combination.

From the viewpoint of further enhancing the heat shielding properties of laminated glass, it is more preferred that the heat shielding particles be metal oxide particles. It is preferred that the heat shielding particle be a particle (a metal oxide particle) formed from an oxide of a metal.

The energy amount of an infrared ray with a wavelength of 780 nm or longer which is longer than that of visible light is small as compared with an ultraviolet ray. However, the thermal action of infrared rays is large, and when infrared rays are absorbed into a substance, heat is released from the substance. Accordingly, infrared rays are generally called heat rays. By the use of the heat shielding particles, infrared rays (heat rays) can be effectively cut off. In this connection, the heat shielding particle means a particle capable of absorbing infrared rays.

Specific examples of the heat shielding particles include metal oxide particles such as aluminum-doped tin oxide particles, indium-doped tin oxide particles, antimony-doped tin oxide particles (ATO particles), gallium-doped zinc oxide particles (GZO particles), indium-doped zinc oxide particles (IZO particles), aluminum-doped zinc oxide particles (AZO particles), niobium-doped titanium oxide particles, sodium-doped tungsten oxide particles, cesium-doped tungsten oxide particles, thallium-doped tungsten oxide particles, rubidium-doped tungsten oxide particles, tin-doped indium oxide particles (ITO particles), tin-doped zinc oxide particles and silicon-doped zinc oxide particles, lanthanum hexaboride ($LaB_6$) particles, and the like. Heat shielding particles other than these may be used. Since the heat ray shielding function is high, preferred are metal oxide particles, more preferred are ATO particles, GZO particles, IZO particles, ITO particles or tungsten oxide particles, and especially preferred are ITO particles or tungsten oxide particles. In particular, since the heat ray shielding function is high and the particles are readily available, preferred are tin-doped indium oxide particles (ITO particles), and also preferred are tungsten oxide particles.

With regard to the interlayer film and laminated glass, from the viewpoint of further enhancing the heat shielding properties thereof, it is preferred that the tungsten oxide particles be metal-doped tungsten oxide particles. Examples of the "tungsten oxide particles" include metal-doped tungsten oxide particles. Specifically, examples of the metal-doped tungsten oxide particles include sodium-doped tungsten oxide particles, cesium-doped tungsten oxide particles, thallium-doped tungsten oxide particles, rubidium-doped tungsten oxide particles, and the like.

With regard to the interlayer film and laminated glass, from the viewpoint of further enhancing the heat shielding properties thereof, cesium-doped tungsten oxide particles are especially preferred. With regard to the interlayer film and laminated glass, from the viewpoint of still further enhancing the heat shielding properties thereof, it is preferred that the cesium-doped tungsten oxide particles be tungsten oxide particles represented by the formula: $Cs_{0.33}WO_3$.

The average particle diameter of the heat shielding particles is preferably 0.01 μm or more, more preferably 0.02 μm or more, preferably 0.1 μm or less and more preferably 0.05 μm or less. When the average particle diameter is the above lower limit or more, the heat ray shielding properties are sufficiently enhanced. When the average particle diameter is the above upper limit or less, the dispersibility of heat shielding particles is enhanced.

The "average particle diameter" refers to the volume average particle diameter. The average particle diameter can be measured using a particle size distribution measuring apparatus ("UPA-EX150" available from NIKKISO CO., LTD.), or the like.

In 100% by weight of the interlayer film or in 100% by weight of a layer containing the heat shielding particles (a first layer, a second layer, a third layer, or a colored layer), the content of the heat shielding particles (in particular, the content of tungsten oxide particles) is preferably 0.01% by weight or more, more preferably 0.1% by weight or more, further preferably 1% by weight or more, especially preferably 1.5% by weight or more. In 100% by weight of the interlayer film or in 100% by weight of a layer containing the heat shielding particles (a first layer, a second layer, a third layer, or a colored layer), the content of the heat shielding particles (in particular, the content of tungsten oxide particles) is preferably 6% by weight or less, more preferably 5.5% by weight or less, further preferably 4% by weight or less, especially preferably 3.5% by weight or less, most preferably 3% by weight or less. When the content of the heat shielding particles is the above lower limit or more and the above upper limit or less, the heat shielding properties are sufficiently enhanced and the visible light transmittance is sufficiently enhanced.

(Metal salt)

It is preferred that the interlayer film contain at least one kind of metal salt (hereinafter, sometimes described as Metal salt M) among an alkali metal salt, an alkaline earth metal salt, and a magnesium salt. It is preferred that the first layer contain the Metal salt M. It is preferred that the second layer contain the Metal salt M. It is preferred that the third layer contain the Metal salt M. It is preferred that the colored layer contain the Metal salt M. By the use of the Metal salt M, controlling the adhesivity between the interlayer film and a lamination glass member such as a glass plate or the adhesivity between respective layers in the interlayer film is facilitated. One kind of the Metal salt M may be used alone, and two or more kinds thereof may be used in combination.

It is preferred that the Metal salt M contain at least one kind of metal selected from the group consisting of Li, Na, K, Rb, Cs, Mg, Ca, Sr and Ba. It is preferred that the metal salt included in the interlayer film contain at least one kind of metal among K and Mg.

Moreover, it is more preferred that the Metal salt M be an alkali metal salt of an organic acid with 2 to 16 carbon atoms, an alkaline earth metal salt of an organic acid with 2 to 16 carbon atoms, and a magnesium salt of an organic acid with 2 to 16 carbon atoms, and it is further preferred that the Metal salt M be a magnesium carboxylate with 2 to 16 carbon atoms or a potassium carboxylate with 2 to 16 carbon atoms.

Examples of the magnesium carboxylate with 2 to 16 carbon atoms and the potassium carboxylate with 2 to 16 carbon atoms include magnesium acetate, potassium acetate, magnesium propionate, potassium propionate, magnesium 2-ethylbutyrate, potassium 2-ethylbutanoate, magnesium 2-ethylhexanoate, potassium 2-ethylhexanoate, and the like.

The total of the contents of Mg and K in an interlayer film containing the Metal salt M or a layer containing the Metal salt M (a first layer, a second layer, a third layer, or a colored layer) is preferably 5 ppm or more, more preferably 10 ppm or more, and further preferably 20 ppm or more and is preferably 300 ppm or less, more preferably 250 ppm or less, and further preferably 200 ppm or less. When the total of the contents of Mg and K is the above lower limit or more and the above upper limit or less, the adhesivity between the interlayer film and a glass plate or the adhesivity between respective layers in the interlayer film can be further well controlled.

(Ultraviolet ray screening agent)

It is preferred that the interlayer film contain an ultraviolet ray screening agent. It is preferred that the first layer contain an ultraviolet ray screening agent. It is preferred that the second layer contain an ultraviolet ray screening agent. It is preferred that the third layer contain an ultraviolet ray screening agent. It is preferred that the colored layer contain an ultraviolet ray screening agent. By the use of an ultraviolet ray screening agent, even when the interlayer film and the laminated glass are used for a long period of time, the visible light transmittance becomes further difficult to be lowered. One kind of the ultraviolet ray screening agent may be used alone, and two or more kinds thereof may be used in combination.

Examples of the ultraviolet ray screening agent include an ultraviolet ray absorber. It is preferred that the ultraviolet ray screening agent be an ultraviolet ray absorber.

Examples of the ultraviolet ray screening agent include an ultraviolet ray screening agent containing a metal atom, an ultraviolet ray screening agent containing a metal oxide, an ultraviolet ray screening agent having a benzotriazole structure (a berizotriazole compound), an ultraviolet ray screening agent having a benzophenone structure (a benzophenone compound), an ultraviolet ray screening agent having a triazine structure (a triazine compound), an ultraviolet ray screening agent having a malonic acid ester structure (a malonic acid ester compound), an ultraviolet ray screening agent having an oxanilide structure (an oxanilide compound), an ultraviolet ray screening agent having a benzoate structure (a benzoate compound), and the like.

Examples of the ultraviolet ray screening agent containing a metal atom include platinum particles, particles in which the surface of platinum particles is coated with silica, palladium particles, particles in which the surface of palladium particles is coated with silica, and the like. It is preferred that the ultraviolet ray screening agent not be heat shielding particles.

The ultraviolet ray screening agent is preferably an ultraviolet ray screening agent having a benzotriazole structure, an ultraviolet ray screening agent having a benzophenone structure, an ultraviolet ray screening agent having a triazine structure, or an ultraviolet ray screening agent having a benzoate structure. The ultraviolet ray screening agent is more preferably an ultraviolet ray screening agent having a benzotriazole structure or an ultraviolet ray screening agent having a benzophenone structure, and is further preferably an ultraviolet ray screening agent having a benzotriazole structure.

Examples of the ultraviolet ray screening agent containing a metal oxide include zinc oxide, titanium oxide, cerium oxide, and the like. Furthermore, with regard to the ultraviolet ray screening agent containing a metal oxide, the surface thereof may be coated with any material. Examples of the coating material for the surface of the ultraviolet ray screening agent containing a metal oxide include an insulating metal oxide, a hydrolyzable organosilicon compound, a silicone compound, and the like.

Examples of the insulating metal oxide include silica, alumina, zirconia, and the like. For example, the insulating metal oxide has a band-gap energy of 5.0 eV or more.

Examples of the ultraviolet ray screening agent having a benzotriazole structure include 2-(2'-hydroxy-5'-methylphenyl)benzotriazole ("Tinuvin P" available from BASF Japan Ltd.), 2-(2'-hydroxy-3',5'-t-butylphenyl)benzotriazole ("Tinuvin 320" available from BASF Japan Ltd.), 2-(2'-hydroxy-3'-t-butyl-5-methylphenyl)-5-chlorobenzotriazole ("Tinuvin 326" available from BASF Japan Ltd.), 2-(2'-hydroxy-3',5'-di-amylphenyl)benzotriazole ("Tinuvin 328" available from BASF Japan Ltd.), and the like. It is preferred that the ultraviolet ray screening agent be an ultraviolet ray screening agent having a benzotriazole structure containing a halogen atom, and it is more preferred that the ultraviolet ray screening agent be an ultraviolet ray screening agent having a benzotriazole structure containing a chlorine atom, because those are excellent in ultraviolet ray screening performance.

Examples of the ultraviolet ray screening agent having a benzophenone structure include octabenzone ("Chimassorb 81" available from BASF Japan Ltd.), and the like.

Examples of the ultraviolet ray screening agent having a triazine structure include "LA-F70" available from ADEKA CORPORATION, 2-(4,6-diphenyl-1,3,5-triazin-2-yl)-5-[(hexyl)oxy]-phenol ("Tinuvin 1577FF" available from BASF Japan Ltd.), and the like.

Examples of the ultraviolet ray screening agent having a malonic acid ester structure include dimethyl 2-(p-methoxybenzylidene)malonate, tetraethyl-2,2-(1,4-phenylenedimethylidene)bismalonate, 2-(p-methoxybenzylidene)-bis(1,2,2,6,6-pentamethyl-4-piperidinyl)malonate, and the like.

Examples of a commercial product of the ultraviolet ray screening agent having a malonic acid ester structure include Hostavin B-CAP, Hostavin PR-25 and Hostavin PR-31 (any of these is available from Clariant Japan K.K.).

Examples of the ultraviolet ray screening agent having an oxanilide structure include a kind of oxalic acid diamide having a substituted aryl group and the like on the nitrogen atom such as N-(2-ethylphenyl)-N'-(2-ethoxy-5-t-butylphenyl)oxalic acid diamide, N-(2-ethylphenyl)-N'-(2-ethoxyphenyl)oxalic acid diamide and 2-ethyl-2'-ethoxy-oxanilide ("Sanduvor VSU" available from Clariant Japan K.K.).

Examples of the ultraviolet ray screening agent having a benzoate structure include 2,4-di-tert-butylphenyl-3,5-di-tert-butyl-4-hydroxybenzoate ("Tinuvin 120" available from BASF Japan Ltd.), and the like.

In 100% by weight of the interlayer film or in 100% by weight of a layer containing the ultraviolet ray screening agent (a first layer, a second layer, a third layer, or a colored layer), the content of the ultraviolet ray screening agent and the content of the benzotriazole compound are preferably 0.1% by weight or more, more preferably 0.2% by weight or more, further preferably 0.3% by weight or more, especially preferably 0.5% by weight or more. In this case, reduction in visible light transmittance after a lapse of the term is further prevented. In 100% by weight of the interlayer film or in 100% by weight of a layer containing the ultraviolet ray screening agent (a first layer, a second layer, a third layer, or a colored layer), the content of the ultraviolet ray screening agent and the content of the benzotriazole compound are preferably 2.5% by weight or less, more preferably 2% by weight or less, further preferably 1% by weight or less, especially preferably 0.8% by weight or less. In particular, by setting the content of the ultraviolet ray screening agent to be 0.2% by weight or more in 100% by weight of a layer containing the ultraviolet ray screening agent, with regard to the interlayer film and laminated glass, the lowering in visible light transmittance thereof after the lapse of a certain period of time can be significantly suppressed.

(Oxidation Inhibitor)

It is preferred that the interlayer film contain an oxidation inhibitor. It is preferred that the first layer contain an oxidation inhibitor. It is preferred that the second layer contain an oxidation inhibitor. It is preferred that the third layer contain an oxidation inhibitor. It is preferred that the colored layer contain an oxidation inhibitor. One kind of the oxidation inhibitor may be used alone, and two or more kinds thereof may be used in combination.

Examples of the oxidation inhibitor include a phenol-based oxidation inhibitor, a sulfur-based oxidation inhibitor, a phosphorus-based oxidation inhibitor, and the like. The phenol-based oxidation inhibitor is an oxidation inhibitor having a phenol skeleton. The sulfur-based oxidation inhibitor is an oxidation inhibitor containing a sulfur atom. The phosphorus-based oxidation inhibitor is an oxidation inhibitor containing a phosphorus atom.

It is preferred that the oxidation inhibitor be a phenol-based oxidation inhibitor or a phosphorus-based oxidation inhibitor.

Examples of the phenol-based oxidation inhibitor include 2,6-di-t-butyl-p-cresol (BHT), butyl hydroxyanisole (BHA), 2,6-di-t-butyl-4-ethylphenol, stearyl β-(3,5-di-t-butyl-4-hydroxyphenyl)propionate, 2,2'-methylenebis-(4-methyl-6-butylphenol), 2,2'-methylenebis-(4-ethyl-6-t-butylphenol), 4,4'-butylidene-bis-(3-methyl-6-t-butylphenol), 1,1,3-tris-(2-methyl-hydroxy-5-t-butylphenyl)butane, tetrakis[methylene-3-(3',5'-butyl-4-hydroxyphenyl)propionate]methane, 1,3,3-tris-(2-methyl-4-hydroxy-5-t-butylphenol)butane, 1,3,5-trimethyl-2,4,6-tris(3,5-di-t-butyl-4-hydroxybenzyl)benzene, bis(3,3'-t-butylphenol)butyric acid glycol ester, bis(3-t-butyl-4-hydroxy-5-methylbenzenepropanoic acid) ethylenebis(oxyethylene), and the like. One kind or two or more kinds among these oxidation inhibitors are suitably used.

Examples of the phosphorus-based oxidation inhibitor include tridecyl phosphite, tris(tridecyl) phosphite, triphenyl phosphite, trinonylphenyl phosphite, bis(tridecyl)pentaerithritol diphosphite, bis(decyl)pentaerithritol diphosphite, tris(2,4-di-t-butylphenyl) phosphite, bis(2,4-di-t-butyl-6-methylphenyl)ethyl ester phosphorous acid, 2,2'-methylenebis(4,6-di-t-butyl-1-phenyloxy) (2-ethylhexyloxy)phosphorus, and the like. One kind or two or more kinds among these oxidation inhibitors are suitably used.

Examples of a commercial product of the oxidation inhibitor include "IRGANOX 245" available from BASF Japan Ltd., "IRGAFOS 168" available from BASF Japan Ltd., "IRGAFOS 38" available from BASF Japan Ltd., "Sumilizer BHT" available from Sumitomo Chemical Co., Ltd., "H-BHT" available from Sakai Chemical Industry Co., Ltd., "IRGANOX 1010" available from BASF Japan Ltd., and "ADK STAB A0-40" available from ADEKA CORPORATION.

With regard to the interlayer film and laminated glass, in order to maintain high visible light transmittance thereof over a long period of time, the content of the oxidation inhibitor is preferably 0.03% by weight or more, more preferably 0.1% by weight or more in 100% by weight of the interlayer film or in 100% by weight of the layer containing the oxidation inhibitor (a first layer, a second layer, a third layer, or a colored layer). Moreover, since an effect commensurate with the addition of an oxidation inhibitor is not attained, it is preferred that the content of the oxidation inhibitor be 2% by weight or less in 100% by weight of the interlayer film or in 100% by weight of the layer containing the oxidation inhibitor.

(Light Stabilizer)

It is preferred that the interlayer film contain a light stabilizer. It is preferred that the first layer contain a light stabilizer. It is preferred that the second layer contain a light stabilizer. It is preferred that the third layer contain a light stabilizer. It is preferred that the colored layer contain a light stabilizer. By using the light stabilizer, discoloration is further suppressed and the visible light transmittance is less likely to lower even when the interlayer film is used over a long term or exposed to sunlight. One kind of the light stabilizer may be used alone and two or more kinds thereof may be used in combination.

From the viewpoint of further suppressing the discoloration, it is preferred that the light stabilizer be a hindered amine light stabilizer.

Examples of the hindered amine light stabilizer include hindered amine light stabilizers in which an alkyl group, an alkoxy group or a hydrogen atom is bonded to a nitrogen atom of the piperidine structure. From the viewpoint of further suppressing the discoloration, a hindered amine light stabilizer in which an alkyl group or an alkoxy group is bonded to a nitrogen atom of the piperidine structure is preferred. The hindered amine light stabilizer is preferably a hindered amine light stabilizer in which an alkyl group is bonded to a nitrogen atom of the piperidine structure, and also preferably a hindered amine light stabilizer in which an alkoxy group is bonded to a nitrogen atom of the piperidine structure.

As the hindered amine light stabilizer in which an alkyl group is bonded to a nitrogen atom of the piperidine structure, "Tinuvin 765" and "Tinuvin 622SF" available from BASF, and "ADK STAB LA-52" available from ADEKA, or the like can be recited.

As the hindered amine light stabilizer in which an alkoxy group is bonded to a nitrogen atom of the piperidine structure, "Tinuvin XT-850FF" and "Tinuvin XT-855FF" available from BASF, and "ADK STAB LA-81" available from ADEKA, or the like can be recited.

As the hindered amine light stabilizer in which a hydrogen atom is bonded to a nitrogen atom of the piperidine structure, "Tinuvin 770DF" available from BASF, and "Hostavin N24" available from Clariant, or the like can be recited.

From the viewpoint of further suppressing the discoloration, the light stabilizer has a molecular weight of preferably 2000 or less, more preferably 1000 or less, further preferably 700 or less.

In 100% by weight of the interlayer film or in 100% by weight of a layer containing the light stabilizer (a first layer, a second layer, a third layer, or a colored layer), the content of the light stabilizer is preferably 0.0025% by weight or more, more preferably 0.025% by weight or more, and is preferably 0.5% by weight or less, more preferably 0.3% by weight or less. When the content of the light stabilizer is the above lower limit or more and the above upper limit or less, discoloration is efficiently suppressed.

(Coloring Agent)

The interlayer film contains a coloring agent in the colored part. The colored layer contains a coloring agent. One kind of the coloring agent may be used alone and two or more kinds thereof may be used in combination.

Examples of the coloring agent include a pigment, a dye and the like.

From the viewpoint of achieving satisfactory coloring and effectively suppressing the discoloration, it is preferred that the coloring agent be a pigment. Examples of the pigment include a dark red-brown mixed pigment in which a black pigment carbon black, a red pigment (C.I.Pigment red), a blue pigment (C.I.Pigment blue), and a yellow pigment (C.I.Pigment yellow) are mixed.

Examples of the dyes include a pyrene-based dye, an aminoketone-based dye, an anthraquinone-based dye, and an azo-based dye.

Examples of the pyrene-based dye include Solvent Green 5 (CA579869-59-3) and Solvent Green 7 (CA56358-69-6).

Examples of the aminoketone-based dye include Solvent Yellow 98 (CA512671-74-8), Solvent Yellow 85 (CAS12271-01-1) and Solvent Red 179 (CA58910-94-5), and Solvent Red 135 (CAS71902-17-5).

Examples of the anthraquinone-based dye include Solvent Yellow 163 (CAS13676091-0), Solvent Red 207 (CAS15958-69-6), Disperse Red 92 (CAS12236-11-2), Solvent Violet 13 (CAS81-48-1), Disperse Violet 31 (CAS6408-72-6), Solvent Blue 97 (CAS61969-44-6), Solvent Blue 45 (CAS37229-23-5), Solvent Blue 104 (CAS116-75-6) and Disperse Blue 214 (CAS104491-84-1).

Examples of the azo-based dye include Solvent Yellow30 (CA53321-10-4), Solvent Red 164 (CAS70956-30-8), and Disperse Blue 146 (CA588650-91-3).

In 100% by weight of the colored part or in 100% by weight of the colored layer, the content of the coloring agent is preferably 0.00001% by weight or more, more preferably 0.0001% by weight or more, further preferably 0.001% by weight or more, especially preferably 0.01% by weight or more, most preferably 0.03% by weight or more. In 100% by weight of the colored part or in 100% by weight of the colored layer, the content of the coloring agent is preferably 0.2% by weight or less, more preferably 0.1% by weight or less, further preferably 0.08% by weight or less.

(Other ingredients)

Each of the first layer, the second layer, the third layer, and the colored layer may contain additives such as a coupling agent, a dispersing agent, a surfactant, a flame retardant, an antistatic agent, an adhesivity adjusting agent other than metal salt, a moisture-resistance agent, a fluorescent brightening agent, and an infrared ray absorber, as necessary. One kind of these additives may be used alone, and two or more kinds thereof may be used in combination.

(Other details of interlayer film)

The distance between one end and the other end of the interlayer film is preferably 0.5 m or more, more preferably 0.8 m or more, and especially preferably 1 m or more, and is preferably 3 m or less, more preferably 2 m or less, and especially preferably 1.5 m or less. When the interlayer film has a lengthwise direction and a widthwise direction, the distance between one end and the other end is the distance in the longitudinal direction of the interlayer film. When the interlayer film has a square planar shape, the distance between one end and the other end is the distance between one end and the other end that are opposed to each other.

In the case of a multilayer interlayer film, the glass transition temperature of the first layer is preferably 30° C. or less, more preferably 20° C. or less, further preferably 10° C. or less from the viewpoint of further improving the sound insulating properties of laminated glass The glass transition temperature of the first layer is preferably −15° C. or more.

The thickness of the interlayer film is not particularly limited. From the viewpoint of the practical aspect and the viewpoint of sufficiently enhancing the heat shielding property, the thickness of the interlayer film is preferably 0.1 mm or more, and more preferably 0.25 mm or more and is preferably 3 mm or less, and more preferably 1.5 mm or less. When the thickness of the interlayer film is the above-described lower limit or more, the penetration resistance of laminated glass is enhanced. When the thickness of the interlayer film is the above upper limit or less, the transparency of the interlayer film is further improved.

The thickness of the interlayer film is designated as T. From the viewpoint of making a void more difficult to be generated in an end part of laminated glass, and further suppressing deterioration in transparency of laminated glass in the case of a multi-layered interlayer film, the thickness of the first layer (preferably the thickness in the non-colored part) is preferably 0.0625 T or more, more preferably 0.1 T or more, and is preferably 0.375 T or less, and more preferably 0.25 T or less.

From the viewpoint of making a void more difficult to be generated in an end part of laminated glass, and further suppressing deterioration in transparency of laminated glass, the thickness of each of the second layer and the third layer (preferably the thickness in the non-colored part) is preferably 0.625 T or more, more preferably 0.75 T or more, and is preferably 0.9375 T or less, more preferably 0.9 T or less. When the thickness of each of the second layer and the third layer is the above-described lower limit or more and the above-described upper limit or less, bleeding out of the plasticizer can be suppressed.

From the viewpoint of making a void more difficult to be generated in an end part of laminated glass, a total thickness of the second layer and the third layer (preferably the thickness in the non-colored part) is preferably 0.625 T or more, more preferably 0.75 T or more, and is preferably 0.9375 T or less, and more preferably 0.9 T or less when the interlayer film includes the second layer and the third layer. When the total thickness of the second layer and the third layer is the above-described lower limit or more and the above-described upper limit or less, bleeding out of the plasticizer can be suppressed.

The interlayer film may be an interlayer film having a uniform thickness, and may be an interlayer film having varying thickness. The sectional shape of the interlayer film may be a rectangular shape and may be a wedge-like shape.

The method for producing the interlayer film is not particularly limited. In the case of a single-layered interlayer film, examples of the production method of the interlayer film include a method of extruding a resin composition with an extruder. One exemplary method for forming the interlayer film in the case of a multi-layered interlayer film includes separately forming respective layers by using resin compositions for forming respective layers, and then layering the obtained layers. Further, one exemplary method for forming the interlayer film includes co-extruding resin compositions for forming respective layers to layer the respective layers. A production method of extrusion-molding is preferred because the method is suitable for continuous production.

For the reason of excellent production efficiency of the interlayer film, it is preferred that the second layer and the third layer contain the same polyvinyl acetal resin. For the reason of excellent production efficiency of the interlayer film, it is preferred that the second layer and the third layer contain the same polyvinyl acetal resin and the same plasticizer. For the reason of excellent production efficiency of the interlayer film, it is further preferred that the second layer and the third layer be formed of the same resin composition.

It is preferred that the interlayer film have protrusions and recesses on at least one surface of the surfaces of both sides. It is preferred that the interlayer film have protrusions and recesses on surfaces of both sides. Examples of the method for forming the protrusions and recesses include, but are not particularly limited to, a lip emboss method, an emboss roll method, a calender roll method, and a profile extrusion method. The emboss roll method is preferred because a large number of embosses of the protrusions and recesses, which is a quantitatively constant protrusion and recess pattern, can be formed.

(Other Details of Laminated Glass)

The laminated glass according to the present invention includes a first lamination glass member, a second lamination glass member, and an interlayer arranged between the first lamination glass member and the second lamination glass member. The interlayer film is the interlayer film for laminated glass as described above. On the first surface (one surface) side in the interlayer film, the first lamination glass member is arranged. On the second surface (other surface) side opposite to the first surface of the interlayer film, the second lamination glass member is arranged.

FIG. 5 is a sectional view schematically showing an example of laminated glass prepared with the interlayer film for laminated glass shown in FIG. 1.

Laminated glass 21 shown in FIG. 5 includes a first lamination glass member 31, a second lamination glass member 32 and the interlayer film 1. The interlayer film 1 is arranged between the first lamination glass member 31 and the second lamination glass member 32 to be sandwiched therebetween. The first lamination glass member 31 is layered on a first surface (one surface) of the interlayer film 1. The second lamination glass member 32 is layered on a second surface (other surface) opposite to the first surface of the interlayer film 1. The first lamination glass member 31 is layered on the outer surface of the second layer 12 in the interlayer film 1. The second lamination glass member 32 is layered on the outer surface of the third layer 13 in the interlayer film 1.

FIG. 6 is a sectional view schematically showing an example of laminated glass prepared with the interlayer film for laminated glass shown in FIG. 2.

Laminated glass 21A shown in FIG. 6 includes a first lamination glass member 31A, a second lamination glass member 32A and the interlayer film 1A. The interlayer film 1A is arranged between the first lamination glass member 31A and the second lamination glass member 32A to be sandwiched therebetween. The first lamination glass member 31A is layered on a first surface (one surface) of the interlayer film 1A. The second lamination glass member 32A is layered on a second surface (other surface) opposite to the first surface of the interlayer film 1A.

FIG. 7 is a sectional view schematically showing an example of laminated glass prepared with the interlayer film for laminated glass shown in FIG. 3.

Laminated glass 21B shown in FIG. 7 includes a first lamination glass member 31B, a second lamination glass member 32B and the interlayer film 1B. The interlayer film 1B is arranged between the first lamination glass member 31B and the second lamination glass member 32B to be sandwiched therebetween. The first lamination glass member 31B is layered on a first surface (one surface) of the interlayer film 1B. The second lamination glass member 32B is layered on a second surface (other surface) opposite to the first surface of the interlayer film 1B. The first lamination glass member 31B is layered on the outer surface of the second layer 12B in the interlayer film 1B. The second lamination glass member 32B is layered on the outer surface of the third layer 13B in the interlayer film 1B.

FIG. 8 is a sectional view schematically showing an example of laminated glass prepared with the interlayer film for laminated glass shown in FIG. 4.

Laminated glass 21C shown in FIG. 8 includes a first lamination glass member 31C, a second lamination glass member 32C and the interlayer film 1C. The interlayer film 1C is arranged between the first lamination glass member 31C and the second lamination glass member 32C to be sandwiched therebetween. The first lamination glass member 31C is layered on a first surface (one surface) of the interlayer film 1C. The second lamination glass member 32C is layered on a second surface (other surface) opposite to the first surface of the interlayer film 1C.

Examples of the lamination glass member include a glass plate, a PET (polyethylene terephthalate) film, and the like. As the laminated glass, laminated glass in which an interlayer film is sandwiched between a glass plate and a PET film or the like, as well as laminated glass in which an interlayer film is sandwiched between two glass plates, is included. The laminated glass is a laminate including a glass plate, and it is preferred that at least one glass plate be used. It is preferred that each of the first lamination glass member and the second lamination glass member be a glass plate or a PET film and at least one among the first lamination glass member and the second lamination glass member be a glass plate.

Examples of the glass plate include a sheet of inorganic glass and a sheet of organic glass. Examples of the inorganic glass include float plate glass, heat ray-absorbing plate glass, heat ray-reflecting plate glass, polished plate glass, figured glass, wired plate glass, and the like. The organic glass is synthetic resin glass substituted for inorganic glass. Examples of the organic glass include a polycarbonate plate, a poly(meth)acrylic resin plate, and the like. Examples of the poly(meth)acrylic resin plate include a polymethyl (meth) acrylate plate, and the like.

The thickness of the lamination glass member is preferably 1 mm or more, preferably 5 mm or less and more preferably 3 mm or less. Moreover, when the lamination glass member is a glass plate, the thickness of the glass plate is preferably 1 mm or more, and is preferably 5 mm or less and more preferably 3 mm or less. When the lamination glass member is a PET film, the thickness of the PET film is preferably 0.03 mm or more and preferably 0.5 mm or less.

The method for producing the laminated glass is not particularly limited. First, the interlayer film is sandwiched between the first lamination glass member and the second lamination glass member to obtain a laminate. Then, for example, by passing the obtained laminate through pressure rolls or subjecting the obtained laminate to decompression suction in a rubber bag, the air remaining between the first and the second lamination glass members and the interlayer film is removed. Then, the laminate is preliminarily bonded together at about 70 to 110° C. to obtain a preliminarily press-bonded laminate. Next, by putting the preliminarily press-bonded laminate into an autoclave or by pressing the laminate, the laminate is press-bonded at about 120 to 150°

C. and under a pressure of 1 to 1.5 MPa. In this way, laminated glass can be obtained.

Each of the interlayer film and the laminated glass can be used for automobiles, railway vehicles, aircraft, ships, buildings and the like. Each of the interlayer film and the laminated glass can also be used for applications other than these applications. It is preferred that the interlayer film and the laminated glass be an interlayer film and laminated glass for vehicles or for buildings respectively, and it is more preferred that the interlayer film and the laminated glass be an interlayer film and laminated glass for vehicles respectively. Each of the interlayer film and the laminated glass can be used for a windshield, side glass, rear glass, roof glass or glass for backlight of an automobile, and the like. The interlayer film and the laminated glass are suitably used for automobiles. The interlayer film is used for obtaining laminated glass of an automobile.

In the present invention, since it is possible to prevent generation of a void in an end part of laminated glass, and it is possible to keep the appearance of laminated glass excellent, the laminated glass is suitably used as side glass, roof glass or glass for backlight in an automobile. The side glass is visually recognized easily. The quality of the roof glass is easily altered by the sunlight or the like. Regarding the glass for backlight, a defect in appearance is easily recognized by backlight. By using the laminated glass according to the present invention as side glass, roof glass or glass for backlight, it is possible to achieve excellent appearance and suppress the alternation in quality. The laminated glass is laminated glass that is to be used as glass for windshield in an automobile, and it is preferred that black coating be not applied on a contact surface between the interlayer film and a lamination glass member on an outer side of the automobile.

Hereinafter, the present invention will be described in more detail with reference to examples and comparative examples. The present invention is not limited only to these examples.

In polyvinyl acetal resins used, n-butyraldehyde which has 4 carbon atoms is used for the acetalization. With regard to the polyvinyl acetal resin, the acetalization degree (the butyralization degree), the acetylation degree and the content of the hydroxyl group were measured by a method in accordance with JIS K6728 "Testing methods for polyvinyl butyral". In this connection, even in the cases of being measured according to ASTM D1396-92, numerical values similar to those obtained by a method in accordance with JIS K6728 "Testing methods for polyvinyl butyral" were exhibited.

(Examples 1 to 7 and Comparative Example 1)

The following light stabilizers were used.
"Tinuvin 770" available from BASF
"Tinuvin 765" available from BASF
"Tinuvin 123" available from BASF
"LA-63P" available from ADEKA Preparation of Composition for Forming Interlayer Film:

The following ingredients were mixed, and kneaded sufficiently with a mixing roll to obtain a composition for forming an interlayer film.

Polyvinyl acetal resin (content of hydroxyl group: 30.5% by mole, acetylation degree: 1% by mole, acetalization degree: 68.5% by mole): 100 parts by weight 40 parts by weight of triethylene glycol di-2-ethylhexanoate (3GO) which is a plasticizer An amount that is 0.2 parts by weight in the obtained interlayer film of an ultraviolet ray screening agent (2-(2-hydroxy-3-t-butyl-5-methylphenyl)-5-chlorobenzotriazole)

An amount that is 0.2 parts by weight in the obtained interlayer film of an oxidation inhibitor (2,6-di-t-butyl-p-cresol)

Light stabilizer shown in the following Table 1 (not used in Comparative Example 1)

An amount that is a metal element concentration (Mg concentration) of 70 ppm in the obtained interlayer film of a Mg mixture (50:50 (weight ratio) mixture of magnesium 2-ethylbutyrate and magnesium acetate)

Preparation of Interlayer Film:

The composition for forming an interlayer film was extruded by using an extruder. In Examples 1 to 7, one end (first region) side of the extrudate was dipped in a liquid containing the light stabilizer shown in the Table 1 to increase the content of the light stabilizer in one end (first region) side. The first region extending for 5% inwardly from one end of the widthwise direction is formed of the composition for forming a first region, and the remaining region was formed of the composition for forming regions other than the first region, and thus an interlayer film (760 µm thick) was prepared (see FIG. 4, illustration of the first region is omitted).

Preparation of Laminated Glass:

The obtained interlayer film was cut out into a piece of 8 cm long×8 cm wide. Then the interlayer film was sandwiched between two sheets of clear glass (8 cm long×7 cm wide×2.5 mm thick), and vacuum-pressed by retention at 90° C. for 30 minutes with a vacuum laminator, to obtain a laminate. In the laminate, the part of the interlayer film protruding from the clear glass was cut off, to obtain laminated glass.

Examples 8 to 12 and Comparative Example 2

The following ultraviolet ray screening agents were used.
"Tinuvin 405" available from BASF
"Hostavin PR-25" available from CLARIANT
"Tinuvin 326" available from BASF
"Eversorb89" available from Everlight Chemical Industrial Co.

The following light stabilizers were used.
"Tinuvin 765" available from BASF
"Tinuvin 123" available from BASF Preparation of Composition for Forming Interlayer Film:

The following ingredients were mixed, and kneaded sufficiently with a mixing roll to obtain a composition for forming an interlayer film.

Polyvinyl acetal resin (content of hydroxyl group: 30.5% by mole, acetylation degree: 1% by mole, acetalization degree: 68.5% by mole): 100 parts by weight 40 parts by weight of triethylene glycol di-2-ethylhexanoate (3GO) which is a plasticizer Ultraviolet ray screening agent shown in the following Table 2

An amount that is 0.2 parts by weight in the obtained interlayer film of an oxidation inhibitor (2,6-di-t-butyl-p-cresol)

An amount that is a metal element concentration (Mg concentration) of 70 ppm in the obtained interlayer film of a Mg mixture (50:50 (weight ratio) mixture of magnesium 2-ethylbutyrate and magnesium acetate)

Preparation of Interlayer Film:

The composition for forming an interlayer film was extruded by using an extruder. In Example 8, one end (first region) side of the extrudate was dipped in a liquid containing the ultraviolet ray screening agent shown in the Table 2 to increase the content of the ultraviolet ray screening agent in one end (first region) side. In Examples 9 to 12, one end (first region) side of the extrudate was dipped in a liquid containing the ultraviolet ray screening agent and the light stabilizer shown in the Table 2 to increase the content of the ultraviolet ray screening agent and the light stabilizer in one end (first region) side. The first region extending for 5% inwardly from one end of the widthwise direction is formed of the composition for forming a first region, and the remaining region was formed of the composition for forming regions other than the first region, and thus an interlayer film (760 μm thick) was prepared (see FIG. 4, illustration of the first region is omitted).

Preparation of Laminated Glass:

The obtained interlayer film was cut out into a piece of 8 cm long×8 cm wide. Then the interlayer film was sandwiched between two sheets of clear glass (8 cm long×7 cm wide×2.5 mm thick), and vacuum-pressed by retention at 90° C. for 30 minutes with a vacuum laminator, to obtain a laminate. In the laminate, the part of the interlayer film protruding from the clear glass was cut off, to obtain laminated glass.

Examples 13 to 19 and Comparative Examples 3 to 6

The following oxidation inhibitors were used.
"SUMILIZER BHT" ("BHT" in Table) available from Sumitomo Chemical Co., Ltd.
"IRGANOX 245" available from BASF
"ADK STAB A0-40" ("AO-40" in Table) available from ADEKA CORPORATION
"IRGANOX 1010" available from BASF
The following light stabilizers were used.
"Tinuvin 765" available from BASF
"Tinuvin 123" available from BASF Preparation of Composition for Forming Interlayer Film:

The following ingredients were mixed, and kneaded sufficiently with a mixing roll to obtain a composition for forming an interlayer film.

Polyvinyl acetal resin (content of hydroxyl group: 30.5% by mole, acetylation degree: 1% by mole, acetalization degree: 68.5% by mole): 100 parts by weight 40 parts by weight of triethylene glycol di-2-ethylhexanoate (3GO) which is a plasticizer An amount that is 0.2 parts by weight in the obtained interlayer film of an ultraviolet ray screening agent (2-(2-hydroxy-3-t-butyl-5-methylphenyl)-5-chlorobenzotriazole)

Oxidation Inhibitor Shown in the Following Table 3

An amount that is a metal element concentration (Mg concentration) of 70 ppm in the obtained interlayer film of a Mg mixture (50:50 (weight ratio) mixture of magnesium 2-ethylbutyrate and magnesium acetate)

Preparation of Interlayer Film:

The composition for forming an interlayer film was extruded by using an extruder. In Examples 13 to 16, one end (first region) side of the extrudate was dipped in a liquid containing the oxidation inhibitor shown in the Table 3 to increase the content of the oxidation inhibitor in one end (first region) side. In Examples 17 to 19, one end (first region) side of the extrudate was dipped in a liquid containing the oxidation inhibitor and the light stabilizer shown in the Table 3 to increase the content of the oxidation inhibitor and the light stabilizer in one end (first region) side. The first region extending for 5% inwardly from one end of the widthwise direction is formed of the composition for forming a first region, and the remaining region was formed of the composition for forming regions other than the first region, and thus an interlayer film (760 μm thick) was prepared (see FIG. 4, illustration of the first region is omitted).

Preparation of Laminated Glass:

The obtained interlayer film was cut out into a piece of 8 cm long×8 cm wide. Then the interlayer film was sandwiched between two sheets of clear glass (8 cm long×7 cm wide×2.5 mm thick), and vacuum-pressed by retention at 90° C. for 30 minutes with a vacuum laminator, to obtain a laminate. In the laminate, the part of the interlayer film protruding from the clear glass was cut off, to obtain laminated glass.

Examples 20 to 29 and Comparative Examples 7, 8

Preparation of Composition for Forming First Layer:

The following ingredients were mixed, and kneaded sufficiently with a mixing roll to obtain a composition for forming a first layer.

Polyvinyl acetal resin (content of hydroxyl group: 30.5 % by mole, acetylation degree: 1% by mole, acetalization degree: 68.5% by mole): 100 parts by weight 40 parts by weight of triethylene glycol di-2-ethylhexanoate (3GO) which is a plasticizer An amount that is 0.2 parts by weight in the obtained interlayer film of an ultraviolet ray screening agent (2-(2-hydroxy-3-t-butyl-5-methylphenyl)-5-chlorobenzotriazole)

An amount that is 0.2 parts by weight in the obtained interlayer film of an oxidation inhibitor (2,6-di-t-butyl-p-cresol)

Light stabilizer shown in the following Table 4 (not used in Comparative Examples 7,8)

An amount that is a metal element concentration (Mg concentration) of 70 ppm in the obtained interlayer film of a Mg mixture (50:50 (weight ratio) mixture of magnesium 2-ethylbutyrate and magnesium acetate)

Preparation of Composition for Forming Colored Layer:

The following ingredients were mixed, and kneaded sufficiently with a mixing roll to obtain a composition for forming a colored layer. The content of the coloring agent was adjusted so that the visible light transmittance is the value shown in the following Table 4.

Polyvinyl acetal resin (content of hydroxyl group: 30.5% by mole, acetylation degree: 1% by mole, acetalization degree: 68.5% by mole): 100 parts by weight 40 parts by weight of triethylene glycol di-2-ethylhexanoate (3GO) which is a plasticizer An amount that is 0.2 parts by weight in the obtained interlayer film of an ultraviolet ray screening agent (2-(2-hydroxy-3-t-butyl-5-methylphenyl)-5-chlorobenzotriazole)

An amount that is 0.2 parts by weight in the obtained interlayer film of an oxidation inhibitor (2,6-di-t-butyl-p-cresol)

Light stabilizer shown in the following Table 4 (not used in Comparative Examples 7,8)

Coloring agent (anthraquinone blue (C.I.:S.B.36))

Preparation of Interlayer Film:

The composition for forming a first layer, and the composition for forming a colored layer were coextruded by using a co-extruder. In Examples 20 to 29, the colored part side of the extrudate was dipped in a liquid containing the light stabilizer shown in the Table 4 to increase the content of the light stabilizer in the colored part side. In this manner, an interlayer film (760 μm thick) including the first layer (760 μm thick in the non-colored part) and a colored layer partially embedded in the first layer was prepared (see FIG. 2).

In Examples 20 to 29, the content of the light stabilizer in the colored layer was set to be smaller than the content of the light stabilizer in the first layer.

Preparation of Laminated Glass:

The obtained interlayer film was cut out into a piece of 8 cm long×8 cm wide. Then the interlayer film was sandwiched between two sheets of clear glass (8 cm long×7 cm wide×2.5 mm thick), and vacuum-pressed by retention at 90° C. for 30 minutes with a vacuum laminator, to obtain a laminate. In the laminate, the part of the interlayer film protruding from the clear glass was cut off, to obtain laminated glass.

Examples 30 to 34 and Comparative Example 9

Preparation of Composition for Forming First Layer:

The following ingredients were mixed, and kneaded sufficiently with a mixing roll to obtain a composition for forming a first layer.

Polyvinyl acetal resin (content of hydroxyl group: 30.5% by mole, acetylation degree: 1% by mole, acetalization degree: 68.5% by mole): 100 parts by weight 40 parts by weight of triethylene glycol di-2-ethylhexanoate (3GO) which is a plasticizer Ultraviolet ray screening agent shown in the following Table 5

An amount that is 0.2 parts by weight in the obtained interlayer film of an oxidation inhibitor (2,6-di-t-butyl-p-cresol)

An amount that is a metal element concentration (Mg concentration) of 70 ppm in the obtained interlayer film of a Mg mixture (50:50 (weight ratio) mixture of magnesium 2-ethylbutyrate and magnesium acetate)

Preparation of Composition for Forming Colored Layer:

The following ingredients were mixed, and kneaded sufficiently with a mixing roll to obtain a composition for forming a colored layer. The content of the coloring agent was adjusted so that the visible light transmittance is the value shown in the following Table 5.

Polyvinyl acetal resin (content of hydroxyl group: 30.5% by mole, acetylation degree: 1% by mole, acetalization degree: 68.5% by mole): 100 parts by weight 40 parts by weight of triethylene glycol di-2-ethylhexanoate (3GO) which is a plasticizer Ultraviolet ray screening agent shown in the following Table 5

An amount that is 6.2 parts by weight in the obtained interlayer film of an oxidation inhibitor (2,6-di-t-butyl-p-cresol)

Coloring agent (anthraquinone blue (C.I.:S.B.36))

Preparation of Interlayer Film:

The composition for forming a first layer, and the composition for forming a colored layer were coextruded by using a co-extruder. In Example 30, the colored part side of the extrudate was dipped in a liquid containing the ultraviolet ray screening agent shown in the Table 5 to increase the content of the ultraviolet ray screening agent in the colored part side. In Examples 31 to 34, the colored part side of the extrudate was dipped in a liquid containing the ultraviolet ray screening agent and the light stabilizer shown in the Table 5 to increase the content of the ultraviolet ray screening agent and the light stabilizer in the colored part side. In this manner, an interlayer film (760 μm thick) including the first layer (760 μm thick in the non-colored part) and a colored layer partially embedded in the first layer was prepared (see FIG. 2).

In Examples 30 to 34, the content of the ultraviolet ray screening agent in the colored layer was set to be smaller than the content of the ultraviolet ray screening agent in the first layer.

Preparation of Laminated Glass:

The obtained interlayer film was cut out into a piece of 8 cm long×8 cm wide. Then the interlayer film was sandwiched between two sheets of clear glass (8 cm long×7 cm wide×2.5 mm thick), and vacuum-pressed by retention at 90° C. for 30 minutes with a vacuum laminator, to obtain a laminate. In the laminate, the part of the interlayer film protruding from the clear glass was cut off, to obtain laminated glass.

Examples 35 to 41 and Comparative Examples 10 to 13

Preparation of Composition for Forming First Layer:

The following ingredients were mixed, and kneaded sufficiently with a mixing roll to obtain a composition for forming a first layer.

Polyvinyl acetal resin (content of hydroxyl group: 30.5% by mole, acetylation degree: 1% by mole, acetalization degree: 68.5% by mole): 100 parts by weight 40 parts by weight of triethylene glycol di-2-ethylhexanoate (3GO) which is a plasticizer An amount that is 0.2 parts by weight in the obtained interlayer film of an ultraviolet ray screening agent (2-(2-hydroxy-3-t-butyl-5-methylphenyl)-5-chlorobenzotriazole)

Oxidation inhibitors shown in the following Table 6

An amount that is a metal element concentration (Mg concentration) of 70 ppm in the obtained interlayer film of a Mg mixture (50:50 (weight ratio) mixture of magnesium 2-ethylbutyrate and magnesium acetate)

Preparation of Composition for Forming Colored Layer:

The following ingredients were mixed, and kneaded sufficiently with a mixing roll to obtain a composition for forming a colored layer. The content of the coloring agent was adjusted so that the visible light transmittance is the value shown in the following Table 6.

Polyvinyl acetal resin (content of hydroxyl group: 30.5% by mole, acetylation degree: 1% by mole, acetalization degree: 68.5% by mole): 100 parts by weight 40 parts by weight of triethylene glycol di-2-ethylhexanoate (3GO) which is a plasticizer An amount that is 0.2 parts by weight in the obtained interlayer film of an ultraviolet ray screening agent (2-(2-hydroxy-3-t-butyl-5-methylphenyl)-5-chlorobenzotriazole)

Oxidation inhibitors shown in the following Table 6

Coloring agent (anthraquinone blue (C.I.:S.B.36))

Preparation of Interlayer Film:

The composition for forming a first layer, and the composition for forming a colored layer were coextruded by using a co-extruder. In Examples 35 to 38, the colored part side of the extrudate was dipped in a liquid containing the oxidation inhibitor shown in the Table 6 to increase the content of the oxidation inhibitor in the colored part side. In Examples 39 to 41, the colored part side of the extrudate was dipped in a liquid containing the oxidation inhibitor and the light stabilizer shown in the Table 6 to increase the content of the oxidation inhibitor and the light stabilizer in the colored part side. In this manner, an interlayer film (760 μm thick) including the first layer (760 μm thick in the non-colored part) and a colored layer partially embedded in the first layer was prepared (see FIG. 2).

In Examples 35 to 41, the content of the oxidation inhibitor in the colored layer was set to be smaller than the content of the oxidation inhibitor in the first layer.

Preparation of Laminated Glass:

The obtained interlayer film was cut out into a piece of 8 cm long×8 cm wide. Then the interlayer film was sandwiched between two sheets of clear glass (8 cm long×7 cm wide×2.5 mm thick), and vacuum-pressed by retention at 90° C. for 30 minutes with a vacuum laminator, to obtain a laminate. In the laminate, the part of the interlayer film protruding from the clear glass was cut off, to obtain laminated glass.

Examples 45 to 50 and Comparative Example 14

Preparation of Composition for Forming First Layer:

The following ingredients were mixed, and kneaded sufficiently with a mixing roll to obtain a composition for forming a first layer.

Polyvinyl acetal resin (content of hydroxyl group: 22% by mole, acetylation degree: 13% by mole, acetalization degree: 65% by mole): 100 parts by weight 60 parts by weight of triethylene glycol di-2-ethylhexanoate (3GO) which is a plasticizer An amount that is 0.2 parts by weight in the obtained interlayer film of an ultraviolet ray screening agent (2-(2-hydroxy-3-t-butyl-5-methylphenyl)-5-chlorobenzotriazole)

An amount that is 0.2 parts by weight in the obtained interlayer film of an oxidation inhibitor (2,6-di-t-butyl-p-cresol)

Light stabilizer shown in the following Table 7 (not used in Comparative Example 14)

Preparation of Composition for Forming Second Layer and Third Layer:

The following ingredients were mixed, and kneaded sufficiently with a mixing roll to obtain a composition for forming a second layer and a third layer.

Polyvinyl acetal resin (content of hydroxyl group: 30.5% by mole, acetylation degree: 1% by mole, acetalization degree: 68.5% by mole): 100 parts by weight 38 parts by weight of triethylene glycol di-2-ethylhexanoate (3GO) which is a plasticizer An amount that is 0.2 parts by weight in the obtained interlayer film of an ultraviolet ray screening agent (2-(2-hydroxy-3-t-butyl-5-methylphenyl)-5-chlorobenzotriazole)

An amount that is 0.2 parts by weight in the obtained interlayer film of an oxidation inhibitor (2,6-di-t-butyl-p-cresol)

Light stabilizer shown in the following Table 7 (not used in Comparative Example 14)

An amount that is a metal element concentration (Mg concentration) of 70 ppm in the obtained interlayer film of a Mg mixture (50:50 (weight ratio) mixture of magnesium 2-ethylbutyrate and magnesium acetate)

Preparation of Interlayer Film:

The composition for forming a first layer, and the composition for forming a second layer and a third layer were coextruded by using a co-extruder. In Examples 42 to 50, one end (first region) side of the extrudate was dipped in a liquid containing the light stabilizer shown in the Table 7 to increase the content of the light stabilizer in one end (first region) side. An interlayer film (760 μm thick) including the second layer (330 μm thick), the colored layer partially embedded in the second layer, the first layer (100 μm thick) and the third layer (330 μm thick) in one end side of the widthwise direction was prepared (see FIG. 3, illustration of the first region is omitted).

In Examples 42 to 50, the content of the light stabilizer in the first layer was set to be larger than the content of the light stabilizer in the second layer and the third layer.

Examples 51 to 55 and Comparative Example 15

Preparation of Composition for Forming First Layer:

The following ingredients were mixed, and kneaded sufficiently with a mixing roll to obtain a composition for forming a first layer.

Polyvinyl acetal resin (content of hydroxyl group: 22% by mole, acetylation degree: 13% by mole, acetalization degree: 65% by mole): 100 parts by weight 60 parts by weight of triethylene glycol di-2-ethylhexanoate (3GO) which is a plasticizer Ultraviolet ray screening agent shown in the following Table 8

An amount that is 0.2 parts by weight in the obtained interlayer film of an oxidation inhibitor (2,6-di-t-butyl-p-cresol)

Preparation of Composition for Forming Second Layer and Third Layer:

The following ingredients were mixed, and kneaded sufficiently with a mixing roll to obtain a composition for forming a second layer and a third layer.

Polyvinyl acetal resin (content of hydroxyl group: 30.5% by mole, acetylation degree: 1% by mole, acetalization degree: 68.5% by mole): 100 parts by weight 38 parts by weight of triethylene glycol di-2-ethylhexanoate (3GO) which is a plasticizer Ultraviolet ray screening agent shown in the following Table An amount that is 0.2 parts by weight in the obtained interlayer film of an oxidation inhibitor (2,6-di-t-butyl-p-cresol)

An amount that is a metal element concentration (Mg concentration) of 70 ppm in the obtained interlayer film of a Mg mixture (50:50 (weight ratio) mixture of magnesium 2-ethylbutyrate and magnesium acetate)

Preparation of Interlayer Film:

The composition for forming a first layer, and the composition for forming a second layer and a third layer were coextruded by using a co-extruder. In Example 51, one end (first region) side of the extrudate was dipped in a liquid containing the ultraviolet ray screening agent shown in the Table 8 to increase the content of the ultraviolet ray screening agent in one end (first region) side. In Examples 52 to 55, one end (first region) side of the extrudate was dipped in a liquid containing the ultraviolet ray screening agent and the light stabilizer shown in the Table 8 to increase the content of the ultraviolet ray screening agent and the light stabilizer in one end (first region) side. An interlayer film (760 μm thick) including the second layer (330 μm thick), the colored layer partially embedded in the second layer, the first layer (100 μm thick) and the third layer (330 μm thick) in one end side of the widthwise direction was prepared (see FIG. 3, illustration of the first region is omitted), In Examples 51 to 55, the content of the ultraviolet ray screening agent in the first layer was set to be larger than the content of the ultraviolet ray screening agent in the second layer and the third layer.

Examples 56 to 62 and Comparative Examples 16 to 19

Preparation of Composition for Forming First Layer:

The following ingredients were mixed, and kneaded sufficiently with a mixing roll to obtain a composition for forming a first layer.

Polyvinyl acetal resin (content of hydroxyl group: 22% by mole, acetylation degree: 13% by mole, acetalization degree: 65% by mole): 100 parts by weight 60 parts by weight of triethylene glycol di-2-ethylhexanoate (3GO) which is a plasticizer An amount that is 0.2 parts by weight in the obtained interlayer film of an ultraviolet ray screening agent (2-(2-hydroxy-3-t-butyl-5-methylphenyl)-5-chlorobenzotriazole)

Oxidation inhibitors shown in the following Table 9

Preparation of Composition for Forming Second Layer and Third Layer:

The following ingredients were mixed, and kneaded sufficiently with a mixing roll to obtain a composition for forming a second layer and a third layer.

Polyvinyl acetal resin (content of hydroxyl group: 30.5% by mole, acetylation degree: 1% by mole, acetalization degree: 68.5% by mole): 100 parts by weight 38 parts by weight of triethylene glycol di-2-ethylhexanoate (3GO) which is a plasticizer An amount that is 0.2 parts by weight in the obtained interlayer film of an ultraviolet ray screening agent (2-(2-hydroxy-3-t-butyl-5-methylphenyl)-5-chlorobenzotriazole)

Oxidation inhibitors shown in the following Table 9

An amount that is a metal element concentration (Mg concentration) of 70 ppm in the obtained interlayer film of a Mg mixture (50:50 (weight ratio) mixture of magnesium 2-ethylbutyrate and magnesium acetate)

Preparation of Interlayer Film:

The composition for forming a first layer, and the composition for forming a second layer and a third layer were coextruded by using a co-extruder. In Examples 56 to 59, one end (first region) side of the extrudate was dipped in a liquid containing the oxidation inhibitor shown in the Table 9 to increase the content of the oxidation inhibitor in one end (first region) side. In Examples 60 to 62, one end (first region) side of the extrudate was dipped in a liquid containing the oxidation inhibitor and the light stabilizer shown in the Table 9 to increase the content of the oxidation inhibitor and the light stabilizer in one end (first region) side. An interlayer film (760 μm thick) including the second layer (330 μm thick), the colored layer partially embedded in the second layer, the first layer (100 μm thick) and the third layer (330 μm thick) in one end side of the widthwise direction was prepared (see FIG. 3, illustration of the first region is omitted).

In Examples 56 to 62, the content of the oxidation inhibitor in the first layer was set to be larger than the content of the oxidation inhibitor in the second layer and the third layer.

Examples 63 to 71 and Comparative Example 20

Preparation of Composition for Forming First Layer:

The following ingredients were mixed, and kneaded sufficiently with a mixing roll to obtain a composition for forming a first layer.

Polyvinyl acetal resin (content of hydroxyl group: 22% by mole, acetylation degree: 13% by mole, acetalization degree: 65% by mole): 100 parts by weight 60 parts by weight of triethylene glycol di-2-ethylhexanoate (3GO) which is a plasticizer An amount that is 0.2 parts by weight in the obtained interlayer film of an ultraviolet ray screening agent (2-(2-hydroxy-3-t-butyl-5-methylphenyl)-5-chlorobenzotriazole)

An amount that is 0.2 parts by weight in the obtained interlayer film of an oxidation inhibitor (2,6-di-t-butyl-p-cresol)

Light stabilizer shown in the following Table 10 (not used in Comparative Example 20)

Preparation of Composition for Forming Second Layer and Third Layer:

The following ingredients were mixed, and kneaded sufficiently with a mixing roll to obtain a composition for forming a second layer and a third layer.

Polyvinyl acetal resin (content of hydroxyl group: 30.5% by mole, acetylation degree: 1% by mole, acetalization degree: 68.5% by mole): 100 parts by weight 38 parts by weight of triethylene glycol di-2-ethylhexanoate (3GO) which is a plasticizer An amount that is 0.2 parts by weight in the obtained interlayer film of an ultraviolet ray screening agent (2-(2-hydroxy-3-t-butyl-5-methylphenyl)-5-chlorobenzotriazole)

An amount that is 0.2 parts by weight in the obtained interlayer film of an oxidation inhibitor (2,6-di-t-butyl-p-cresol)

Light stabilizer shown in the following Table 10 (not used in Comparative Example 20)

An amount that is a metal element concentration (Mg concentration) of 70 ppm in the obtained interlayer film of a Mg mixture (50:50 (weight ratio) mixture of magnesium 2-ethylbutyrate and magnesium acetate)

Preparation of Composition for Forming Colored Layer:

The following ingredients were mixed, and kneaded sufficiently with a mixing roll to obtain a composition for forming a colored layer. The content of the coloring agent was adjusted so that the visible light transmittance is the value shown in the following Table 10.

Polyvinyl acetal resin (content of hydroxyl group: 30.5% by mole, acetylation degree: 1% by mole, acetalization degree: 68.5% by mole): 100 parts by weight 38 parts by weight of triethylene glycol di-2-ethylhexanoate (3GO) which is a plasticizer An amount that is 0.2 parts by weight in the obtained interlayer film of an ultraviolet ray screening agent (2-(2-hydroxy-3-t-butyl-5-methylphenyl)-5-chlorobenzotriazole)

An amount that is 0.2 parts by weight in the obtained interlayer film of an oxidation inhibitor (2,6-di-t-butyl-p-cresol)

Light stabilizer shown in the following Table 10 (not used in Comparative Example 20)

Coloring agent (anthraquinone blue (C.I.:S.B.36))

Preparation of Interlayer Film:

The composition for forming a first layer, the composition for forming a second layer and a third layer, and the composition for forming a colored layer were coextruded by using a co-extruder. In Examples 63 to 71, the colored part side of the extrudate was dipped in a liquid containing the light stabilizer shown in the Table 10 to increase the content of the light stabilizer in the colored part side. An interlayer film (760 μm thick) including the second layer (330 μm thick in the non-colored part), the colored layer partially embedded in the second layer, the first layer (100 μm thick in the non-colored part) and the third layer (330 μm thick in the non-colored part) in one end side of the widthwise direction was prepared (see FIG. 1).

In Examples 63 to 71, the content of the light stabilizer in the first layer was set to be larger than the content of the light stabilizer in the second layer and the third layer.

In Examples 63 to 71, the content of the light stabilizer in the colored layer was set to be smaller than the content of the light stabilizer in the second layer and the third layer.
Preparation of Laminated Glass:

The obtained interlayer film was cut out into a piece of 8 cm long×8 cm wide. Then the interlayer film was sandwiched between two sheets of clear glass (8 cm long×7 cm wide×2.5 mm thick), and vacuum-pressed by retention at 90° C. for 30 minutes with a vacuum laminator, to obtain a laminate. In the laminate, the part of the interlayer film protruding from the clear glass was cut off, to obtain laminated glass.

Examples 72 to 76 and Comparative Example 21

Preparation of Composition for Forming First Layer:

The following ingredients were mixed, and kneaded sufficiently with a mixing roll to obtain a composition for forming a first layer.

Polyvinyl acetal resin (content of hydroxyl group: 22% by mole, acetylation degree: 13% by mole, acetalization degree: 65% by mole): 100 parts by weight 60 parts by weight of triethylene glycol di-2-ethylhexanoate (3GO) which is a plasticizer Ultraviolet ray screening agent shown in the following Table 11

An amount that is 0.2 parts by weight in the obtained interlayer film of an oxidation inhibitor (2,6-di-t-butyl-p-cresol)
Preparation of Composition for Forming Second Layer and Third Layer:

The following ingredients were mixed, and kneaded sufficiently with a mixing roll to obtain a composition for forming a second layer and a third layer.

Polyvinyl acetal resin (content of hydroxyl group: 30.5% by mole, acetylation degree: 1% by mole, acetalization degree: 68.5% by mole): 100 parts by weight 38 parts by weight of triethylene glycol di-2-ethylhexanoate (3GO) which is a plasticizer Ultraviolet ray screening agent shown in the following Table 11

An amount that is 0.2 parts by weight in the obtained interlayer film of an oxidation inhibitor (2,6-di-t-butyl-p-cresol)

An amount that is a metal element concentration (Mg concentration) of 70 ppm in the obtained interlayer film of a Mg mixture (50:50 (weight ratio) mixture of magnesium 2-ethylbutyrate and magnesium acetate)
Preparation of Composition for Forming Colored Layer:

The following ingredients were mixed, and kneaded sufficiently with a mixing roll to obtain a composition for forming a colored layer. The content of the coloring agent was adjusted so that the visible light transmittance is the value shown in the following Table 11.

Polyvinyl acetal resin (content of hydroxyl group: 30.5% by mole, acetylation degree: 1% by mole, acetalization degree: 68.5% by mole): 100 parts by weight 38 parts by weight of triethylene glycol di-2-ethylhexanoate (3GO) which is a plasticizer Ultraviolet ray screening agent shown in the following Table 11

An amount that is 0.2 parts by weight in the obtained interlayer film of an oxidation inhibitor (2,6-di-t-butyl-p-cresol)

Coloring agent (anthraquinone blue (C.I.:S.B.36))
Preparation of Interlayer Film:

The composition for forming a first layer, the composition for forming a second layer and a third layer, and the composition for forming a colored layer were coextruded by using a co-extruder. In Example 72, the colored part side of the extrudate was dipped in a liquid containing the ultraviolet ray screening agent shown in the Table 11 to increase the content of the ultraviolet ray screening agent in the colored part side. In Examples 73 to 76, the colored part side of the extrudate was dipped in a liquid containing the ultraviolet ray screening agent and the light stabilizer shown in the Table 11 to increase the content of the ultraviolet ray screening agent and the light stabilizer in the colored part side. An interlayer film (760 μm thick) including the second layer (330 μm thick in the non-colored part), the colored layer partially embedded in the second layer, the first layer (100 μm thick in the non-colored part) and the third layer (330 μm thick in the non-colored part) in one end side of the widthwise direction was prepared (see FIG. 1).

In Examples 72 to 76, the content of the ultraviolet ray screening agent in the first layer was set to be larger than the content of the ultraviolet ray screening agent in the second layer and the third layer.

In Examples 72 to 76, the content of the ultraviolet ray screening agent in the colored layer was set to be smaller than the content of the ultraviolet ray screening agent in the second layer and the third layer.
Preparation of Laminated Glass:

The obtained interlayer film was cut out into a piece of 8 cm long×8 cm wide. Then the interlayer film was sandwiched between two sheets of clear glass (8 cm long×7 cm wide×2.5 mm thick), and vacuum-pressed by retention at 90° C. for 30 minutes with a vacuum laminator, to obtain a laminate. In the laminate, the part of the interlayer film protruding from the clear glass was cut off, to obtain laminated glass.

Examples 77 to 83 and Comparative Examples 22 to 25

Preparation of Composition for Forming First Layer:

The following ingredients were mixed, and kneaded sufficiently with a mixing roll to obtain a composition for forming a first layer.

Polyvinyl acetal resin (content of hydroxyl group: 22% by mole, acetylation degree: 13% by mole, acetalization degree: 65% by mole): 100 parts by weight 60 parts by weight of triethylene glycol di-2-ethylhexanoate (3GO) which is a plasticizer An amount that is 0.2 parts by weight in the obtained interlayer film of an ultraviolet ray screening agent (2-(2-hydroxy-3-t-butyl-5-methylphenyl)-5-chlorobenzotriazole)

Oxidation inhibitors shown in the following Table 12
Preparation of Composition for Forming Second Layer and Third Layer:

The following ingredients were mixed, and kneaded sufficiently with a mixing roll to obtain a composition for forming a second layer and a third layer.

Polyvinyl acetal resin (content of hydroxyl group: 30.5% by mole, acetylation degree: 1% by mole, acetalization degree: 68.5% by mole): 100 parts by weight 38 parts by weight of triethylene glycol di-2-ethylhexanoate (3GO) which is a plasticizer An amount that is 0.2 parts by weight in the obtained interlayer film of an ultraviolet ray screening agent (2-(2-hydroxy-3-t-butyl-5-methylphenyl)-5-chlorobenzotriazole)

Oxidation inhibitors shown in the following Table 12

An amount that is a metal element concentration (Mg concentration) of 70 ppm in the obtained interlayer film of a Mg mixture (50:50 (weight ratio) mixture of magnesium 2-ethylbutyrate and magnesium acetate)

Preparation of Composition for Forming Colored Layer:

The following ingredients were mixed, and kneaded sufficiently with a mixing roll to obtain a composition for forming a colored layer. The content of the coloring agent was adjusted so that the visible light transmittance is the value shown in the following Table 12.

Polyvinyl acetal resin (content of hydroxyl group: 30.5% by mole, acetylation degree: 1% by mole, acetalization degree: 68.5% by mole): 100 parts by weight 38 parts by weight of triethylene glycol di-2-ethylhexanoate (3GO) which is a plasticizer An amount that is 0.2 parts by weight in the obtained interlayer film of an ultraviolet ray screening agent (2-(2-hydroxy-3-t-butyl-5-methylphenyl)-5-chlorobenzotriazole)

Oxidation inhibitors shown in the following Table 12

Coloring agent (anthraquinone blue (C.I.:S.B.36))

Preparation of Interlayer Film:

The composition for forming a first layer, the composition for forming a second layer and a third layer, and the composition for forming a colored layer were coextruded by using a co-extruder. In Examples 77 to 80, the colored part side of the extrudate was dipped in a liquid containing the oxidation inhibitor shown in the Table 12 to increase the content of the oxidation inhibitor in the colored part side. In Examples 81 to 83, the colored part side of the extrudate was dipped in a liquid containing the oxidation inhibitor and the light stabilizer shown in the Table 12 to increase the content of the oxidation inhibitor and the light stabilizer in the colored part side. An interlayer film (760 μm thick) including the second layer (330 μm thick in the non-colored part), the colored layer partially embedded in the second layer, the first layer (100 μm thick in the non-colored part) and the third layer (330 μm thick in the non-colored part) in one end side of the widthwise direction was prepared (see FIG. 1).

In Examples 77 to 83, the content of the oxidation inhibitor in the first layer was set to be larger than the content of the oxidation inhibitor in the second layer and the third layer.

In Examples 77 to 83, the content of the oxidation inhibitor in the colored layer was set to be smaller than the content of the oxidation inhibitor in the second layer and the third layer.

Preparation of Laminated Glass:

The obtained interlayer film was cut out into a piece of 8 cm long×8 cm wide. Then the interlayer film was sandwiched between two sheets of clear glass (8 cm long×7 cm wide×2.5 mm thick), and vacuum-pressed by retention at 90° C. for 30 minutes with a vacuum laminator, to obtain a laminate. In the laminate, the part of the interlayer film protruding from the clear glass was cut off, to obtain laminated glass.

(Evaluation)

(1) Glass Transition Temperature

After storing the interlayer film obtained in each of Examples 42 to 83 and Comparative Examples 14 to 25 at a temperature of 23° C., a humidity of 30% for 1 month or more, the plurality of layers were isolated by delamination to obtain the first layer. An object to be measured (first layer) that was press-molded by a press molder was measured by using "ARES-G2" available from TA Instruments. A parallel plate with a diameter of 8 mm was used as a jig, and the measurement was performed under the condition in which the temperature was decreased from 100° C. to −10° C. at a temperature decreasing rate of 3° C./minute and under the condition of a frequency of 1 Hz and a strain of 1%. In the measurement results obtained, the peak temperature of the loss tangent was defined as the glass transition temperature Tg (° C.).

(2) Visible Light Transmittance

In the obtained laminated glass, the visible light transmittance at a wavelength ranging from 380 to 780 nm was measured by using a spectrophotometer ("U-4100" available from Hitachi High-Tech Science Corporation) in conformity with JIS R3211:1998. As to the visible light transmittance in the colored part, visible light transmittance in the center of the colored part was measured.

(3) Condition of Void in Interlayer Film in End Part of Laminated Glass after Light Irradiation Test The obtained laminated glass was put into an oven, and heated at 100° C. for a day. Thereafter, laminated glass after heating (laminated glass before light irradiation test) was fixed to a sample fixing tool so that one of end parts of the laminated glass was exposed. From one side of the surface of the fixed laminated glass, xenon light at an irradiance of 180 w/m$^2$ (irradiance measuring wavelength 300 to 400 nm) was applied at a black panel temperature of 83° C. and a humidity of 50% RH for 240 hours. Regarding this process as one cycle, four cycles were conducted. The laminated glass after light irradiation test was obtained. As to the multilayer interlayer film, light was applied from the second layer side of the second layer and the third layer.

The end part of the laminated glass (one end side of the widthwise direction of the interlayer film) after the light irradiation test was observed, and the condition of a void in the interlayer film in the end part of the laminated glass was evaluated. The condition of a void was judged according to the following criteria.

[Criteria for Condition of Voids]

∘∘: No void observed after four cycles

∘: Void generated after four cycles, and no void observed after three cycles x: Void generated by after two cycles (4) Discoloration of Interlayer Film (ΔYI Value)

For the laminated glass obtained in each of Examples to 12, 30 to 34, 51 to 55, 72 to 76 and Comparative Examples 2, 9, 15, 21, the following was conducted. Laminated glass after the light irradiation test (four cycles) obtained in the evaluation of the aforementioned (2) was prepared.

Transmittance at a wavelength ranging from 300 to 2500 nm of laminated glass was measured by using a spectrophotometer ("U-4100" available from Hitachi High-Tech Science Corporation) in conformity with JIS K7105. In conformity with JIS K7373, a YI (yellow index) of C light in the XYZ color system was calculated.

The region for measurement of the Y value was the region spanning 5 mm from the end part toward the inside in the direction perpendicular to the end side including the end part. Transmittance at a wavelength ranging from 300 to 2500 nm of laminated glass in the early stage before conducting the light irradiation test (four cycles) was measured, and a YI value was calculated. An absolute value of difference, as ΔYI, between the YI value in the early stage and the YI value after the light irradiation test (four cycles) of laminated glass was determined. For a colored interlayer film, measurement was conducted in the colored part. The ΔYI value was judged according to the following criteria.

[Criteria for Judging in Discoloration of Interlayer Film (ΔYI Value)]

○○: ΔYI value is less than 2
○: ΔYI value is 2 or more and less than 4
x: ΔYI value is 4 or more (5) Discoloration of Interlayer Film (ΔE)

The laminated glass obtained in each of Examples 13 to 19, 35 to 41, 56 to 62, 77 to 83 and Comparative Examples 3 to 6, 10 to 13, 16 to 19, 22 to 25 was put into a heating oven, and heated at 100° C. for 8 weeks.

Change in color tone before and after heating was determined by color difference ΔE in accordance with JIS K 8781-4(2013) using a spectrophotometer ("U-4100" available from Hitachi High-Technologies Corporation). For a colored interlayer film, measurement was conducted in the colored part. Discoloration of the interlayer film was judged from color difference ΔE according to the following criteria.

[Criteria for Judging in Discoloration of Interlayer Film (ΔE)]
○○: ΔE is less than 2
○: ΔE is 2 or more and less than 4.5
x: ΔE is 4.5 or more The details and the results are shown in the following Tables 1 to 12.

TABLE 1

| | | Example 1 | Example 2 | Example 3 | Example 4 | Example 5 | Example 6 | Example 7 | Comparative Example 1 |
|---|---|---|---|---|---|---|---|---|---|
| Light stabilizer | Kind | Tinuvin770 | Tinuvin765 | Tinuvin123 | LA-63P | Tinuvin765 | Tinuvin765 | Tinuvin765 | — |
| | Content in first region (wt %) | 0.025 | 0.025 | 0.025 | 0.025 | 0.05 | 0.0025 | 0.22 | — |
| | Content in second region (wt %) | 0.02 | 0.02 | 0.02 | 0.02 | 0.01 | 0.002 | 0.2 | — |
| | Content in first region/ content in second region (ratio on weight basis) | 1.25 | 1.25 | 1.25 | 1.25 | 5 | 1.25 | 1.1 | — |
| Visible light transmittance of entire interlayer film (%) | | 88 | 88 | 88 | 88 | 88 | 88 | 88 | 88 |
| Condition of void in interlayer film in end part of laminated glass | | ○○ | ○○ | ○○ | ○○ | ○○ | ○ | ○○ | x |

TABLE 2

| | | Example 8 | Example 9 | Example 10 | Example 11 | Example 12 | Comparative Example 2 |
|---|---|---|---|---|---|---|---|
| Ultraviolet ray screening agent | Kind | Tinuvin405 | Hostavin PR-25 | Hostavin PR-25 | Tinuvin326 | Eversorb89 | Tinuvin405 |
| | Content in first region (wt %) | 0.8 | 0.4 | 0.4 | 0.5 | 0.6 | 0.05 |
| | Content in second region (wt %) | 0.2 | 0.05 | 0.1 | 0.4 | 0.4 | 0.05 |
| | Content in first region/ content in second region (ratio on weight basis) | 4 | 8 | 4 | 1.25 | 1.5 | 1 |
| Light stabilizer | Kind | — | Tinuvin765 | Tinuvin123 | Tinuvin765 | Tinuvin123 | — |
| | Content in first region (wt %) | — | 0.05 | 0.05 | 0.05 | 0.05 | — |
| Visible light transmittance of entire interlayer film (%) | | 88 | 88 | 88 | 88 | 88 | 88 |
| Condition of void in interlayer film in end part of laminated glass | | ○ | ○ | ○ | ○○ | ○○ | x |
| Discoloration of interlayer film (ΔYI value) | | ○○ | ○○ | ○○ | ○○ | ○○ | x |

TABLE 3

| | | Example 13 | Example 14 | Example 15 | Example 16 | Example 17 | Example 18 |
|---|---|---|---|---|---|---|---|
| Oxidation inhibitor | Kind | BHT | IRGANOX 245 | AO-40 | IRGANOX 1010 | IRGANOX 245 | IRGANOX 245 |
| | Content in first region (wt %) | 0.8 | 0.4 | 0.4 | 0.4 | 0.4 | 0.4 |
| | Content in second region (wt %) | 0.2 | 0.05 | 0.05 | 0.2 | 0.05 | 0.1 |
| | Content in first region/ content in second region (ratio on weight basis) | 4 | 8 | 8 | 2 | 8 | 4 |
| Light stabilizer | Kind | — | — | — | — | Tinuvin765 | Tinuvin123 |
| | Content in first region (wt %) | — | — | — | — | 0.01 | 0.01 |
| Visible light transmittance of entire interlayer film (%) | | 88 | 88 | 88 | 88 | 88 | 88 |

TABLE 3-continued

|  | | | | | | |
|---|---|---|---|---|---|---|
| Condition of void in interlayer film in end part of laminated glass | ○ | ○○ | ○○ | ○ | ○○ | ○○ |
| Discoloration of interlayer film (ΔE) | ○○ | ○○ | ○○ | ○○ | ○ | ○ |

|  |  | Example 19 | Comparative Example 3 | Comparative Example 4 | Comparative Example 5 | Comparative Example 6 |
|---|---|---|---|---|---|---|
| Oxidation inhibitor | Kind | IRGANOX 1010 | BHT | IRGANOX 245 | AO-40 | IRGANOX 1010 |
|  | Content in first region (wt %) | 0.4 | 0.4 | 0.05 | 0.05 | 0.05 |
|  | Content in second region (wt %) | 0.2 | 0.4 | 0.05 | 0.05 | 0.05 |
|  | Content in first region/ content in second region (ratio on weight basis) | 2 | 1 | 1 | 1 | 1 |
| Light stabilizer | Kind | Tinuvin765 | — | — | — | — |
|  | Content in first region (wt %) | 0.01 | — | — | — | — |
| Visible light transmittance of entire interlayer film (%) | | 88 | 88 | 88 | 88 | 88 |
| Condition of void in interlayer film in end part of laminated glass | | ○○ | x | x | x | x |
| Discoloration of interlayer film (ΔE) | | ○○ | x | ○○ | ○○ | ○○ |

TABLE 4

|  |  | Example 20 | Example 21 | Example 22 | Example 23 | Example 24 | Example 25 | Example 26 |
|---|---|---|---|---|---|---|---|---|
| Light stabilizer | Kind | Tinuvin770 | Tinuvin765 | Tinuvin123 | LA-63P | Tinuvin765 | Tinuvin765 | Tinuvin765 |
|  | Content in colored part (wt %) | 0.025 | 0.025 | 0.025 | 0.025 | 0.05 | 0.0025 | 0.22 |
|  | Content in non-colored part (wt %) | 0.02 | 0.02 | 0.02 | 0.02 | 0.01 | 0.002 | 0.2 |
|  | Content in colored part/ content in non-colored part (ratio on weight basis) | 1.25 | 1.25 | 1.25 | 1.25 | 5 | 1.25 | 1.1 |
| Visible light transmittance in non-colored part (%) | | 88 | 88 | 88 | 83 | 88 | 88 | 88 |
| Visible light transmittance in colored part (%) | | 6 | 6 | 6 | 6 | 6 | 6 | 6 |
| Condition of void in interlayer film in end part of laminated glass | | ○○ | ○○ | ○○ | ○○ | ○○ | ○ | ○○ |

|  |  |  | Example 27 | Example 28 | Example 29 | Comparative Example 7 | Comparative Example 8 |
|---|---|---|---|---|---|---|---|
| Light stabilizer | Kind | | Tinuvin765 | Tinuvin765 | Tinuvin765 | — | — |
|  | Content in colored part (wt %) | | 0.005 | 0.025 | 0.025 | — | — |
|  | Content in non-colored part (wt %) | | 0.004 | 0.02 | 0.02 | — | — |
|  | Content in colored part/ content in non-colored part (ratio on weight basis) | | 1.25 | 1.25 | 1.25 | — | — |
| Visible light transmittance in non-colored part (%) | | | 88 | 88 | 88 | 88 | 88 |
| Visible light transmittance in colored part (%) | | | 6 | 18 | 34 | 6 | 34 |
| Condition of void in interlayer film in end part of laminated glass | | | ○ | ○○ | ○○ | x | x |

TABLE 5

|  |  | Example 30 | Example 31 | Example 32 | Example 33 | Example 34 | Comparative Example 9 |
|---|---|---|---|---|---|---|---|
| Ultraviolet ray screening agent | Kind | Tinuvin405 | Hostavin PR-25 | Hostavin PR-25 | Tinuvin326 | Eversorb89 | Tinuvin405 |
|  | Content in colored part (wt %) | 0.8 | 0.4 | 0.4 | 0.5 | 0.6 | 0.05 |
|  | Content in non-colored part (wt %) | 0.2 | 0.05 | 0.1 | 0.4 | 0.4 | 0.05 |
|  | Content in colored part/ content in non-colored part (ratio on weight basis) | 4 | 8 | 4 | 1.25 | 1.5 | 1 |
| Light stabilizer | Kind | — | Tinuvin765 | Tinuvin123 | Tinuvin765 | Tinuvin123 | — |
|  | Content in colored part (wt %) | — | 0.05 | 0.05 | 0.05 | 0.05 | — |
|  | Visible light transmittance in non-colored part (%) | 88 | 88 | 88 | 88 | 88 | 88 |
|  | Visible light transmittance in colored part (%) | 6 | 6 | 6 | 6 | 6 | 6 |
|  | Condition of void in interlayer film in end part of laminated glass | ○ | ○○ | ○○ | ○ | ○○ | x |
|  | Discoloration of interlayer film (ΔYI value) | ○○ | ○○ | ○○ | ○○ | ○ | x |

TABLE 6

|  |  | Example 35 | Example 36 | Example 37 | Example 38 | Example 39 | Example 40 |
|---|---|---|---|---|---|---|---|
| Oxidation inhibitor | Kind | BHT | IRGANOX 245 | AO-40 | IRGANOX 1010 | IRGANOX 245 | IRGANOX 245 |
|  | Content in colored part (wt %) | 0.8 | 0.4 | 0.4 | 0.4 | 0.4 | 0.4 |
|  | Content in non-colored part (wt %) | 0.2 | 0.05 | 0.05 | 0.2 | 0.05 | 0.1 |
|  | Content in colored part/ content in non-colored part (ratio on weight basis) | 4 | 8 | 8 | 2 | 8 | 4 |
| Light stabilizer | Kind | — | — | — | — | Tinuvin765 | Tinuvin123 |
|  | Content in colored part (wt %) | — | — | — | — | 0.01 | 0.01 |
|  | Visible light transmittance in non-colored part (%) | 88 | 88 | 88 | 88 | 88 | 88 |
|  | Visible light transmittance in colored part (%) | 6 | 6 | 6 | 6 | 6 | 6 |
|  | Condition of void in interlayer film in end part of laminated glass | ○ | ○○ | ○○ | ○ | ○○ | ○○ |
|  | Discoloration of interlayer film (ΔE) | ○○ | ○○ | ○○ | ○○ | ○ | ○ |

|  |  | Example 41 | Comparative Example 10 | Comparative Example 11 | Comparative Example 12 | Comparative Example 13 |
|---|---|---|---|---|---|---|
| Oxidation inhibitor | Kind | IRGANOX 1010 | BHT | IRGANOX 245 | AO-40 | IRGANOX 1010 |
|  | Content in colored part (wt %) | 0.4 | 0.4 | 0.05 | 0.05 | 0.05 |
|  | Content in non-colored part (wt %) | 0.2 | 0.4 | 0.05 | 0.05 | 0.05 |
|  | Content in colored part/ content in non-colored part (ratio on weight basis) | 2 | 1 | 1 | 1 | 1 |
| Light stabilizer | Kind | Tinuvin765 | — | — | — | — |
|  | Content in colored part (wt %) | 0.01 | — | — | — | — |
|  | Visible light transmittance in non-colored part (%) | 88 | 88 | 88 | 88 | 88 |
|  | Visible light transmittance in colored part (%) | 6 | 6 | 6 | 6 | 6 |
|  | Condition of void in interlayer film in end part of laminated glass | ○○ | x | x | x | x |
|  | Discoloration of interlayer film (ΔE) | ○○ | x | ○○ | ○○ | ○○ |

TABLE 7

|  |  | Example 42 | Example 43 | Example 44 | Example 45 | Example 46 | Example 47 |
|---|---|---|---|---|---|---|---|
| Light stabilizer | Kind | Tinuvin770 | Tinuvin765 | Tinuvin123 | LA-63P | Tinuvin765 | Tinuvin765 |
|  | Content in first region (wt %) | 0.025 | 0.025 | 0.025 | 0.025 | 0.05 | 0.0025 |
|  | Content in second region (wt %) | 0.02 | 0.02 | 0.02 | 0.02 | 0.01 | 0.002 |
|  | Content in first region/content in second region (ratio on weight basis) | 1.25 | 1.25 | 1.25 | 1.25 | 5 | 1.25 |
| Glass transition temperature of first layer (° C.) | | 3 | 3 | 3 | 3 | 3 | 3 |
| Visible light transmittance of entire interlayer film (%) | | 88 | 88 | 88 | 88 | 88 | 88 |
| Condition of void in interlayer film in end part of laminated glass | | ○○ | ○○ | ○○ | ○○ | ○○ | ○ |

|  |  | Example 48 | Example 49 | Example 50 | Comparative Example 14 |
|---|---|---|---|---|---|
| Light stabilizer | Kind | Tinuvin765 | Tinuvin765 | Tinuvin765 | — |
|  | Content in first region (wt %) | 0.22 | 0.0025 | 0.025 | — |
|  | Content in second region (wt %) | 0.2 | 0.002 | 0.02 | — |
|  | Content in first region/content in second region (ratio on weight basis) | 1.1 | 1.25 | 1.25 | — |
| Glass transition temperature of first layer (° C.) | | 3 | 3 | 3 | 3 |
| Visible light transmittance of entire interlayer film (%) | | 88 | 88 | 88 | 88 |
| Condition of void in interlayer film in end part of laminated glass | | ○○ | ○○ | ○○ | x |

TABLE 8

|  |  | Example 51 | Example 52 | Example 53 | Example 54 | Example 55 | Comparative Example 15 |
|---|---|---|---|---|---|---|---|
| Ultraviolet ray screening agent | Kind | Tinuvin405 | Hostavin PR-25 | Hostavin PR-25 | Tinuvin326 | Eversorb89 | Tinuvin405 |
|  | Content in first region (wt %) | 0.8 | 0.4 | 0.4 | 0.5 | 0.6 | 0.05 |
|  | Content in second region (wt %) | 0.2 | 0.05 | 0.1 | 0.4 | 0.4 | 0.05 |
|  | Content in first region/content in second region (ratio on weight basis) | 4 | 8 | 4 | 1.25 | 1.5 | 1 |
| Light stabilizer | Kind | — | Tinuvin765 | Tinuvin123 | Tinuvin765 | Tinuvin123 | — |
|  | Content in first region (wt %) | — | 0.05 | 0.05 | 0.05 | 0.05 | — |
| Glass transition temperature of first layer (° C.) | | 3 | 3 | 3 | 3 | 3 | 3 |
| Visible light transmittance of entire interlayer film (%) | | 88 | 88 | 88 | 88 | 88 | 88 |
| Condition of void in interlayer film in end part of laminated glass | | ○ | ○○ | ○○ | ○ | ○○ | x |
| Discoloration of interlayer film (ΔYI value) | | ○○ | ○○ | ○○ | ○○ | ○ | x |

TABLE 9

|  |  | Example 56 | Example 57 | Example 58 | Example 59 | Example 60 | Example 61 |
|---|---|---|---|---|---|---|---|
| Oxidation inhibitor | Kind | BHT | IRGANOX 245 | AO-40 | IRGANOX 1010 | IRGANOX 245 | IRGANOX 245 |
|  | Content in first region (wt %) | 0.8 | 0.4 | 0.4 | 0.4 | 0.4 | 0.4 |
|  | Content in second region (wt %) | 0.2 | 0.05 | 0.05 | 0.2 | 0.05 | 0.1 |

TABLE 9-continued

|  |  | | | | | | |
|---|---|---|---|---|---|---|---|
| | Content in first region/ content in second region (ratio on weight basis) | 4 | 8 | 8 | 2 | 8 | 4 |
| Light stabilizer | Kind | — | — | — | — | Tinuvin765 | Tinuvin123 |
| | Content in first region (wt %) | — | — | — | — | 0.01 | 0.01 |
| | Glass transition temperature of first layer (° C.) | 3 | 3 | 3 | 3 | 3 | 3 |
| | Visible light transmittance of entire interlayer film (%) | 88 | 88 | 88 | 88 | 88 | 88 |
| | Condition of void in interlayer film in end part of laminated glass | ○ | ○○ | ○○ | ○ | ○○ | ○○ |
| | Discoloration of interlayer film (ΔE) | ○○ | ○○ | ○○ | ○○ | ○ | ○ |

|  |  | Example 62 | Comparative Example 16 | Comparative Example 17 | Comparative Example 18 | Comparative Example 19 |
|---|---|---|---|---|---|---|
| Oxidation inhibitor | Kind | IRGANOX 1010 | BHT | IRGANOX 245 | AO-40 | IRGANOX 1010 |
| | Content in first region (wt %) | 0.4 | 0.4 | 0.05 | 0.05 | 0.05 |
| | Content in second region (wt %) | 0.2 | 0.4 | 0.05 | 0.05 | 0.05 |
| | Content in first region/ content in second region (ratio on weight basis) | 2 | 1 | 1 | 1 | 1 |
| Light stabilizer | Kind | Tinuvin765 | — | — | — | — |
| | Content in first region (wt %) | 0.01 | — | — | — | — |
| | Glass transition temperature of first layer (° C.) | 3 | 3 | 3 | 3 | 3 |
| | Visible light transmittance of entire interlayer film (%) | 88 | 88 | 88 | 88 | 88 |
| | Condition of void in interlayer film in end part of laminated glass | ○○ | x | x | x | x |
| | Discoloration of interlayer film (ΔE) | ○○ | x | ○○ | ○○ | ○○ |

TABLE 10

|  |  | Example 63 | Example 64 | Example 65 | Example 66 | Example 67 | Example 68 |
|---|---|---|---|---|---|---|---|
| Light stabilizer | Kind | Tinuvin770 | Tinuvin765 | Tinuvin123 | LA-63P | Tinuvin765 | Tinuvin765 |
| | Content in colored part (wt %) | 0.025 | 0.025 | 0.025 | 0.025 | 0.05 | 0.0025 |
| | Content in non-colored part (wt %) | 0.02 | 0.02 | 0.02 | 0.02 | 0.02 | 0.001 |
| | Content in colored part/ content in non-colored part (ratio on weight basis) | 1.25 | 1.25 | 1.25 | 1.25 | 2.5 | 2.5 |
| | Glass transition temperature of first layer (° C.) | 3 | 3 | 3 | 3 | 3 | 3 |
| | Visible light transmittance in non-colored part (%) | 88 | 88 | 88 | 88 | 88 | 88 |
| | Visible light transmittance in colored part (%) | 6 | 6 | 6 | 6 | 6 | 6 |
| | Condition of void in interlayer film in end part of laminated glass | ○○ | ○○ | ○○ | ○○ | ○○ | ○ |

|  |  | Example 69 | Example 70 | Example 71 | Comparative Example 20 |
|---|---|---|---|---|---|
| Light stabilizer | Kind | Tinuvin765 | Tinuvin765 | Tinuvin765 | — |
| | Content in colored part (wt %) | 0.22 | 0.025 | 0.025 | — |
| | Content in non-colored part (wt %) | 0.2 | 0.02 | 0.02 | — |
| | Content in colored part/ content in non-colored part (ratio on weight basis) | 1.1 | 1.25 | 1.25 | — |
| | Glass transition temperature of first layer (° C.) | 3 | 3 | 3 | 3 |

TABLE 10-continued

|  | | | | |
|---|---|---|---|---|
| Visible light transmittance in non-colored part (%) | 88 | 88 | 88 | 88 |
| Visible light transmittance in colored part (%) | 6 | 18 | 34 | 6 |
| Condition of void in interlayer film in end part of laminated glass | ∘∘ | ∘∘ | ∘∘ | x |

TABLE 11

|  |  | Example 72 | Example 73 | Example 74 | Example 75 | Example 76 | Comparative Example 21 |
|---|---|---|---|---|---|---|---|
| Ultraviolet ray screening agent | Kind | Tinuvin405 | Hostavin PR-25 | Hostavin PR-25 | Tinuvin326 | Eversorb89 | Tinuvin405 |
|  | Content in colored part (wt %) | 0.8 | 0.4 | 0.4 | 0.5 | 0.6 | 0.05 |
|  | Content in non-colored part (wt %) | 0.2 | 0.05 | 0.1 | 0.4 | 0.4 | 0.05 |
|  | Content in colored part/ content in non-colored part (ratio on weight basis) | 4 | 8 | 4 | 1.25 | 1.5 | 1 |
| Light stabilizer | Kind | — | Tinuvin765 | Tinuvin123 | Tinuvin765 | Tinuvin123 | — |
|  | Content in colored part (wt %) | — | 0.05 | 0.05 | 0.05 | 0.05 | — |
| Glass transition temperature of first layer (° C.) | | 3 | 3 | 3 | 3 | 3 | 3 |
| Visible light transmittance in non-colored part (%) | | 88 | 88 | 88 | 88 | 88 | 88 |
| Visible light transmittance in colored part (%) | | 6 | 6 | 6 | 6 | 6 | 6 |
| Condition of void in interlayer film in end part of laminated glass | | ∘ | ∘∘ | ∘∘ | ∘ | ∘∘ | x |
| Discoloration of interlayer film (ΔYI value) | | ∘∘ | ∘∘ | ∘∘ | ∘∘ | ∘ | x |

TABLE 12

|  |  | Example 77 | Example 78 | Example 79 | Example 80 | Example 81 | Example 82 |
|---|---|---|---|---|---|---|---|
| Oxidation inhibitor | Kind | BHT | IRGANOX 245 | AO-40 | IRGANOX 1010 | IRGANOX 245 | IRGANOX 245 |
|  | Content in colored part (wt %) | 0.8 | 0.4 | 0.4 | 0.4 | 0.4 | 0.4 |
|  | Content in non-colored part (wt %) | 0.2 | 0.05 | 0.05 | 0.2 | 0.05 | 0.1 |
|  | Content in colored part/ content in non-colored part (ratio on weight basis) | 4 | 8 | 8 | 2 | 8 | 4 |
| Light stabilizer | Kind | — | — | — | — | Tinuvin765 | Tinuvin123 |
|  | Content in colored part (wt %) | — | — | — | — | 0.01 | 0.01 |
| Glass transition temperature of first layer (° C.) | | 3 | 3 | 3 | 3 | 3 | 3 |
| Visible light transmittance in non-colored part (%) | | 88 | 88 | 88 | 88 | 88 | 88 |
| Visible light transmittance in colored part (%) | | 6 | 6 | 6 | 6 | 6 | 6 |
| Condition of void in interlayer film in end part of laminated glass | | ∘ | ∘∘ | ∘∘ | ∘ | ∘∘ | ∘∘ |
| Discoloration of interlayer film (ΔE) | | ∘∘ | ∘∘ | ∘∘ | ∘∘ | ∘ | ∘ |

|  |  | Example 83 | Comparative Example 22 | Comparative Example 23 | Comparative Example 24 | Comparative Example 25 |
|---|---|---|---|---|---|---|
| Oxidation inhibitor | Kind | IRGANOX 1010 | BHT | IRGANOX 245 | AO-40 | IRGANOX 1010 |
|  | Content in colored part (wt %) | 0.4 | 0.4 | 0.05 | 0.05 | 0.05 |
|  | Content in non-colored part (wt %) | 0.2 | 0.4 | 0.05 | 0.05 | 0.05 |
|  | Content in colored part/ content in non-colored part (ratio on weight basis) | 2 | 1 | 1 | 1 | 1 |

TABLE 12-continued

| | | | | | | |
|---|---|---|---|---|---|---|
| Light stabilizer | Kind | Tinuvin765 | — | — | — | — |
| | Content in colored part (wt %) | 0.01 | — | — | — | — |
| | Glass transition temperature of first layer (° C.) | 3 | 3 | 3 | 3 | 3 |
| | Visible light transmittance in non-colored part (%) | 88 | 88 | 88 | 88 | 88 |
| | Visible light transmittance in colored part (%) | 6 | 6 | 6 | 6 | 6 |
| | Condition of void in interlayer film in end part of laminated glass | ○○ | x | x | x | x |
| | Discoloration of interlayer film (ΔE) | ○○ | x | ○○ | ○○ | ○○ |

EXPLANATION OF SYMBOLS 1, 1A, 1B, 1C: Interlayer film
11, 11A, 11B, 11C: First layer
12, 12B: Second layer
13, 13B: Third layer
14, 14A: Colored layer
21, 21A, 21B, 21C: Laminated glass
31, 31A, 31B, 31C: First lamination glass member
32, 32A, 32B, 32C: Second lamination glass member
X: Colored part
Y: Non-colored part

The invention claimed is:

1. An interlayer film for laminated glass having a lengthwise direction and a widthwise direction, the interlayer film comprising a configuration C below:
configuration C: containing an oxidation inhibitor, and having such a distribution in content (% by weight) of the oxidation inhibitor in the widthwise direction that the content (% by weight) of the oxidation inhibitor is larger in one end side of the widthwise direction,
the interlayer film having a colored part that is colored in plan view in one end side of the widthwise direction,
the interlayer film having a non-colored part that is not colored in plan view in the other end side opposite to the one end of the widthwise direction,
the interlayer film containing the oxidation inhibitor in the colored part,
the interlayer film not containing or containing the oxidation inhibitor in the non-colored part, and
a content (% by weight) of the oxidation inhibitor in the entire colored part being larger than a content (% by weight) of the oxidation inhibitor in the entire non-colored part.

2. The interlayer film for laminated glass according to claim 1, wherein
the interlayer film contains the oxidation inhibitor in a first region extending for 5% inwardly from one end of the widthwise direction,
the interlayer film does not contain or contains the oxidation inhibitor in a second region extending for 5% inwardly from the other end opposite to the one end of the widthwise direction, and
a content (% by weight) of the oxidation inhibitor in the entire first region is larger than a content (% by weight) of the oxidation inhibitor in the entire second region.

3. The interlayer film for laminated glass according to claim 1, wherein a visible light transmittance of the colored part is lower than a visible light transmittance of the non-colored part.

4. The interlayer film for laminated glass according to claim 1, including a plurality of layers in one end side of the widthwise direction.

5. The interlayer film for laminated glass according to claim 1, wherein a number of layers in one end side of the widthwise direction is different from a number of layers in the other end side of the widthwise direction.

6. The interlayer film for laminated glass according to claim 1, including a layer having a glass transition temperature of 10° C. or less.

7. The interlayer film for laminated glass according to claim 1, including a first layer; and a second layer arranged on a first surface side of the first layer.

8. The interlayer film for laminated glass according to claim 7, wherein the first layer has a glass transition temperature of 10° C. or less.

9. The interlayer film for laminated glass according to claim 7, wherein a content (% by weight) of the oxidation inhibitor in the first layer is larger than a content (% by weight) of the oxidation inhibitor in the second layer.

10. The interlayer film for laminated glass according to claim 7, wherein
the interlayer film has a colored part that is colored in plan view, and
the interlayer film includes a colored layer containing a coloring agent in the colored part, wherein the colored layer is embedded in the first layer, or embedded in the second layer, or arranged between the first layer and the second layer, or arranged on a side opposite to the first layer side of the second layer.

11. The interlayer film for laminated glass according to claim 10, wherein
when the colored layer is embedded in the first layer, a content (% by weight) of the oxidation inhibitor in the colored layer is smaller than a content (% by weight) of the oxidation inhibitor in the first layer,
when the colored layer is embedded in the second layer, a content (% by weight) of the oxidation inhibitor in the colored layer is smaller than a content (% by weight) of the oxidation inhibitor in the second layer,
when the colored layer is arranged between the first layer and the second layer, a content (% by weight) of the oxidation inhibitor in the colored layer is smaller than a content (% by weight) of the oxidation inhibitor in the first layer, and a content (% by weight) of the oxidation inhibitor in the colored layer is smaller than a content (% by weight) of the oxidation inhibitor in the second layer, and
when the colored layer is arranged on a side opposite to the first layer side of the second layer, a content (% by weight) of the oxidation inhibitor in the colored layer is smaller than a content (% by weight) of the oxidation inhibitor in the second layer.

12. The interlayer film for laminated glass according to claim 10, wherein the colored layer is embedded in the second layer.

13. The interlayer film for laminated glass according to claim 7, including a third layer arranged on a second surface side opposite to the first surface of the first layer.

14. The interlayer film for laminated glass according to claim 13, wherein a content (% by weight) of the oxidation inhibitor in the first layer is larger than a content (% by weight) of the oxidation inhibitor in the third layer.

15. The interlayer film for laminated glass according to claim 1, wherein the interlayer film is an interlayer film to be arranged between a first lamination glass member and a second lamination glass member for use.

16. The interlayer film for laminated glass according to claim 13, wherein
the interlayer film is an interlayer film to be attached in an opening part between the external space and the internal space in a vehicle, and
the interlayer film is an interlayer film to be attached to the opening part in such a manner that the second layer side of the second layer and the third layer is located on the external space side.

17. The interlayer film for laminated glass according to claim 16, wherein
the interlayer film is an interlayer film to be attached in an opening part between the external space and the internal space in a vehicle, and
the interlayer film is an interlayer film to be attached to the opening part in such a manner that the one end side of the widthwise direction is located on the upper side of the opening part.

18. The interlayer film for laminated glass according to claim 1, containing a thermoplastic resin.

19. The interlayer film for laminated glass according to claim 18, wherein the thermoplastic resin is a polyvinyl acetal resin.

20. The interlayer film for laminated glass according to claim 1, containing a plasticizer.

21. A laminated glass, comprising:
a first lamination glass member;
a second lamination glass member; and
the interlayer film for laminated glass according to claim 1,
the interlayer film for laminated glass being arranged between the first lamination glass member and the second lamination glass member.

22. The laminated glass according to claim 21, which is used as side glass, roof glass or glass for backlight in an automobile.

23. The laminated glass according to claim 21, which is used as glass for windshield in an automobile, wherein black coating is not applied on a contact surface between the interlayer film and a lamination glass member on an outer side of the automobile.

* * * * *